(12) United States Patent
MacCarthaigh

(10) Patent No.: US 10,097,454 B1
(45) Date of Patent: Oct. 9, 2018

(54) FLEXIBLE PACKET REWRITING FRAMEWORK

(71) Applicant: Amazon Technologies, Inc., Seattle, WA (US)

(72) Inventor: Colm MacCarthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 366 days.

(21) Appl. No.: 14/736,172

(22) Filed: Jun. 10, 2015

(51) Int. Cl.
*H04L 12/28* (2006.01)
*H04L 12/741* (2013.01)
*H04L 12/931* (2013.01)

(52) U.S. Cl.
CPC ............ *H04L 45/74* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 6,601,084 B1* | 7/2003 | Bhaskaran | G06F 9/505 709/223 |
| 6,831,917 B1* | 12/2004 | Cheriton | H04L 12/18 370/392 |
| 6,993,021 B1 | 1/2006 | Chuah et al. | |
| 7,782,782 B1 | 8/2010 | Ferguson et al. | |
| 7,865,586 B2 | 1/2011 | Cohn | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1* | 4/2014 | Maxwell | H04L 45/302 370/230 |
| 2011/0122880 A1* | 5/2011 | Saito | H04L 29/12367 370/401 |
| 2011/0149964 A1* | 6/2011 | Judge | H04L 45/04 370/392 |
| 2015/0039674 A1* | 2/2015 | Agarwal | H04L 67/2842 709/203 |
| 2015/0382184 A1* | 12/2015 | Takazoe | H04W 8/26 370/475 |
| 2016/0173600 A1* | 6/2016 | Galles | G06F 9/45558 709/212 |

OTHER PUBLICATIONS

"A Brief Primer on Anycast", Matthew Prince, Oct. 21, 2011, pp. 1-4.

(Continued)

*Primary Examiner* — Chi H Pham
*Assistant Examiner* — Fahmida Chowdhury
(74) *Attorney, Agent, or Firm* — Robert C. Kowert; Meyertons, Hood, Kivlin, Kowert & Goetzel, P.C.

(57) ABSTRACT

Based on a packet processing requirement of a client, a parameter set is generated at a first node of a flow management system, indicating a number of outbound packets to be generated per received packet of a flow and/or a source address substitution rule to be applied to received packets. A packet rewriting directive corresponding to the parameter set is transmitted from the first node to a different node where received packets are transformed according to the parameter set.

20 Claims, 38 Drawing Sheets

(56) References Cited

OTHER PUBLICATIONS

"Amazon Elastic Compute Cloud", User Guide for Linux, API Version, Jun. 15, 2014, pp. 1-684.
Amazon Web Services, "Shuffle Sharding: massive and magical fault isolation", http://www.awsarchitectureblog.com/2014/04/shuffle-sharding.html, Sep. 17, 2014, pp. 1-6.
Costin Raiciu, et al "Improving Datacenter Performance and Robustness with Multipath TCP" SIGCOMM'11, Aug. 15-19, 2011, pp. 1-12.
Albert Greenberg, et al "VL2: A Scalable and Flexible Data Center Network" Communications of the ACM, vol. 54, No. 3, Mar. 2011, pp. 1-10.
Chuanxiong Guo, et al "BCube: A High Performance, Server-centric Network Architecture for Modular Data Centers" SIGCOMM'09 Aug. 17-21, pp. 1-12.
"On the Impact of Packet Spraying in Data Center Networks", Advait Dixit, et al., 2013, pp. 1-9.
U.S. Appl. No. 14/565,164, filed Dec. 9, 2014, Tobias Lars-Olov Holgers, et al.
U.S. Appl. No. 14/526,410, filed Oct. 28, 2014, Eric Jason Brandwine.
U.S. Appl. No. 14/736,163, filed Jun. 10, 2015, Colm MacCarthaigh.
U.S. Appl. No. 14/736,165, filed Jun. 10, 2015, Colm MacCarthaigh.
U.S. Appl. No. 14/736,167, filed Jun. 10, 2015, Colm MacCarthaigh.

\* cited by examiner

Time = T1

FLEXIBLE PACKET REWRITING FRAMEWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

As demand for virtualization-based services at provider networks has grown, more and more networking and interconnectivity-related features have been added to the services. Many such features may require network packet address manipulation in one form or another, e.g., at level 3 or level 4 of the open systems interconnect stack. For example, some providers configure groups of resources as isolated virtual networks on behalf of respective customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of address translation techniques. For some types of applications which may be deployed at such isolated virtual networks or at other platforms, successive requests from a given client of a given application should ideally be directed using packet header manipulation to the same back-end server, further complicating the packet processing requirements. For other applications, it may be useful to obfuscate at least some of the source address information contained in a set of packets in a consistent manner, or to replicate contents of the packets among many different recipients according to specified rules or directives. Using ad-hoc solutions for all the different types of packet transformation requirements may not scale in large provider networks at which the traffic associated with hundreds of thousands of virtual or physical machines may be processed concurrently.

BRIEF DESCRIPTION OF DRAWINGS

FIG. 19a-FIG. 19l collectively illustrate a simple example of metadata synchronization among the tiers of a flow management system, according to at least some embodiments.

Figure 1:
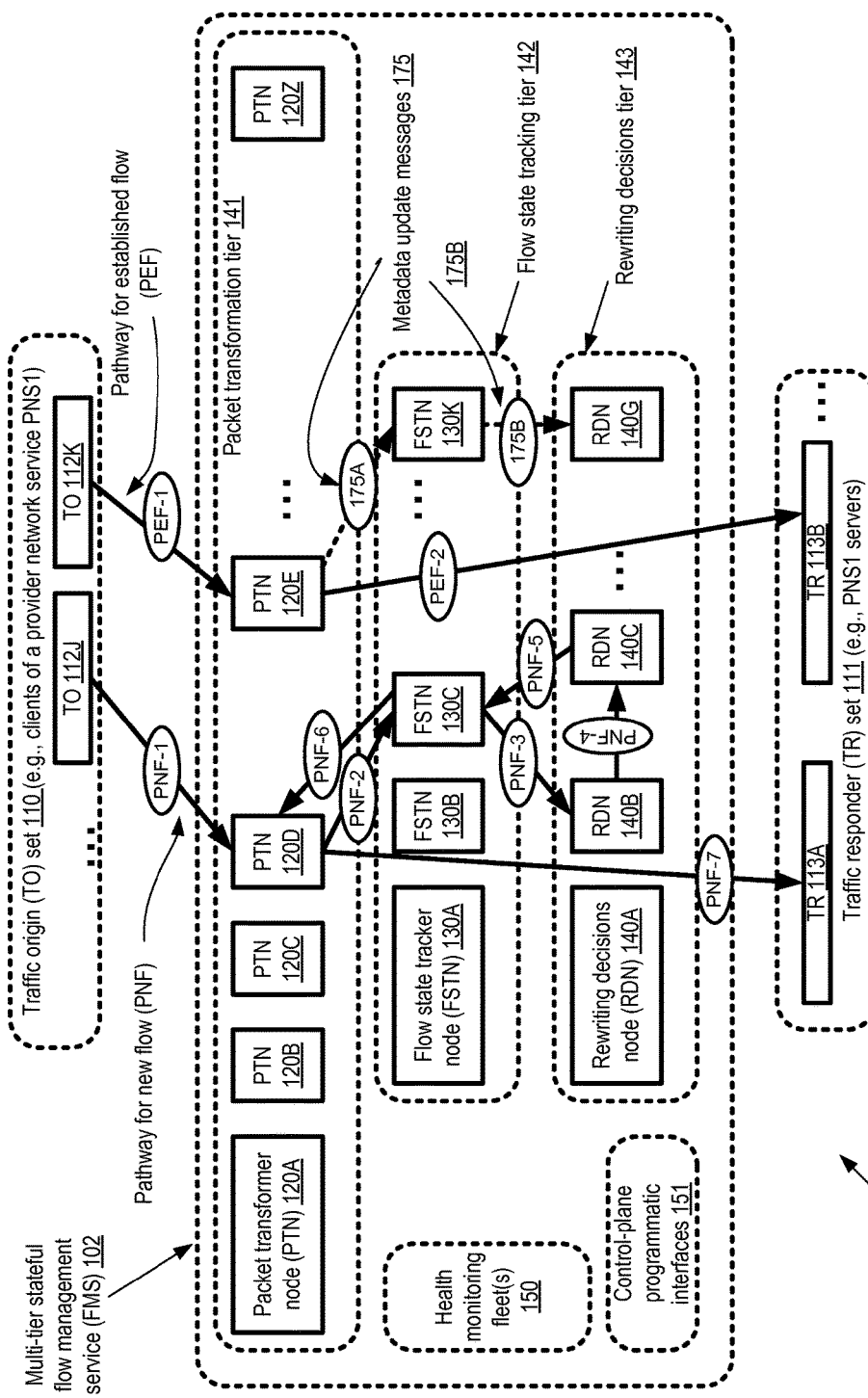
FIG. 1 illustrates an example system environment in which a multi-tier network flow management service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a scalable, fault tolerant network flow management service at a provider network are described. Generally speaking, the flow management service (FMS) receives network packets from a plurality of traffic sources, classifies a given received packet as a member of a particular network flow, identifies a directive (e.g., one or more rules) for transformation(s) that are to be applied to packets of that flow, generates one or more output packets based on the rule(s), and transmits the output packets to one or more destinations (where the destinations may in some case have been selected based on the rule). The same directive may be applied consistently for multiple packets belonging to the same flow in at least some embodiments, and the transformations may involve changes to one or more headers. In at least some embodiments, one network flow may be distinguished from another based on some or all of the following attributes: a networking protocol indicated in a received packet, a source network address (e.g., an Internet Protocol (IP) associated with the source device at which the packet originated), a source network port, a destination network address (e.g., another IP address), a destination network port, and/or a directionality indicator with respect to an application for which the packet transformations are required (e.g., whether the packets are directed to the FMS from client-side components of the application, or server-side components of the application). The FMS may be set up to fulfill stateful packet processing requirements of a number of different categories in a provider network environment in some embodiments as described below in further detail—e.g., requirements for stateful anycast, multicast, source address substation, load balancing, and the like may all be handled by the same set of nodes of the FMS. The directives used for transforming or rewriting the packets may be set up in response to a request from a client in various embodiments. For example, a client may invoke one or more APIs (application programming interfaces) indicating the kind of packet transformations needed, the sets of entities or addresses from which the packets are to be sent to the FMS, the sets of entities or addresses to which the FMS is expected to send transformed packets, the expected bandwidth needs in one or both directions of traffic, and/or various other characteristics of the packet processing requirement. The terms "packet processing" and "packet rewriting" may be used synonymously herein. In at least some embodiments, the packet transformations may be implemented at layers 3 (the network layer) and/or 4 (the transport layer) of the open systems interconnect (OSI) model for networking.

In various embodiments, the FMS may be implemented as a distributed system comprising several different logical and/or physical tiers of nodes. One tier, called the packet transformation tier, may be responsible largely for applying the packet rewriting directives (which may each comprise one or more rules or parameters) on received packets, and sending the results of the rewriting to the appropriate destinations. The nodes of the packet transformation tier may be referred to as packet transformers herein. Another tier, called the flow state tracking tier, may be largely responsible for maintaining state metadata regarding various flows, e.g., information about the rates at which packets are being processed (which may be useful for billing purposes in some cases), how long ago the most recent packet of a given flow was processed, and so on. A third tier, called the rewriting decisions tier, may be largely responsible for generating the specific directives which are to be applied at the packet transformation tier to fulfill various client packet processing requirements. The directives may be generated based on various factors—e.g., information maintained at the rewriting decisions tier regarding the workload or availability of different destination devices, flow state metadata obtained from the flow state tracking tier, indications or records of client requirements, and so on. The directives may be provided to the packet transformation nodes for implementation in various embodiments, e.g., via the flow state tracking tier or directly from the rewriting decisions tier. The packet transformations tier may periodically provide updates to the flow state tracking tier (and/or directly to the rewriting decisions tier) regarding the status of various flows. In one simple analogy in which the FMS is compared to a simplified computing device, the rewriting decisions tier may be considered the "CPU" of the FMS, the flow state tracking tier may be considered the "memory", and the packet transformation tier may be considered an "input/output (I/O) device".

Each of the tiers may comprise numerous nodes in some embodiments, with each node configured to interact with one or more nodes at other tiers and/or at its own tier. In some embodiments, some or all the nodes at one or more of the tiers may be implemented at respective virtual machines (e.g., guest virtual machines or GVMs of a virtual computing service as described below), while in other embodiments, at least some nodes at some tiers may comprise un-virtualized hosts. In some embodiments multiple nodes of one or more tiers may be implemented on the same host. In one embodiment, at least some of the packet transformation node functionality may be subsumed or incorporated within some FMS client-side components, as described below in further detail. In various embodiment, for a given flow or for a given packet processing requirement, at least two nodes may be assigned at a given FMS tier—e.g., a primary node, and a secondary node configured to take over the responsibilities of the primary node under certain conditions. The rewriting directives, and/or the information required to identify the particular rewriting directive to be applied to a given flow, may be replicated in at least some embodiments, such that the FMS is able to withstand at least some types of failures at any of the tiers.

In some embodiments, the FMS may be set up at a provider network, e.g., to handle packet processing requirements associated with a virtual computing service and/or other services. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized compute servers, storage devices, networking equipment and the like, needed to implement, configure and distribute the infrastructure and services offered by the provider. In at least some embodiments, a virtual computing service implemented at a provider network may enable clients to utilize one or more guest virtual machines (which may be also be referred to as "virtualized compute servers", "compute instances" or simply as "instances") for their applications, with one or more compute instances being executed on any given instance host of a large fleet of instance hosts. Several different kinds of instances may be supported in some implementations, e.g., "large", "medium" or "small" instances that have different compute performance capabilities, different memory sizes and different amounts of persistent storage space. In some implementations, some or all of the nodes of a flow management service may be implemented at respective compute instances. Within large provider networks, some data centers may be located in different cities, states or countries than others, and in some embodiments the resources allocated to a given application may be distributed among several such locations to achieve desired levels of availability, fault-resilience and performance. At a provider network whose resources are distributed among numerous data centers or numerous availability containers, respective sets of nodes of each FMS tier may be set up at each data center or in each availability container. Generally speaking, any of a variety of networking protocols, including Transmission Control Protocol/Internet Protocol (TCP/IP) or User Datagram Protocol (UDP), may be used to access and use the resources (including the flow management service) of a provider network, and for communications between different resources of the provider network.

In some embodiments, the virtual computing service may assign virtual network interfaces (VNIs) to compute instances which may be configured as nodes of the FMS, and/or to compute instances acting as clients of the FMS. A VNI may comprise a logical entity with a set of networking and security-related attributes that can be attached to (or detached from) a compute instance programmatically. For example, at least one IP (Internet Protocol) address "IPaddr1" may be assigned to a given virtual network interface VNI1, and security rules restricting inbound and outbound traffic may be set for VNI1. When that VNI is programmatically attached to a given compute instance CI1 launched at an instance host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to CI2 (which is executing at a different instance host with a different physical network interface card NIC2), the IPaddr1 traffic that was previously being received at CI1 may now be received at CI2, with the same security rules in place. Support for virtual network interfaces may considerably simplify network configuration tasks for customers using the virtual computing service, including the operation of various nodes of the FMS in some embodiments as described below in further detail.

According to one embodiment, at least some of the nodes of the packet transformation tier of the FMS may maintain respective caches of rewriting directives or rewrite entries indicating the actions to be taken on received packets belonging to various flows. When a packet is received at a particular packet transformation node, one or more elements of the packet header may be extracted to identify the flow to which the packet belongs, and the node's cache may be examined to check whether a rewrite entry is present for that flow. If such an entry is present, the transformations indicated in the rewrite entry may be applied, and the resulting transformed or generated packets may be transmitted to their destination or destinations. The transformed packets may also be referred to as "outbound" packets with respect to the FMS, while the received packets which trigger the transformations may be referred to as "inbound" packets. The packet transformation node may also update various metadata entries regarding the flow (such as a timestamp of the most recent operation performed for the flow, an update to one or more sequence numbers associated with the flow, etc.) as described below in further detail. Periodically or on demand, metadata associated with the flow may be sent to one or more selected nodes of the flow state tracking tier. The particular node(s) of the state tracking tier to which the metadata updates are sent may be selected based on various factors in different embodiments—e.g., some number of nodes in the flow state tracking tier may be allocated to each packet processing requirement of a particular client, and a hash function may be applied to the flow identifier elements to select the particular flow state tracking nodes to whom the metadata is sent. The general technique of assigning one or more nodes from a pool of nodes for the purposes of handling operations performed on behalf of a given client of the FMS may be termed "client-based partitioning" or "client-based sharding" herein. The technique of selecting a particular destination from a set of possible destinations using a hash function applied to one or more flow identifier elements may be referred to herein as "flow hashing". Thus, to select at least the flow state tracking nodes to which metadata updates regarding a flow are sent, in some embodiments client-based partitioning followed by flow hashing may be used. Similarly, in at least some embodiments a set of nodes of the packet transformation tier may be assigned or designated for use by a given FMS client and/or for a particular packet processing requirement or application of the FMS client, and a particular node of the packet transformation tier may be selected for a given packet using flow hashing. In various embodiments the nodes of the various tiers of the FMS may be multi-tenant—that is, a given node at a given tier may in some cases be responsible for operations associated with multiple flows related to multiple packet processing requirements of multiple clients.

If the packet transformation node fails to find an entry in its cache, in at least some embodiments it may transmit an indication of the cache miss (which may, for example, comprise at least some of the contents of the received packet, or the entire received packet) to one of the other layers of the FMS. In one embodiment the cache miss indication may be sent to a particular node of the flow state tracking layer, e.g., one selected using the combination of client-based partitioning and flow hashing mentioned above. In other embodiments, the cache miss indication may be sent to a particular node of the rewriting decisions tier instead of, or in addition to, being sent to the flow state tracking tier.

A flow state tracking node which receives a cache miss indicator may maintain its own cache of rewrite entries in some embodiments, which may be referred to as the flow state entry cache. If an entry containing a rewriting directive to be used with respect to the packet associated with the cache miss is found in the flow state entry cache, the entry (or at least a portion of the entry which indicates the transformations to be applied) may be sent to the packet transformer node at which the cache miss occurred. If the flow state entry cache lookup also results in a miss, a request for a rewriting entry or directive may be sent to a selected node of the rewriting decisions tier in at least some embodiments. The particular rewriting decisions node may, for example, be selected based on one or more headers of the packet that led to the cache miss in some embodiments, or on some indication in the cache miss indicator regarding the particular packet processing requirement to be fulfilled. To avoid the possibility of conflicting packet rewriting decisions being made for different packets of a given flow, in various embodiments a single rewriting decisions node may be designated as the primary node responsible for the decisions made regarding a given packet processing requirement (such as a requirement to obscure or substitute source address entries from packets originating at some set of client addresses, or a requirement to implement multicast or anycast). That is, at the rewriting decisions tier, a given node may be responsible for all the flows associated with a client requirement or application in some embodiments, whereas at other tiers different nodes may be selected for different packets of a given flow.

In some embodiments the rewriting decisions node may maintain its own decisions cache, and check whether a rewriting decision has already been made for the cache miss whose indication is received from the flow state tracking tier (or from the packet transformation tier). If the decisions cache contains an appropriate entry, it may be retrieved and sent to the node from which the cache miss indication was received in various embodiments. Otherwise, (e.g., if the cache miss was caused by the first packet of a flow) the rewriting decisions node may generate one or rewriting directives corresponding to the flow whose packet led to the cache miss at the other tiers. In at least some embodiments, the rewrite directive may be replicated at one or more other nodes of the rewriting decisions tier before the directive is transmitted back to one or both of the other tiers. In one embodiment, if the cache miss indicator is received at a node RDN1 of the rewriting decisions tier, RDN1 may be considered the primary rewriting decisions node for the corresponding packet processing requirement, and the generated rewriting directive may be replicated to a secondary node RDN2 of the rewriting decisions tier. In some implementations, the secondary node RDN2 may be responsible for sending the rewrite directive back to the flow state tracking node from which the cache miss indicator was received at RDN1. In some embodiments, depending on the desired availability or durability level of the FMS, multiple replicas of the rewriting decision or directive may be stored at respective nodes of the rewriting decisions tier.

The rewriting decision itself (e.g., exactly which headers of the received packets are to be transformed, how many output packets are to be generated per received packet, etc.) may be made based on various factors, depending for example on the particular category of packet processing requirement to be fulfilled. In some embodiments, for example, a specific client requirement for packet processing may be associated with a particular virtual network interface address which is indicated in the received packet, and the rewriting decisions nodes may be able to determine the client requirement by examining one or more elements or headers of the received packet (which may be included in the cache miss indication). The rewriting decisions nodes may have access to a variety of data sources, e.g., of records indicating API calls made by clients for various packet processing requests, and such records may be examined in some cases to determine the rules or directives. Furthermore, for certain kinds of decisions, the rewriting decisions node may also examine other metadata—e.g., definitions or membership lists of multicast/unicast groups, workload metadata indicators of various destination alternatives for transformed packets, data structures that can be examined to select unique source address/port pairs for address substitutions, and the like. An efficient probabilistic technique for managing various parts of such metadata that can be used for making rewriting decisions is described below in further detail.

After the rewriting directive reaches the packet transformation node at which the original packet of the flow was received, the directive may be stored in the cache so that it can be re-used for subsequent received packets corresponding to the same client requirement in various embodiments. One or more transformed or outbound packets corresponding to the original packet may be generated in accordance with the rewrite directive, and transmitted towards their destinations. Metadata regarding the flow may be updated locally at the packet transformation node, e.g., for eventual inclusion in a metadata refresh message sent to the flow state tracking tier. In some embodiments, when a cache miss occurs at the packet transformation tier, the transformed packets corresponding to cache miss may be generated at, and/or sent to their destinations from, a node involved in responding to the cache miss. For example, a flow state tracking node that responds to a packet transformation tier cache miss may itself transmit the transformed packets based on a generated rewrite directive, and provide the rewrite directive to the packet transformation tier for use with respect to subsequent packets of the flow. In one embodiment, the rewriting decisions node may transmit a transformed packet with respect to the first received packet of a given flow, and transmit the rewrite entry to the other tiers for implementation on subsequent packets of the flow.

In various embodiments, once a rewrite decision has been made for a given flow and the corresponding directive is cached at the packet transformation tier, numerous additional packets of the flow may be processed at the packet transformation tier using that directive without any further interaction with the other tiers (apart from relatively infrequent metadata update messages sent to one or more of the other tiers). In at least some embodiments, therefore, a large fleet (e.g., tens of thousands) of packet transformation nodes may be configured, while fewer nodes may be configured for the other tiers. In large provider network environments whose resources are distributed among a plurality of data centers, some of which may be located in different cities, states, or countries than others, respective subsets of the different FMS tiers may be established in each data center or at each physical location.

Eventually, after some number of packets of a given flow have been processed, a request to terminate the flow (e.g., a connection close request) may be received at a packet transformation node associated with the flow. In some embodiments, the packet transformation node may clear the corresponding entry in its cache of rewrite entries, and indicate (e.g., either immediately or as part of its next batched metadata update) the termination of the flow to the flow state tracking tier. The flow state tracking node may propagate the updated information regarding the state of various in-process or completed flows to the appropriate rewriting decisions nodes in various embodiments. The received metadata may be used at to make subsequent rewriting decisions in at least some embodiments—e.g., the fact that a given flow has terminated may allow an IP address or port associated with that flow to be re-used for a different flow, and so on.

In various embodiments, a fleet of health monitoring nodes may be set up to inform the nodes at various layers of the FMS regarding the reachability and/or responsiveness of other nodes at various tiers (and/or the status of various back-end servers which may serve as destinations of the packets sent from the FMS). If a particular node at one of the tiers is informed that a different node responsible for some packet rewriting-related operations has failed or is unreachable, a substitute or replacement node which appears to be in a healthy state may be picked based on one or more failover policies implemented at the various layers in such embodiments. Additional details regarding the manner in which different packet transformation categories may be supported in various embodiments, the manner in which the flow management system may interact with devices of isolated virtual networks, and mechanisms which may be used to synchronize metadata among the tiers of the flow management system are provided below.

Example System Environment

FIG. 1 illustrates an example system environment in which a multi-tier network flow management service may be implemented, according to at least some embodiments. As shown, system 100 includes respective collections of nodes of a packet transformation tier 141, a flow state tracking tier 142, and a packet rewriting decisions tier 143 of a flow management service 102. Tier 141 comprises a plurality of packet transformer nodes (PTNs) 120A-120Z, tier 142 comprises a plurality of flow state tracking nodes (FSTNs) 130A-130K, while tier 143 comprises a plurality of rewriting decisions nodes (RDNs) 140A-140G. In general, any desired number of nodes may be instantiated at any of the tiers. The different tiers 141, 142 and 143 may collectively be responsible for implementing a variety of packet rewriting directives on behalf of numerous clients, with each such directive being applicable to one or more flows comprising respective pluralities of packets. A given rewriting directive may for example contain or indicate one or more specific rules. In the depicted embodiment, one packet flow may be distinguished from another based on some combination of the following attributes: the network protocol used at least for the packets received at the FMS, the source and destination addresses, the source and destination ports, and/or the direction in which the packets are transmitted with respect to an application on whose behalf the packets are to be processed. For example, one or more rewriting directives may be generated and enforced in the depicted embodiment for packets originating at traffic origin set 110 (e.g., including traffic origins (TOs) 112A and 112B) and directed towards a set of traffic responders 111 (e.g., TR 113A and 113B). The traffic responders 111 may, for example, collectively implement a particular application using some set of resources of a provider network, and the traffic origins may represent client devices from which requests for that application are sent. An entity responsible for the application (e.g., a customer of the provider network) may submit a request indicating a particular type of packet processing requirement (e.g., a multicast requirement, an anycast requirement, a load balancing requirement, a source address substitution requirement, or the like) to the FMS 102, and one or more directives comprising rules to fulfill the requirement may accordingly be generated for corresponding flows of received packets.

In some embodiments, respective directives may be generated for both directions of traffic flow between two sets of endpoints: e.g., one directive may be applied for packets originating traffic originator set 110 and directed towards traffic responders 111, and another directive may be applied for packets flowing from the responders 111 to the originators 110. In other embodiments, a given rewriting directive may contain respective elements or sub-rules for each direction of traffic. It is noted that in situations in which packets in both directions are transformed by the FMS, the roles of traffic "origins" and "responders" may be switched depending on the direction—e.g., when an entity or device receives a transformed packet from the FMS in the role of a responder, that same entity may subsequently send a packet to the FMS in the role of a traffic origin. In one embodiment, at least some of the FMS nodes used for packets transmitted in one direction (e.g., from a first set of hosts to a second set of hosts) may differ from the FMS nodes used for packets transmitted in the reverse direction (from the second set to the first set). For example, at least one node of the packet transformation tier, the flow state tracking tier and/or the rewriting decisions tier which participates in the process of transforming and routing packets flowing in one direction may not necessarily be used for packets flowing in the reverse direction. In some embodiments, at least at one of the FMS tiers, there may be no overlap between the respective fleets of nodes used for the different directions of traffic.

Two examples of the paths that may be taken when responding to a packet received at the packet transformation tier are indicated in FIG. 1 to help explain the respective functions of the different tiers. The arrows labeled "PNF" (pathway of a new flow), e.g., PNF-1, PNF-2, and the like represent the operations and messages that may result when the first packet of a particular flow (i.e., a flow for which a packet rewriting directive has not yet been generated) is received at the FMS. From among the packet transformation nodes 120A-120Z, a particular subset may be selected for a given client's packet processing requirement. One of the nodes from the subset (e.g., PTN 120D) may be selected for the first packet of a new packet flow originating at TO 112J, as indicated by the arrow PNF-1. PTN 120D may examine its local cache of rewrite entries, and determine that no entry applicable to the new flow exists in the cache. PTN 120D may then identify a particular FSTN 130C of tier 142 to which a cache miss indicator is to be sent, as indicated by arrow PNF-2. As described below in the context of FIG. 5, a number of techniques such as client-based partitioning, shuffle-sharding and/or flow hashing may be used to select the particular node at each tier which should process a new flow.

Upon receiving the cache miss indicator PNF-2, FSTN 130C may discover that it too does not have any indication of a rewriting directive for the new flow, and may send a request for a directive (e.g., the equivalent of its own cache miss) to a selected rewriting decisions node (RDN) 140B, as indicated by the arrow PNF-3. RDN 140B may look up the details of the client requirement associated with the new flow (e.g., in a repository of mappings between packet source/destination addresses and packet processing requirements, by querying a control-plane component of the service being used to implement the targeted application at the traffic responders, or using any of various techniques). RDN 140B may generate a new directive corresponding to the requirement. The directive may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets are to be changed, and so on.

The newly-generated directive may be transmitted from RDN 140B to a different RDN such as 140C for replication in the depicted embodiment, as indicated by arrow PNF-4. More than two replicas may be stored at respective RDNs in some embodiments, e.g., to increase the resiliency of the FMS to failures. As indicated by arrow PNF-5, the RDN at which the replica is stored may transmit the directive back to FSTN 130C, where a local copy of the directive may also be stored in at least some embodiments. In one implementation, the directive may also be replicated at multiple nodes of tier 142. In the depicted embodiment, the directive may be transmitted to PTN 120D (arrow PNF-6), where an entry representing the directive may be stored in a local cache. The received directive may then be implemented at PTN 120D: that is, one or more output or transformed packets corresponding to the packet that led to the cache miss may be generated and transmitted to a selected destination (as indicated by arrow PNF-7). In some embodiments, a response to the transformed packet or packets may be received at the packet transformation tier (e.g., at PTN 120D or at a different PTN to which the response packet is directed from TR 113A). If transformations are required to the response packets, they may be applied (e.g., using one or more elements of the same directive that was generated earlier in response to the cache miss) at tier 141, and the transformed response packets may be sent on to the traffic origin TO 112J.

The second example pathway illustrated in FIG. 1 is for a packet of an established flow—i.e., a flow for which a rewrite directive has already been generated and propagated to one or more nodes of tier 141 at which the directive is to be applied. The arrows associated with this second flow are labeled PEF (pathway for established flow). As indicated by PEF-1, a packet of the established flow may be transmitted from a traffic origin 112K to PTN 120E. There, a rewrite entry for the flow may be found in the local cache. One or more outbound packets corresponding to PEF-1 may be generated according to the cached entry, and send to a destination TR 113B as indicated by arrow PEF-2. If and when additional packets of the established flow are received at PTN 120E, the directive may be reapplied, e.g., without further interactions with tiers 142 or 143.

In at least some embodiments, the PTNs 120 may update metadata records corresponding to packets rewritten for various flows (e.g., indicating when the most recent packet of a given flow was processed as well as various other parameters discussed below in further detail) and transmit the contents of the metadata records (either in raw form, or in some compressed/aggregated form) to the FSTNs 130, as indicated by arrows 175A. Such metadata updates or refresh messages may be sent periodically in some implementations, e.g., once every K seconds, or in response to metadata update requests from tier 142. Similarly, as described below in further detail and indicated by arrow 175B, representations of flow state metadata records may be transmitted from tier 142 to tier 143 in at least some embodiments, and may be used at the RDNs to make various choices required for the rewriting directives (e.g., the particular port or IP address to be used as a substitute for a source port, or a particular destination server to which the transformed packets of a load-balanced flow should be sent). For example, updates flow metadata may indicate to an RDN that a particular (address, port) combination that was being used for a particular client's packet processing requirement is no longer in use because a connection has been closed, and that (address, port) pair may subsequently be used for some other packet processing requirement of the same client or another client.

In some embodiments, depending for example on the particular protocol being used, some of the packets received at the transformation tier may be fragmented. For example if a UDP (User Datagram Protocol) message that is 2000 bytes in size is sent to the FMS from a traffic origin with a maximum transmission unit of 1500 bytes, that message may be split across two packets or fragments, in accordance with the fragmentation support provided by the lower-level protocol (the Internet Protocol, or IP) on which UDP relies. According to the UDP design, only the first fragment contains the UDP header, while the second fragment has an IP header and a subset of the message data. Thus, a flow identification technique that relies on UDP ports (which are indicated in UDP headers) may not work for all the fragments. Furthermore, the fragments of a given message may not necessarily arrive in order—e.g., in the above example, the second fragment may arrive before the first. In order to handle UDP fragmentation, in at least some embodiments a technique that relies on using the "ID" field of the IP header may be used to associate the fragments of a given message or datagram with one another. In some embodiments, a dedicated fleet of FMS nodes (called association nodes) may be established to accumulate message fragments until the entire message has been received. After the complete message has been received, the association node may transmit the message for normal-mode FMS processing of the kind described above. In one such embodiment, when a given packet transformer node receives an IP fragment, the fragment may be directed to a selected association node. The target association node may be selected, for example, by hashing on the tuple (protocol, source IP address, destination IP address, IP ID). When the association host has reconciled all the fragments it may forward them back to the packet transformer node for standard processing of the kind described above. The forwarded fragments may be encapsulated with the full flow details (e.g., including the UDP port) so that all the flow identification information needed is available at the packet transformer node. Association nodes may be considered examples of store-and-forward nodes. In various embodiments, similar association techniques may be used for protocols other than UDP in which flow identification information may not necessarily be available in all the packets due to fragmentation.

In the embodiment shown in FIG. 1, system 100 may include one or more health checker fleets 150. The health checker fleet may include one or more nodes that monitor the responsiveness and/or availability of various nodes of the different tiers 141, 142 and/or 143, and provide notifications regarding changes in the health states of the monitored nodes to other nodes. If a particular node such as RDN 140A fails to respond to some number of consecutive heartbeat or health check messages, for example, a different node of the same tier such as 140B may be notified to take over some or all of RDN 140A's responsibilities. In addition, one or more nodes of an adjacent tier (or all tiers) may also be notified regarding possible failures. Failover protocols may be initiated in some embodiments based on such indications received from the health checker fleets. In some embodiments, similar health checking mechanisms may also be implemented for various traffic responders—e.g., information about the health status of various nodes implementing an application for which packet transformations are to be applied may be provided to at least the rewriting decisions tier 143. In the embodiment depicted in FIG. 1, the FMS 102 may implement one or more control-plane programmatic interfaces 151 (e.g., application programming interfaces (APIs), web-based consoles, command-line tools, graphical user interfaces (GUIs) and the like) which may be used by clients to indicate various types of packet processing requirements. The nodes at the various tiers of the flow management service may be implemented using virtual machines (e.g., guest virtual machines hosted at a virtual computing services) in some embodiments, and/or as un-virtualized machines.

Flow Identifiers and Rewriting Directives

Figure 2:
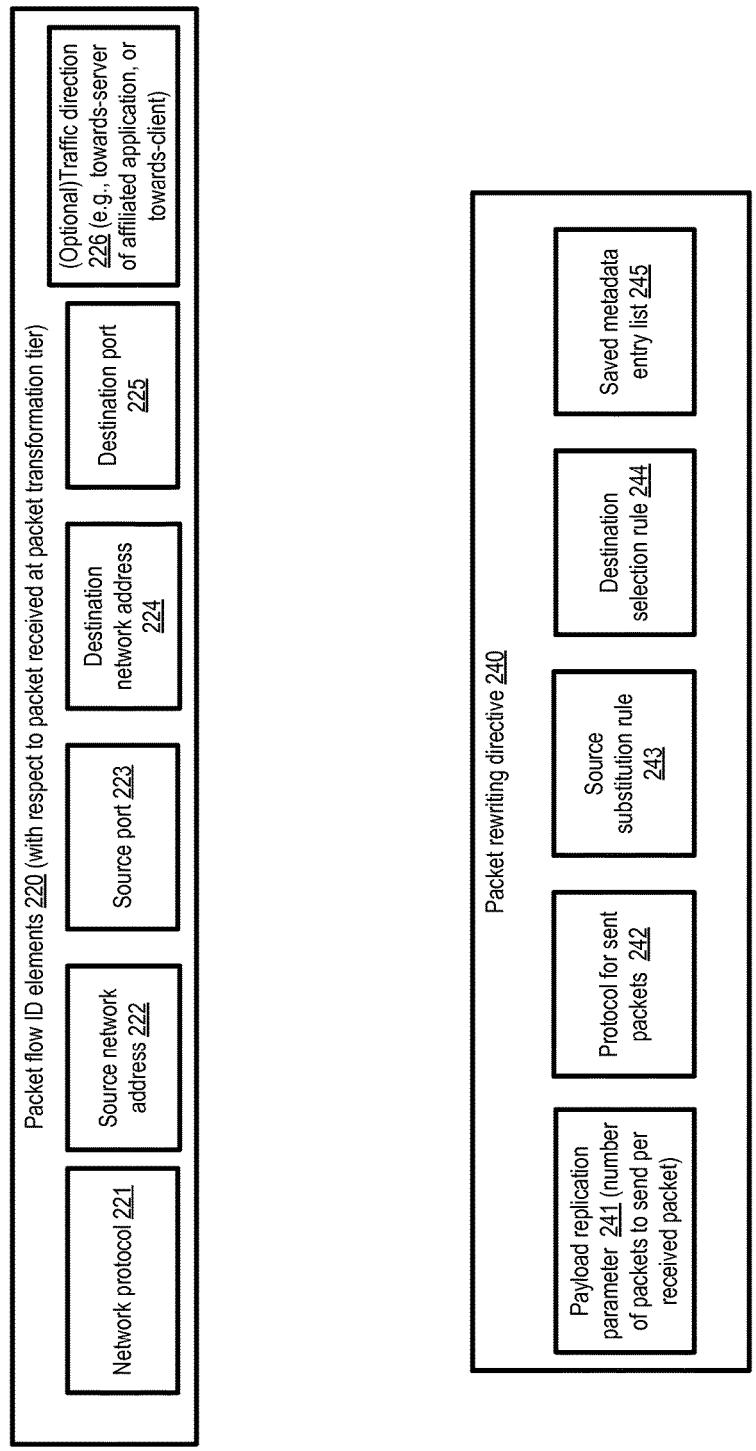
FIG. 2 illustrates examples of packet flow identifier attributes and example elements of packet rewriting directive, according to at least some embodiments.

FIG. 2 illustrates examples of packet flow identifier attributes and example elements of packet rewriting directives, according to at least some embodiments. A flow may be characterized (or distinguished from other flows) based on one or all of the following attributes of packets received at the packet transformation tier in the depicted embodiment: the network protocol 221 used for sending the packet to the packet transformation tier, the source network address 222, the source port 223, the destination network address 224, the destination port 225, and/or the traffic direction 226 with respect to the application for which the packet processing is being performed (e.g., whether a packet represents a client request being sent towards a back-end server of the application, or whether the packet is being sent to a client device from a back-end server in response to an earlier request). In some embodiments the traffic direction 226 may be implied by or deduced from the source and destination addresses. A number of different networking protocols may be supported in different embodiments—e.g., including the Internet Protocol (IP), the Transmission Control Protocol (TCP), the User Datagram Protocol (UDP), the Internet Control Message Protocol (ICMP) and the like. The particular combination of attributes 221-226 that are used to distinguish one flow from another for a given packet processing requirement or client may be referred to collectively as packet flow identifier elements 220. As mentioned earlier, the process of selecting a particular node from among the nodes of a flow management service's tiers may include flow hashing in some embodiments. Some or all of the packet flow identifier elements of a given packet may be aggregated (e.g., via concatenation or using some other function) in some implementations, and the result of the aggregation may be provided as input to a selected hash function, with the output of the hash function used to select the particular node.

The flow management service may support a variety of packet transformations in the depicted embodiment. A packet rewriting directive 240 produced at the rewriting decisions tier of the flow management system and implemented/enforced at the packet transformation tier may include any combination of several elements or parameters. The particular set of parameters used for a given client requirement may differ from the particular set of parameters used for a different requirement of the same client (or from the parameter set used for some other client's requirement). A payload replication parameter 241 may indicate how many replicas of a given received packet's contents or body are to be transmitted to respective destinations—e.g., if a multicast protocol is to be implemented by the FMS for a given client and the destination multicast group contains eight endpoints, the payload replication parameter may indicate that eight replicas are to be transmitted. By default, e.g., if the payload replication parameter is not included in the directive 240, a single outbound or transformed packet may be generated corresponding to each received packet. For some packet processing applications, the FMS may act as a protocol translator—e.g., incoming packets may be received via a particular networking protocol (such as TCP), while corresponding outgoing packets may be sent via a different protocol (such as UDP). The protocol for sent packets parameter 242 may indicate whether such a protocol change is to be implemented, and if so, the specific protocol to be used for the transformed packets. Source substitution rule 243 may indicate whether the source address and/or source port are to be changed, and if so, the acceptable source (address, port) range to be used for the transformed packets. Similarly, destination selection rule 244 may indicate whether the destination address and/or port is to be changed as part of the packet transformation, and if so, what the acceptable destination addresses and/or ports are for the flow for which the directive 240 was generated. In some cases (e.g., for multicast), multiple destinations may be indicated corresponding to a given received packet. In some embodiments, as mentioned earlier, a number of metadata elements may be updated and stored for various flows at the packet transformation tier, and representations of the metadata entries may be sent periodically or on demand to other tiers of the flow management service. The particular kinds of metadata to be collected for a given flow may be indicated via saved metadata entry list 245 in the depicted embodiments. In some embodiments, at least some of the packet rewriting directives 240 may not include all the different elements shown in FIG. 2, and/or elements not shown in FIG. 2 may be included in one or more directives. In various embodiments, some or all of the components of a rewrite directive may be stored in a rewrite entry and cached at one or more tiers of the FMS. In one embodiment, a rewrite entry may include only the elements of the corresponding rewrite directive, while in other embodiments a rewrite entry may also include collected metadata elements as described below.

Rewrite Entry Cache

Figure 3:
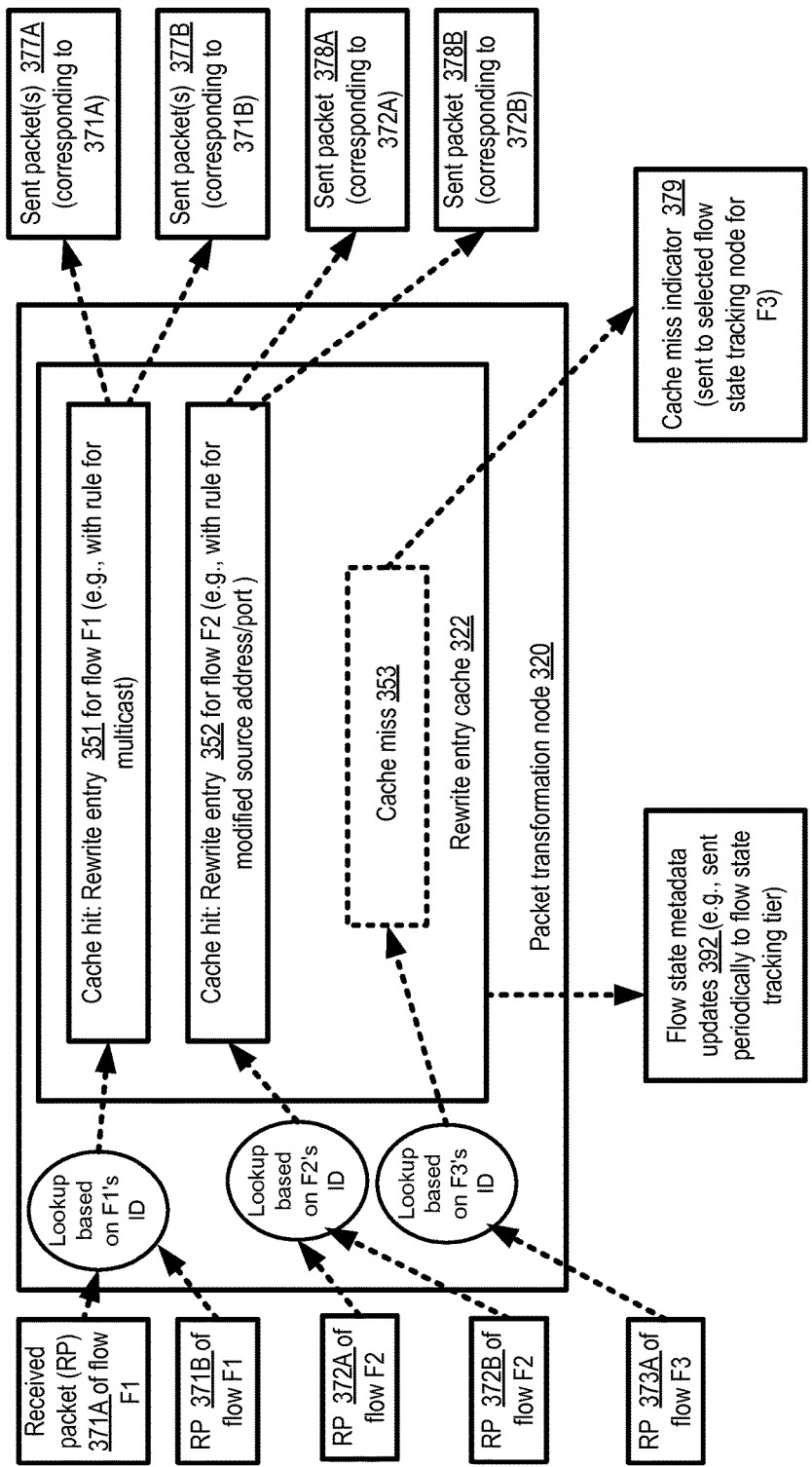
FIG. 3 illustrates the use of a rewrite entry cache at a packet transformation node of a flow management service, according to at least some embodiments.

FIG. 3 illustrates the use of a rewrite entry cache at a packet transformation node of a flow management service, according to at least some embodiments. As shown, packet transformation node 320 may store a plurality of rewrite entries (e.g., corresponding to respective rewrite directives produced at the rewriting decisions tier) in a local cache 322 in the depicted embodiment. In some implementations, the cache 322 may be implemented in volatile memory (e.g., the main memory of a host at which the packet transformation node 320 is instantiated), while in other implementations at least a portion of the cache 322 may be stored on persistent storage (such as a solid-state drive (SSD) or a rotating disk-based storage device).

When a packet such as 371A is received at the PTN 320, the flow identifier F1 of that packet may be determined from the headers of the packet, and a cache lookup may be performed based on F1 (e.g., using a hash function). In the example scenario shown in FIG. 3, a rewrite entry 351 may be found in the cache 322 corresponding to flow F1, indicating that a multicast operation is to be performed. Based on the packet replication parameter and/or the destination selection parameter in rewrite entry 351, the PTN 320 may generate and send some number of packets 377A to respective members of the multicast group associated with rewrite entry 351. Later, a second packet 371B of flow F1 may be received, and rewrite entry 351 may be re-used to generate and send some number of packets 377B corresponding to received packet 371B. Similarly, when packet 372A of a different flow F2 is received, an entry 352 may be found for flow F2 in cache 322, indicating that source address substitution is to be performed for flow F2. Accordingly, a different source address and/or port may be selected for the transformed packet 378A corresponding to received packet 372A. Cache entry 352 may be re-used for another packet 372B of flow F2, and a corresponding transformed packet 378B may be sent with a modified source address and/or port. In the depicted embodiment, rewrite entries corresponding to various different requirement categories (e.g., multicast, source address substitution, anycast, load balancing, protocol changes and the like) may be stored in cache 322 and re-used as needed.

When packet 373 of flow F3 is received, a cache miss 353 occurs in the depicted example scenario. PTN 320 may then use one or more attributes of the packet 373 (e.g., an indication of the particular client on whose behalf packet 373 was sent, in addition to the identifier F3 itself) to select a particular node at the flow state tracking tier to which a cache miss indicator 379 is sent. The flow state tracking node may itself maintain a similar cache in some embodiments, and respond with a rewrite entry for F3 if one is found in its cache. If no entry for F3 is found at the flow state tracking tier, a request for an entry may be sent to a selected node of the rewriting decisions tier. Such a node may generate a new rewrite entry for F3 (or at least one or more rewrite directive elements of the kind shown in FIG. 2) if required, replicate it at one or more additional nodes of the rewriting decisions tier, and initiate the transmission of the new rewrite entry back to the PTN 320. If cache 322 happens to be full when the new rewrite entry is received, a cache replacement algorithm may be employed to select an entry to be overwritten in various embodiments—e.g., a least-recently-used algorithm may be used in some embodiments. As described below with respect to FIG. 4, in some embodiments a number of metadata elements indicative of the state of a given flow may be stored at the PTN, e.g., as part of a rewrite entry for that flow in cache 320 or in a separate data structure. Such metadata may be sent, e.g., in raw or aggregated/summarized form in metadata updates 392 to the flow state tracking tier from the PTN 320.

Example Rewrite Entry Contents

Figure 4:
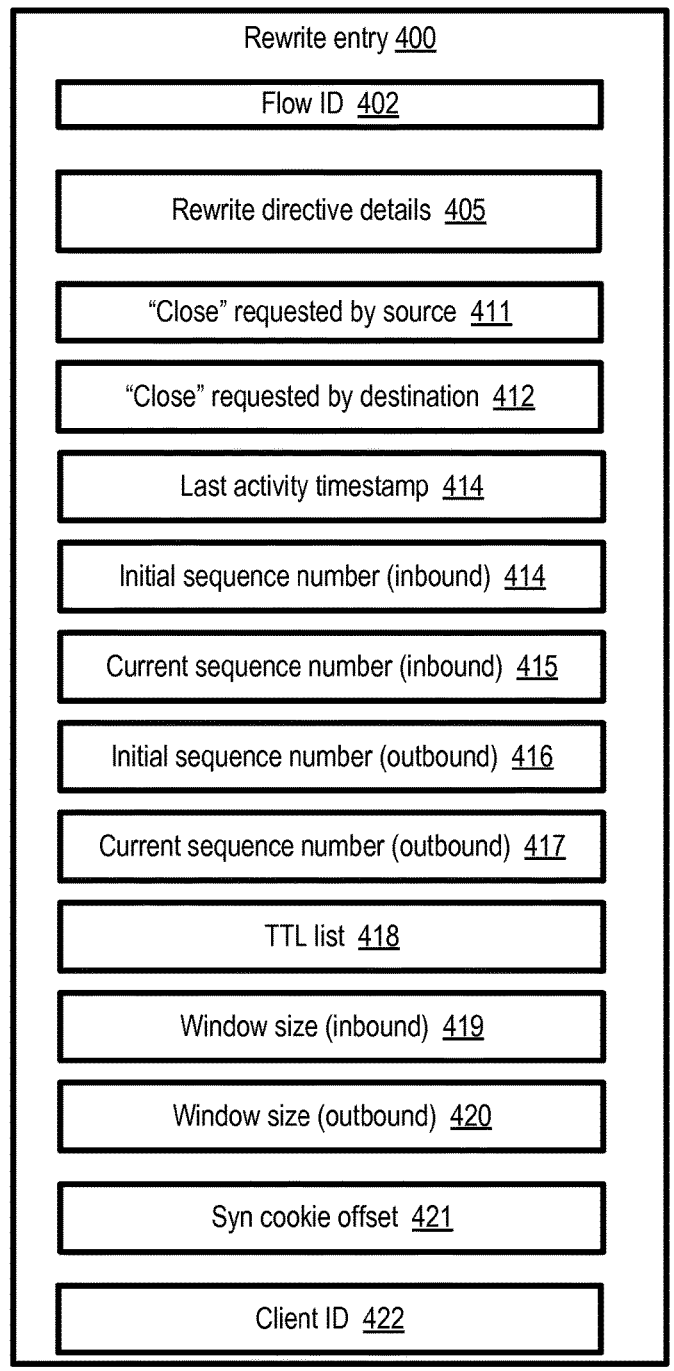
FIG. 4 illustrates example elements of a rewrite entry, according to at least some embodiments.

FIG. 4 illustrates example elements of a rewrite entry, according to at least some embodiments. Rewrite entry 400 may be generated for a particular flow, and the corresponding flow identifier 402 may be explicitly or implicitly indicated within the entry in the depicted embodiment. An indication of the category of packet transformation being implemented for the flow (e.g., multicast, anycast, etc.) and the details of the rewriting directives (e.g., the particular source or destination addresses to be used for the transformation packets, etc.) to be implemented may be stored in element 405. Respective indications 411 and 412 as to whether either the source or destination has requested a "close" of a connection established between them may be included in rewrite entry 400 in the depicted embodiment. A last activity timestamp 413 may be included in the rewrite entry in some embodiments, which may for example be useful in cache replacement operations if an LRU algorithm is being used, and may also be useful in detecting whether a particular flow may have reached an error state (e.g., if no activity has been observed for a long time).

A number of entries with respect to sequence numbers which may be used in some networking protocols may be included in the rewrite entry 400 in some embodiments. These entries may include, for example, the initial and current sequence numbers 414 and 415 respectively for inbound packets (e.g., packets received at the FMS from the sources or traffic origins associated with the flow), as well as the initial and current sequence numbers 416 and 417 for outbound packets (e.g., packets received at the FMS from traffic responders).

In some embodiments, the rewrite entries may also include metadata elements which can be used to detect and/or respond to one or more kinds of denial of service attacks. The IP TTL (time-to-live) value is a measure of how many hops a packet has traversed to reach the FMS. For the vast majority of legitimate flows, the IP TTL is very unlikely to change among the different packets of a given flow. For a small fraction of legitimate flows, there may be a few distinct TTL values. Thus, by tracking up to some small number N (e.g., four) unique IP TTL values per flow and rejecting packets with other TTLs, it may be easy to filter out packets associated with at least some types of denial of service attacks. Accordingly, a TTL list 418 with some configurable number of distinct TTL values seen for the flow may be maintained in the rewrite entry 400 in some embodiments. A denial of service attack may sometimes involve so-called "ACK Floods", in which large numbers of TCP packets with their "ACK" bits set may be sent to the FMS. ACK floods may be handled at least in part by dropping packets that do not have a matching rewrite entry in some embodiments. It may possible to make this defense more effective by also tracking the TCP window size in either direction (e.g., using entries 419 and/or 420 in the depicted embodiment), and rejecting packets that are too far from the valid TCP transmission window. Denial of service attacks may also comprise illegitimate TCP SYN packets in some cases. Mitigating this type of attack may include responding to SYN packets with "SYN cookies". SYN cookies are SYN|ACK response packets that have a cryptographically generated sequence number. Denial of service attackers may typically ignore this response, but a legitimate sender (i.e., an entity that is not participating in a denial of service attack) may typically reply to it. If and when a reply to such a SYN/ACK response packet is received, the sender may be deemed to be legitimate. In at least some embodiments, a SYN cookie offset 421 may be included in a rewrite entry 400 to enable the packet transformation node to modify the sequence and/or acknowledgement numbers of transformed packets in accordance with the use of a SYN cookie.

In the embodiment depicted in FIG. 4, a client identifier 422 (e.g., an account identifier or customer identifier associated with the sources and/or destinations of the flow) may also be maintained in the rewrite entries. In some implementations in which at least some of the packets received at the FMS include such client identifiers, the packet transformation nodes may verify that the client identifiers in the received packets match those stored in the rewrite entry 400, and may reject packets which do not indicate the expected client identifier. It is noted that in various embodiments, one or more of the elements shown in FIG. 4 may not be stored in the rewrite entries—e.g., if defending against denial of service attacks is not a priority for some FMS customers, the TTL list, window size, or SYN cookie offset may not be required in the corresponding rewrite entries. The particular kinds of metadata to be included in the rewrite entries associated with a given packet processing requirement may be determined in some embodiments by the rewrite decisions nodes based on control-plane interactions with FMS clients. In such embodiments, the rewrite directives sent to the packet transformation tier may include an indication of the metadata collection requirements (e.g., in the form of saved metadata entry list 245 of FIG. 2).

FMS Node Groups

Figure 5:
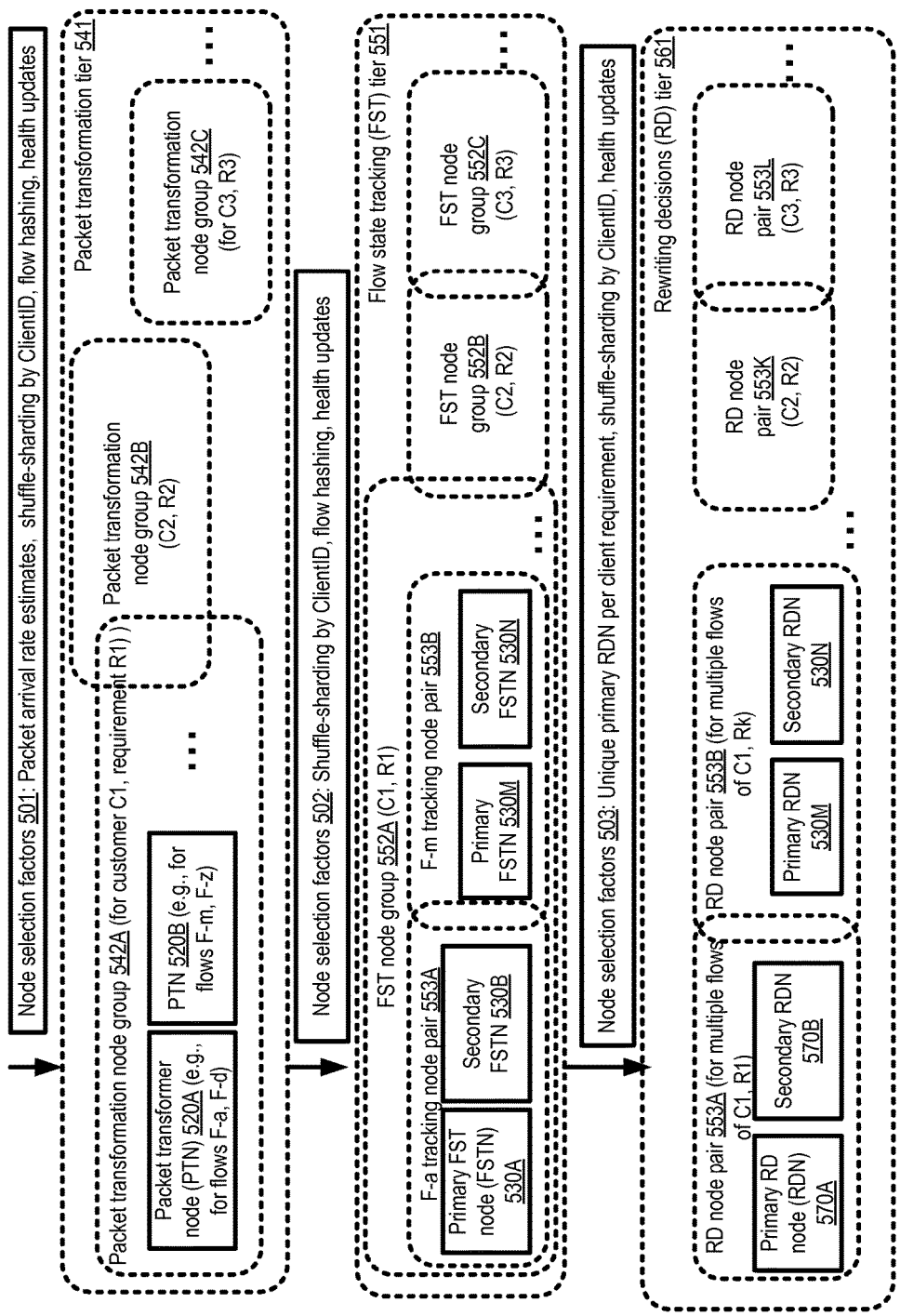
FIG. 5 illustrates examples of the grouping of nodes at various tiers of a flow a management service for respective packet transformation requirements, according to at least some embodiments.

FIG. 5 illustrates examples of the grouping of nodes at various tiers of a flow a management service for respective packet transformation requirements, according to at least some embodiments. In illustrated scenario, one or more control plane programmatic interfaces may be invoked by customers or clients of the FMS (or customers of services which can be accessed via the FMS) to indicate their particular packet processing requirements. The interactions between customers and the FMS control-plane may indicate, for example, the type of packet transformations desired, the volume of packet processing expected (e.g., an approximate arrival rate of packets for which transformations are required per second or per day), the set of traffic origins involved and/or the set of destinations or traffic responders involved. In some implementations, as described below in further detail, one or more virtual network interfaces may be established for the customer's packet processing requirements, and a request for the virtual network interface(s) or for one or more endpoints associated with the virtual network interface(s) may directly or indirectly indicate the traffic levels expected to be handled. A number of factors 501 may be taken into consideration when determining how many (and which specific) nodes are assigned to a given client's packet processing requirement. The factors may include, for example, the expected packet arrival rate for processing, the size of the traffic origin set, the size of the traffic responder set, etc. In at least some embodiments, the fleet of packet transformation nodes may be partitioned or sharded into client-specific subsets using a technique called shuffle sharding based on a client identifier or customer identifier (e.g., an account identifier used for billing customers of the service). In one implementation of shuffle sharding, the particular subset of nodes selected from a larger set of nodes for a particular customer or requirement may be selected at random, and individual nodes may be shared among multiple customers. Individual nodes of the packet transformation tier may be selected for a given packet based on flow hashing—e.g., a hash function may be applied to the flow identifier and one node of the client's partition may be selected based on the result of the hash. Information regarding the health status of various nodes may also be used—e.g., if the first node identified using flow hashing appears to be unavailable or unresponsive, a different node may be chosen according to some predefined criterion.

In the depicted embodiment, using some combination of such factors 501, a respective group of packet transformation nodes may be assigned to each packet processing requirement—e.g., PTN group 542A may be designated to handle customer C1's requirement R1, PTN group 542B may be assigned to handle customer C2's requirement R2, and PTN group 542C may be associated with customer C3's requirement R3. A given PTN may be assigned to several different groups 542—e.g., at least in some cases, more than one packet processing requirement, potentially for more than one client or customer, may be handled at a given PTN. The number of nodes within a particular PTN group 542 may be determined based at least in part on an estimate of the rate at which packets are to be processed—e.g., if a group of k PTNs are allocated for a packet processing requirement of X million packets per hour, 4K PTNs may be allocated for a packet processing requirement of 4X million packets per hour. In some embodiments, the number of PTNs allocated for a given requirement may be dynamically modified as needed. Within a given PTN group, individual PTNs 520 may be used for respective sets of flows using flow hashing in some embodiments: e.g., in group 542A, PTN 520A may be selected for flows F-d and F-a, while PTN 520B may be selected for flows F-m and F-z.

In at least some embodiments, a PTN 520 may be able to determine a customer identifier or client identifier corresponding to any given received packet (e.g., such an identifier may be explicitly indicated in the packet itself, or deduced/inferred based on the source or destination address information). In some environments in which packets to be transformed are generated at, or sent by the PTN to, entities within a particular isolated virtual network (IVN) as described below in further detail, an identifier of the IVN (which may be included in the un-transformed packets) may serve as a customer identifier or client identifier. In the depicted embodiment, PTNs 520 of tier 541 may be able to determine the particular nodes of the flow state tracking tier 551 to be used for a given flow based on any combination of several factors 502. For example, a shard or partition of the fleet of the flow state tracking (FSTN) fleet may be identified for each customer (in a manner similar to the way PTN groups are selected, e.g., using shuffle sharding), and then flow hashing may be used within that partition to select a pair of FSTNs to act as primary and secondary nodes at tier 551 for a particular flow. The health status of the flow state tracking nodes may also be used when assigning FSTNs for various flows. In the depicted example, node group 552A has been assigned to customer C1's packet processing requirement R1, node group 552B has been assigned to customer C2's requirement R2, and node group 552C has been assigned to customer C3's requirement R3. Within node group 552A, node pair 553A comprising FSTN 530A as primary and FSTN 530B as secondary has been allocated for a particular flow F-a, while node pair 553B comprising FSTN 530M as primary and FSTN 530N as secondary have been assigned to a different flow F-m. In the depicted embodiment, the secondary FSTN of a node pair 533 may be configured to take over the responsibilities of the primary in the event of a failure of the primary, and may also be used for replicating rewrite entries or flow metadata at the flow state tracking tier. In some embodiments, at least some of the node groups and/or node pairs at the FST tier may overlap— e.g., a given FSTN may be used for several different clients/customers, several different packet processing requirements, and/or in multiple roles (e.g., primary for one flow and secondary for another). In at least one embodiment, the nodes at the flow state tracking tier need not necessarily be assigned primary or secondary roles.

At the rewriting decisions tier 561, a particular rewriting decisions node (RDN) may be assigned the role of primary RDN for each packet processing requirement, e.g., from among a group of RDNs identified using shuffle sharding based on client/customer identifiers and/or RDN health state updates, as indicated in the list of factors 503. Thus, the decision or decisions made for multiple flows of C1's requirement R1 may be handled at node pair 553A, with RDN 570A designated as the primary and RDN 570B designated as the secondary. A rewriting directive or rewrite entry generated at the primary RDN of a node pair 553 may be replicated at the secondary RDN of that node pair before it is sent back (e.g., via the FST tier) to the PTN or PTNs where the rewriting directive is implemented. RDN pair 553B may be allocated for a different packet processing requirement Rk of customer C1 in the depicted example. Additional RDN pairs such as 553K and 553L may be set up for other packet processing requirements. In various embodiments, the rewriting decisions fleet may be partitioned based on the requirements (rather than on a per-flow basis) because at least for some types of packet processing requirements, consistent decisions may be required for multiple flows. Thus, for example, for source substitution, where a unique (substitute source IP address, substitute source port) combination is to be selected for each of several flows from a set of substitute IP addresses and ports, the uniqueness of the choice may be hard to enforce if the packet rewriting decisions for different flows are made at different RDNs. As with the nodes of the other tiers, a given RDN may be used for decisions associated with multiple requirements of multiple customers in the depicted embodiment, and may play primary and/or secondary roles for several different requirements concurrently. In some embodiments, a primary and secondary node may be assigned to each flow at the packet transformation tier as well, with the secondary configured to pick up the responsibilities of the primary as and when needed.

Portfolio of Packet Processing Techniques

Figure 6:
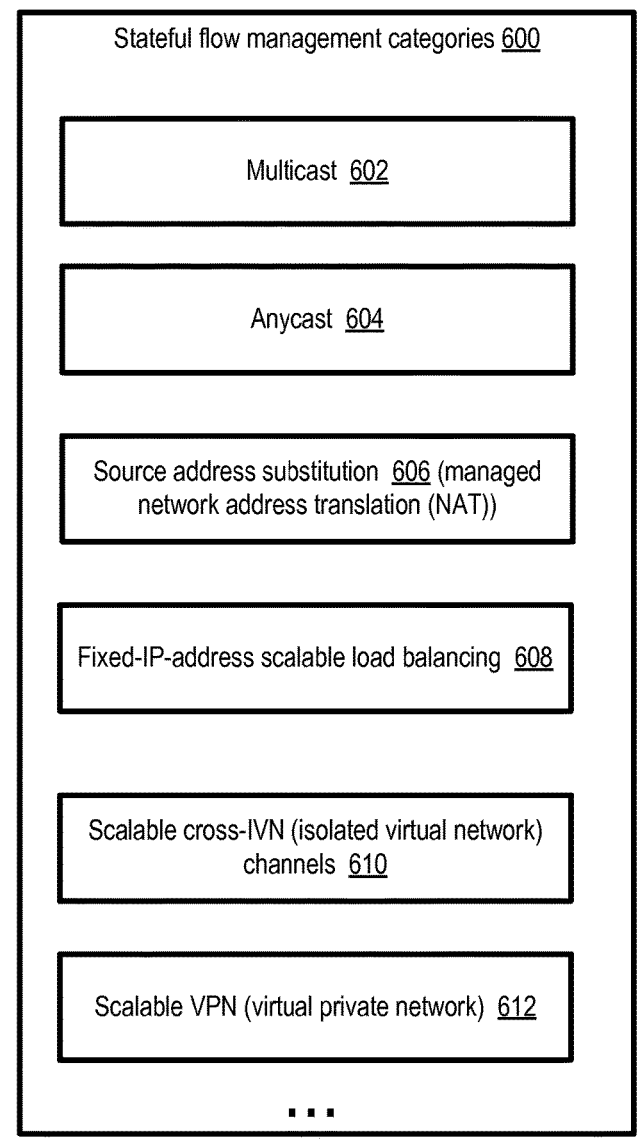
FIG. 6 illustrates example categories of packet processing that may be supported at a flow management service, according to at least some embodiments.

FIG. 6 illustrates example categories of packet processing that may be supported at a flow management service, according to at least some embodiments. As shown, the portfolio 600 of supported types of stateful flow management in the depicted embodiment may include, for example, multicast 602, stateful anycast 604, source address substitution 606 (which may also be referred to as managed network address translation (managed NAT)), fixed-IP-address scalable load balancing 608, scalable cross-IVN (isolated virtual network) channels 610, scalable VPN (virtual private network) 612 and the like. Other types of packet processing applications may be supported in various embodiments. In general, the flow state management system may be configurable to implement any desired type of packet transformations, with nodes being assignable dynamically at each tier to support a large range of traffic rates in a transparent and scalable manner.

Generally speaking, multicast is a networking technique in which contents (e.g., the body) of a single packet sent from a source are replicated to multiple destinations of a specified multicast group. In contrast, stateful anycast may involve selecting, for all the packets of a given flow that are received at the flow management service, a particular destination from among a specified set of destinations (e.g., regardless of workload level changes). Source address substitution, as the name suggests, involves replacing, for the packets of a particular flow, the source address and port in a consistent manner. Fixed-IP-address load balancing allows a particular IP address to be continue to be used as a load balancer address for an application, despite replacements of the virtual and/or physical machines being used as the load balancer by other load balancers.

In some embodiments, as described below in greater detail, the flow management service may be implemented at a provider network in which isolated virtual networks can be established. For example, an isolated virtual network (IVN) may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN. In various embodiments, the flow management system may act as intermediary or channel between the private address spaces of two or more different IVNs, in effect setting up scalable and secure cross-IVN channels 610. In at least some embodiments, the flow management service may also or instead be used to support scalable VPN connectivity between some set of resources within a provider network and one or more client networks or client premises outside the provider network.

Figure 7:
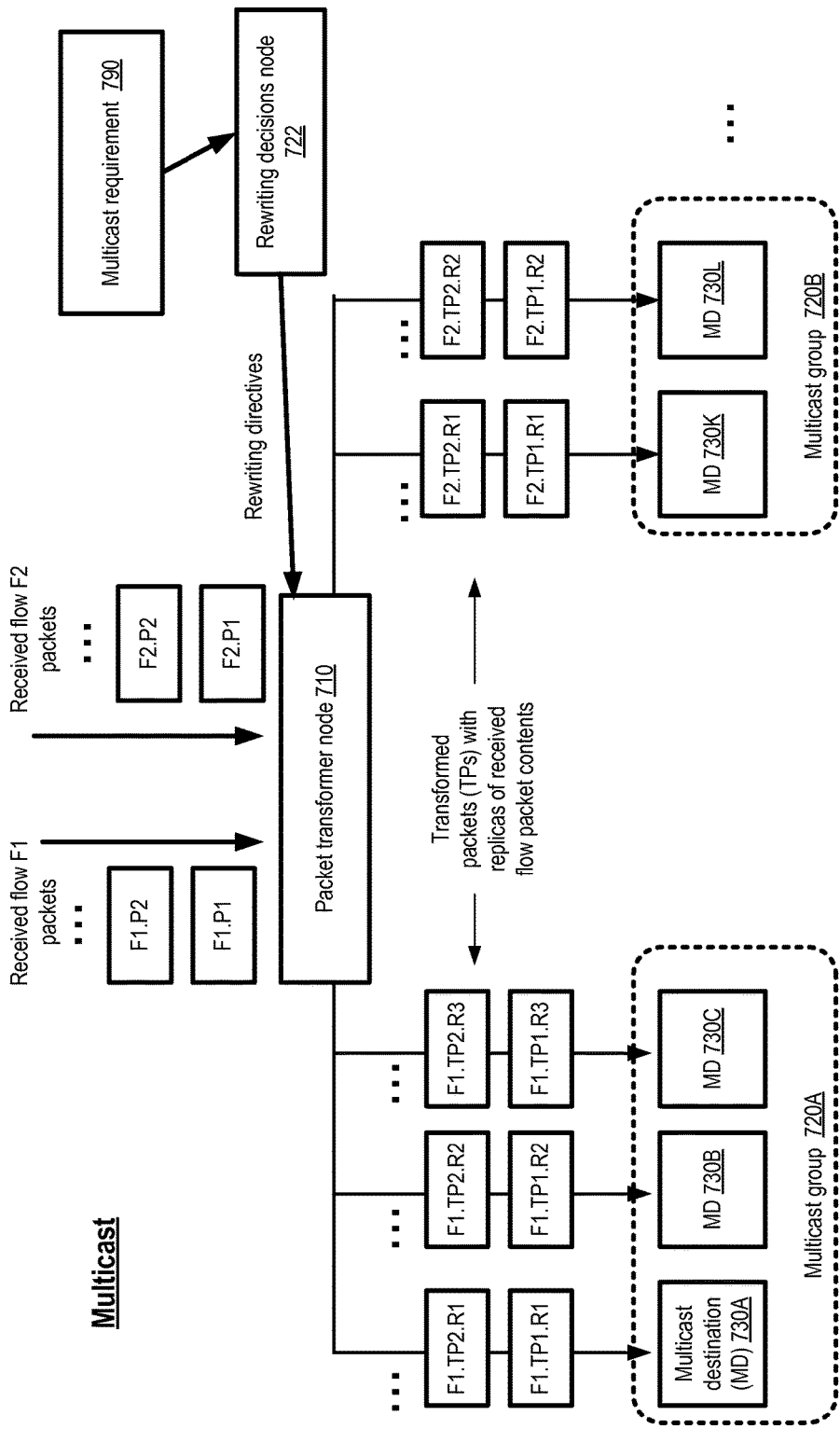
FIG. 7 illustrates an implementation of multicast at a flow management service, according to at least some embodiments.

FIG. 7 illustrates an implementation of a multicast technique at a flow management service, according to at least some embodiments. One or more multicast groups 720, such as multicast group 720A and multicast group 720B, may be set up in the depicted embodiment, e.g., at the request of respective clients or the same client. Each multicast group 720 may comprise some number of destinations 730 which are all to be provided respective replicas or copies of some or all of the contents of packets belonging to respective flows and received at the flow state management service. Thus, for example, multicast group 720A includes destinations 730A, 730B and 730C, while multicast group 720B includes destinations 730K and 730L. Information regarding the multicast group members may be included in the multicast requirement specifications 790 accessible to a rewriting decisions node 722, which may generate corresponding rewriting directives for various flows and propagate the directives to the packet transformation tier. For each packet of a given flow F1, originally directed at an address set up for multicast group 720A, a packet transformer node 710 may generate and transmit three packets in all: one for destination 730A, one for destination 730B, and one for destination 730C. For packet F1.P1 of flow F1 received at PTN 710, transformed packet replicas F1.TP1.R1, F1.TP1.R2, and F1.TP1.R3 may be sent to 730A, 730B and 730C respectively. Similarly, for packet F1.P2 of flow F1, three packets F1.TP2.R1, F1.TP2.R2, F1.TP2.R3 may be sent to 730A, 730B and 730C respectively. For a different flow F2 with multicast group 720A as its intended target, for which PTN 710 is also selected as the transformer node, one packet each may be sent from PTN 710 to destinations 730K and 730L corresponding to each received packet such as F2.R1 or F2.R2. In at least some embodiments, the packets may have been transmitted to the PTN using a different network protocol than is used for the transformed packets (e.g., TCP may be used for the packets on their way from their origins to the PTN 710, and UDP may be used for the packets sent to the multicast destinations). In at least some embodiments, an endpoint address of a virtual network interface or a virtual network interface group (both of which are discussed in further detail below) may be used as the destination address for the packets such as F1.P1 and F1.P2 that are received at the packet transformer 710.

Figure 8:
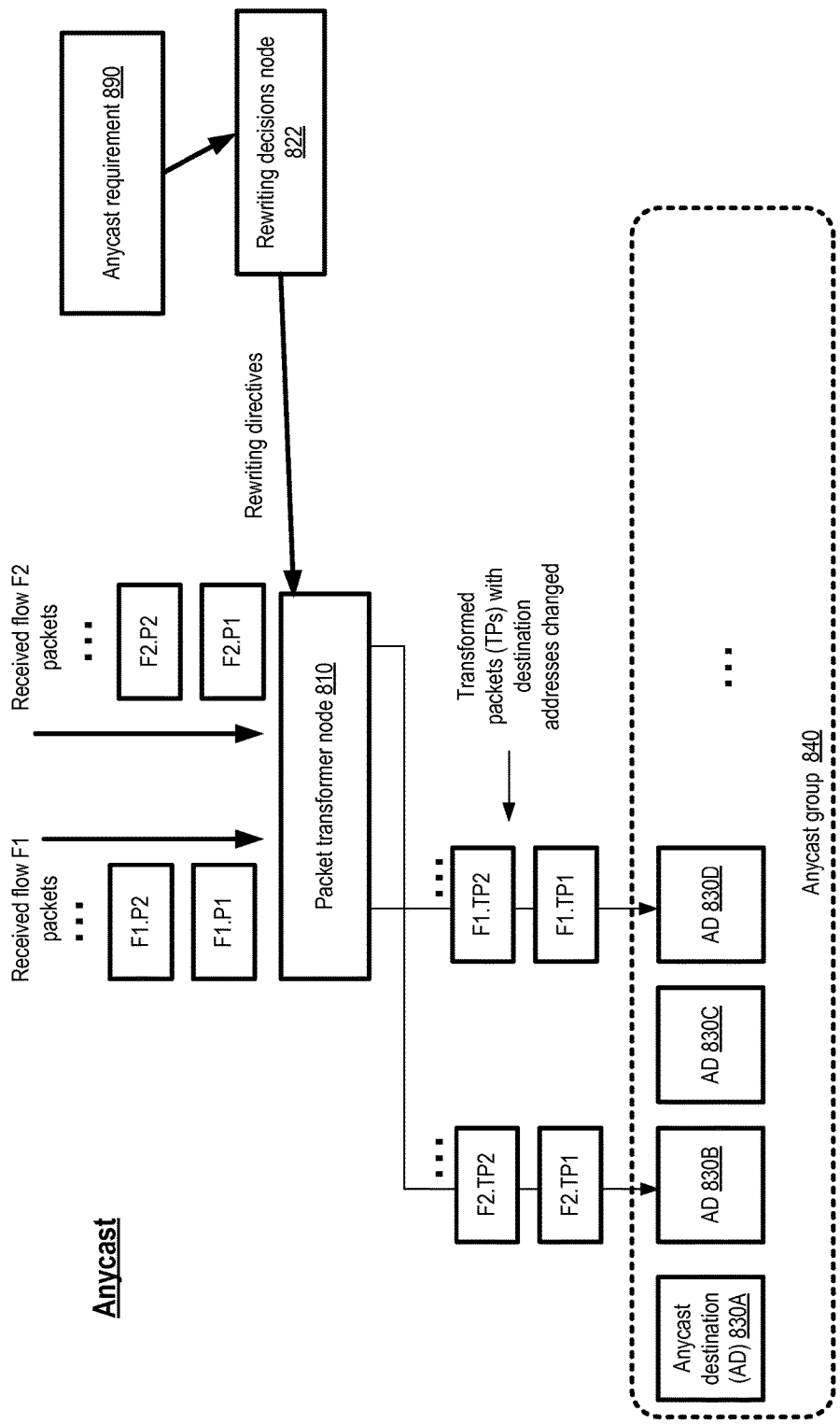
FIG. 8 illustrates an implementation of stateful anycast at a flow management service, according to at least some embodiments.

FIG. 8 illustrates an implementation of a stateful anycast technique at a flow management service, according to at least some embodiments. In anycast, a particular destination from an anycast group may be selected consistently as the destination for all the packets belonging to a particular flow. Anycast may differ from traditional load balancing in that the flow management system may not have to consider workload levels of the destinations, and may not be required to make an attempt to distribute packets or workloads evenly among the destinations. In the depicted example scenario, an anycast group 840 comprising at least four destinations AD 830A-830D has been established, e.g., for a particular application of a client. Information regarding the anycast group members may be included in the anycast requirement specifications 890 accessible to a rewriting decisions node 822, which may generate corresponding rewriting directives for various flows and propagate the directives to the packet transformation tier. When packets belonging to a flow F1 are received at PTN 810, the destination address (which originally may have contained an address associated with the anycast group 840 as a whole) of the incoming packets may be changed to that of a particular anycast destination selected from 830-830D. For all the packets of flow F1, for example, such as F1.P1 and F1.P2, the destination 830D is selected for the respective transformed packets F1.TP1 and F1.TP2 in accordance with a packet rewrite directive generated at the rewriting decisions tier. For packets of flow F2, such as F2.P1 and F2.P2, the corresponding transformed packets F2.TP1 and F2.TP2 are sent to 830B.

Figure 9:
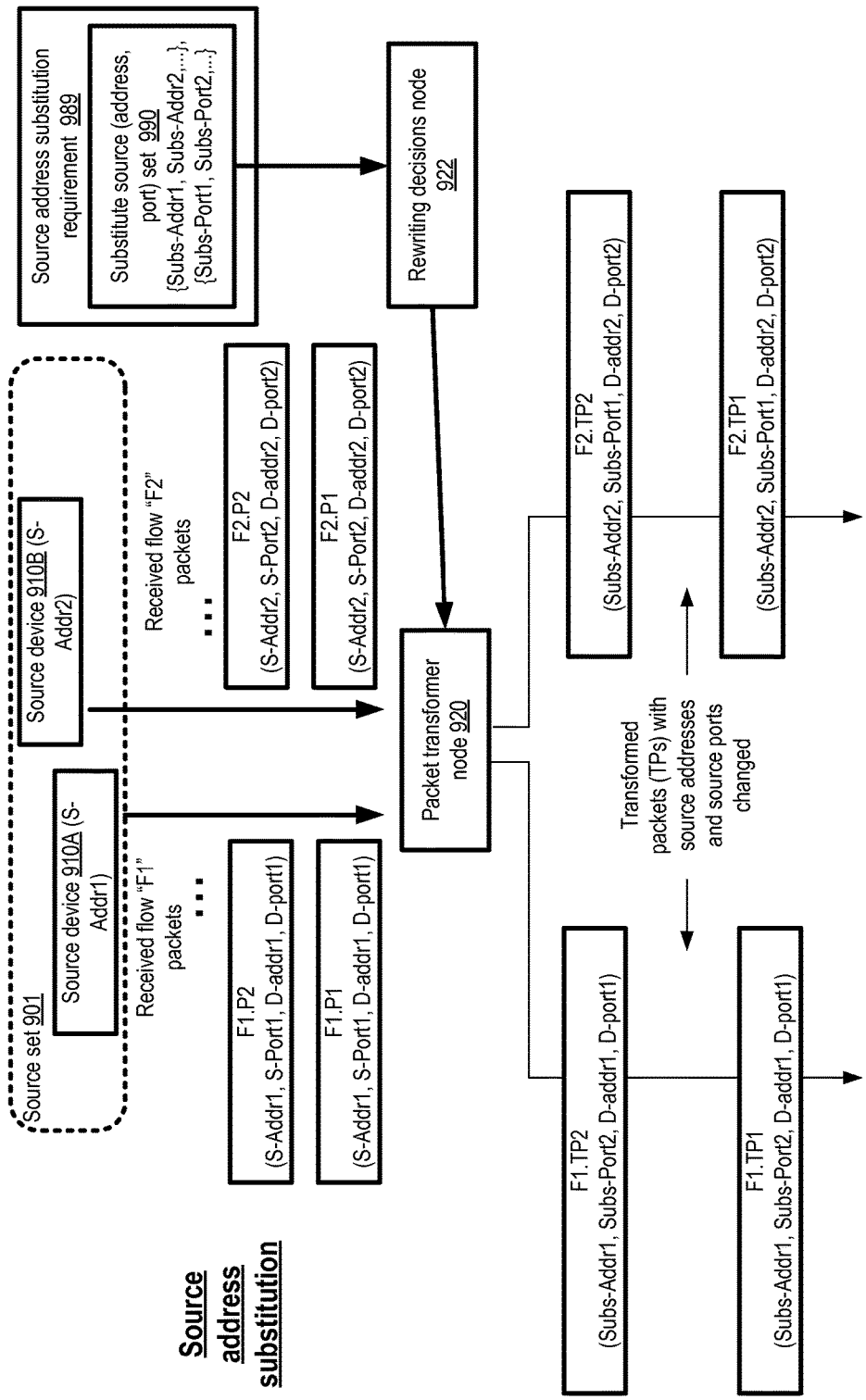
FIG. 9 illustrates an implementation of a stateful source address substitution technique at a flow management service, according to at least some embodiments.

FIG. 9 illustrates an implementation of a stateful source address substitution technique at a flow management service, according to at least some embodiments. In the depicted embodiment, a client of the flow management services has requested that packets that originate at a source set 901, e.g., comprising devices such as 910A (with IP address S-Addr1) and 910B (with IP address S-Addr2) are to be transformed such they appear (to their destinations) to have originated from a different IP address and port combination. For example, source address substitution requirements 989 accessible to a rewriting decisions node 922 may indicate a set 990 of substitute (address, port) options, and a unique substitute source address and port pair may be selected for each flow by the rewriting decisions node 922. A rewriting directive or entry corresponding to that selected pair may be propagated to packet transformer node 920. Based on the directive, the transformed packet F1.TP1 and F1.TP2 corresponding to received packets F1.P1 and F1.P2 respectively may each be provided a source address Subs-Addr1 and source port Subs-Port1, for example. Similarly, the source address and port for each transformed packet of flow F2, such as F2.TP1 and F2.TP2 may be set to Subs-Addr1 and Subs-Port2 in the example scenario shown. It is noted that for some packets, depending on the contents of substitute set 990 relative to the actual source of the packets, only the source port or only the source address may have to be changed. The destination address and port (e.g., D-addr1 and D-port1 in the case of F1 packets, and D-addr2 and D-port2 in the case of F2 packets) remain unchanged in the scenario depicted in FIG. 9. It is noted that techniques involving changes to destination addresses (such as anycast, multicast and/or load balancing) may be applied together with source address substitution for some client requirements, in which case both the source and destination (address, port) combinations may be changed based on the rewriting directives.

Figure 10:
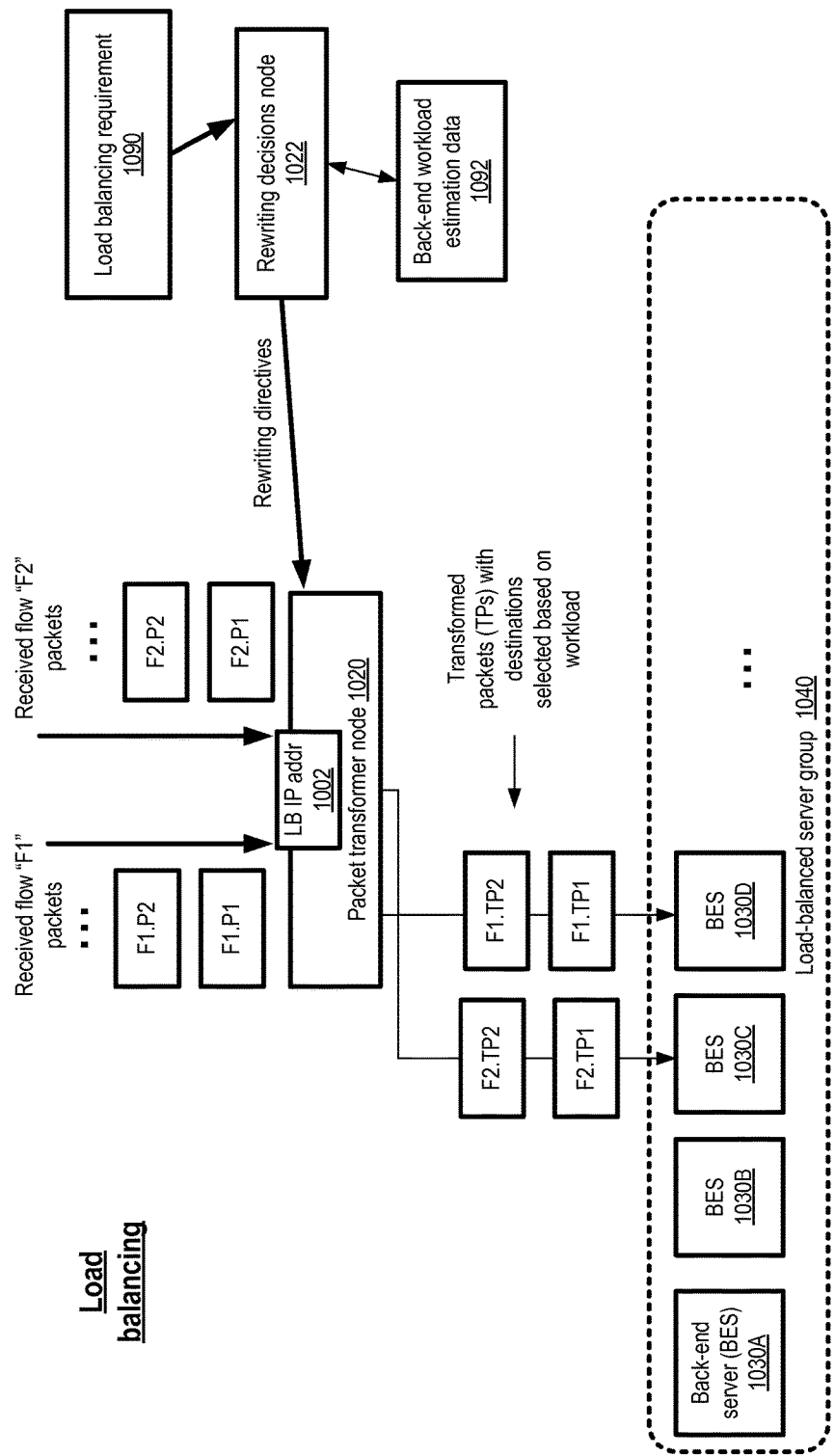
FIG. 10 illustrates an implementation of a load balancing technique at a flow management service, according to at least some embodiments.

FIG. 10 illustrates an implementation of a load balancing technique at a flow management service, according to at least some embodiments. In the depicted embodiment, upon encountering the first packet of a given flow directed to an IP address 1002 designated for a load balancer, the rewriting decisions node 1022 may select a particular back-end server (BES) 1030 (e.g., any one of BESs 1030A-1030D) based on some information or estimate 1092 of the relative workload levels of the different BESs of a server group 1040. The particular load balancing technique used, and/or the sources from which workload information regarding various server groups 1040, may differ in different embodiments. A corresponding rewriting directive may be provided to PTN 1020. In at least some embodiments, instead of attempting to collect information from the BES groups indicated in load balancing requirement specifications 1090, the rewriting decisions nodes such as 1022 may maintain records of the flows they have already assigned to various back end servers 1030, as described below in further detail. In other embodiments, such records may be supplemented by measurements collected from the back-end servers, or collected metrics may be used instead of records of previous decisions. In the depicted example scenario, transformed packets of flow F1 (such as F1.TP1 and F1.TP2) are directed to BES 1030D, while transformed packets of flow F2 (such as F2.TP1 and F2.TP2) are directed to BES 1030C. In at least some embodiments, the rewriting directives generated for load balancing may allow a packet transformer node such as 1020 to select from among several different back-end servers; that is, a rewriting directive may not necessarily enforce a selection of just one back-end server for a given flow. Instead, for example, at the time the first packet of a new flow Fj is received, the rewriting directive generated for Fj may indicate N different back-end servers which appear to be lightly loaded based on the workload estimation data 1091 currently available, and the PTN 1020 may select (e.g., at random) from those N servers.

As mentioned earlier, in at least some embodiments other types of packet processing techniques may be supported by a flow management service in addition to those illustrated in FIGS. 7, 8, 9 and 10, such as scalable virtual private network support and the like. Depending on the applications for which packet transformations are needed, combinations of multiple techniques may be used in some cases: e.g., source address substitution may be combined with load balancing, anycast or multicast in some embodiments.

Flow Management for Isolated Virtual Network Traffic

Figure 11:
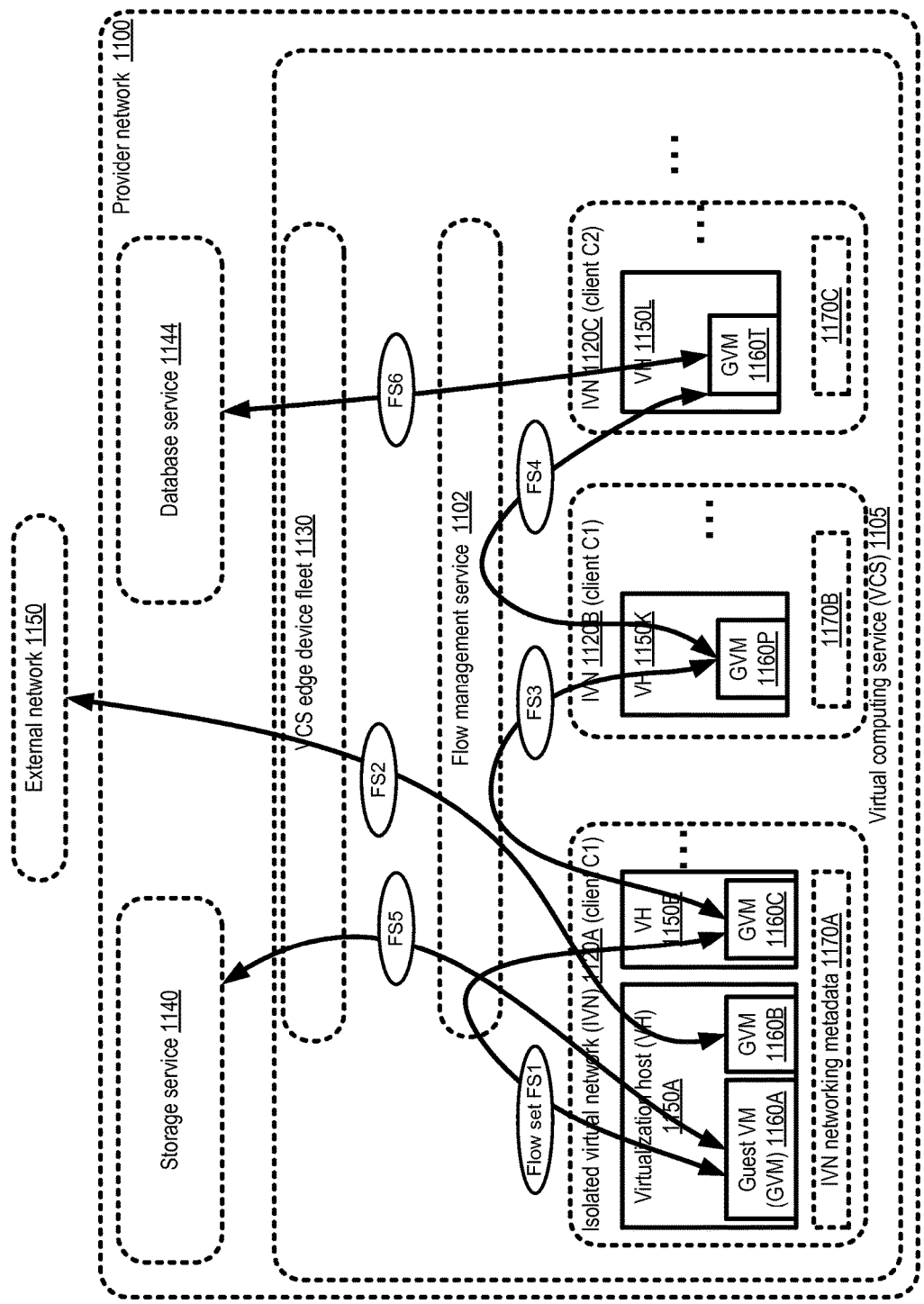
FIG. 11 illustrates examples of network flows which may originate or terminate at guest virtual machines within isolated virtual networks of a provider network, according to at least some embodiments.

In some embodiments, a flow management service may be implemented within a provider network. FIG. 11 illustrates examples of network flows which may originate or terminate at guest virtual machines within isolated virtual networks of a provider network, according to at least some embodiments. Several different network-accessible services may be implemented at provider network 1100 of FIG. 11, including, for example, a virtual computing service (VCS) 1105, a storage service 1140 and a database service 1144. The VCS may comprise a plurality of virtualization hosts (VHs) 1150, such as 1150A, 1150B, 1150K and 1150L in the depicted embodiment, at each of which one or more guest virtual machines (GVMs) 1160 may be instantiated on behalf of one or more VCS clients. Each virtualization host may also include other components not shown in FIG. 11, such as a virtualization management stack (VMS) comprising a hypervisor and/or an administrative-domain operating system, with the VMS acting as an intermediary between the GVMs of the host and the hardware components of the host.

In at least some embodiments, the VCS may support the capability of setting up isolated virtual networks (IVNs) on behalf of various clients. Each IVN 1120 may include a respective subset of resources of the VCS, over whose networking configuration the client is granted substantial flexibility. For example, IVN 1120A (established for client C1) includes VHs 1150A and 1150B in the depicted embodiment, IVN 1120B (also set up for client C1) includes VH 1150K, and IVN 1120C (set up for client C2) includes VH 1150L. A given client such as C1 may establish multiple IVNs for various purposes—e.g., IVN 1120A may be set up for hosting a web application for access from external networks such as network 1150 (which may for example include portions of the public Internet and/or a client-owned network), while IVN 1120B may be set up for the development of the web applications. Generally speaking, the VCS may allow the traffic associated with a given IVN to be isolated or separated from the traffic associated with any other IVN, unless of course the clients for whom the IVNs are established indicate otherwise. With respect to a given IVN, the client may make various networking decisions such as IP address assignment, subnet configuration and/or enforcement of security rules regarding incoming and outgoing traffic independently of the corresponding decisions made with respect to other IVNs. For example, a particular private IP address which is assigned to a GVM 1160B at VH 1150A of IVN 1120A may also happen be assigned to GVM 1160T at VH 1150L of IVN 1120C. Thus, with respect to many aspects of network management, each IVN may effectively be treated by the corresponding client as a standalone network such as one which may be established at the client's private data center. Each IVN may have an associated set of networking metadata 1170 in the depicted embodiment, such as 1170A for IVN 1120A, 1170B for IVN 1120B, and 1170C for IVN 1170C. IVNs may also be referred to as virtual private clouds in some environments.

In the embodiment depicted in FIG. 11, a flow management service 1102 may be implemented at least in part for traffic originating at or directed to the guest virtual machines 1160. The networking metadata 1170 of an IVN may include addresses for the packet transformation nodes of service 1102 for various packet processing requirements associated with the IVN in the depicted embodiment. For example, if source address substitution is to be implemented for packets originating at GVMs of IVN 1120A, in some embodiments a gateway for outbound traffic may be configured at IVN 1120 specifically for those packets. The metadata 1170A may include an indication of one or more IP addresses assigned to the gateway, which may be mapped to one or more packet transformation nodes of FMS 1102, e.g., using virtual network interfaces as described below in further detail. Similarly, the IVN networking metadata may include indications of the interfaces and/or addresses of the FMS which are to be used for other types of packet processing applications, including multicast, anycast and the like.

Some types of packet transformations may be required for traffic originating and terminating within a given IVN, such as flow set FS1 which comprises packets flowing between different GVMs of IVN 1120A (e.g., 1160A and 1160C). Other types of transformations may be implemented with respect to flows (such as FS2) originating at external networks such as 1150 and destined for GVMs such as 1160B within one or more IVNs as indicated by the arrow labeled FS2. For example, an application may be implemented at GVM 1160B, and client requests directed to that application may originate at various devices on the public Internet. Response to such requests may travel in the opposite direction—e.g., from GVM 1160B to the public Internet. Request packets as well as response packets may pass through the flow management service 1102 in the depicted embodiment. In at least some embodiments, a fleet of VCS edge devices 1130 may be used as intermediaries between the VCS and other services or external networks 1150. The VCS edge devices may be responsible for implementing an encapsulation protocol used at the VCS in some embodiments, e.g., for directing packets addressed to a particular GVM 1160 to a NIC (network interface card) associated with a virtualization management stack at the GVM's virtualization host. The VCS edge devices and the virtualization management stacks at various virtualization hosts may both be considered examples of FMS client-side components in the depicted embodiment.

As mentioned earlier, in some embodiments the FSM 1102 may be used as a scalable and secure channel for traffic between IVNs. For example flow set FS3 comprises packets transmitted between IVNs 1120A and 1120B of the same client C1 via FSM 1102, while flow set FS3 comprises packets transmitted between the IVNs of two different clients (IVN 1120B of client C1 and IVN 1120C of client C2). In some embodiments in which the FSM 1102 is to serve as a conduit between two different clients' IVNs, both clients may have to approve the establishment of connectivity before the FSM starts processing the cross-IVN packets. The FSM may also be used for packet flows between different services of the provider network in some embodiments. For example, flow sets FS5 and FS6 between IVNs of the VCS and other services such as database service 1144 or storage service 1140 may be processed at FMS 1102 in the depicted embodiment. It is noted that not all the GVMs of the VCS may be assigned to clients of the VCS; some GVMs may be used for internal purposes in various embodiments. In at least one embodiment, as mentioned earlier, some GVMs may be used for the nodes at one or more tiers of the FMS.

Multiplexed Virtual Network Interfaces for Flow Management

In some embodiments, a virtual computing service may enable users to associate virtual network interfaces (VNIs) with their GVMs. A VNI may comprise a logical entity with a set of networking and security-related attributes that can be attached to (or detached from) a GVM programmatically. For example, at least one IP (Internet Protocol) address "IPaddr1" may be assigned to a given virtual network interface VNI1, and security rules restricting inbound and outbound traffic may be set for VNI1. When that VNI is programmatically attached to a given GVM (GVM1) launched at a virtualization host with a physical network interface card NIC1, network packets indicating IPaddr1 as their destination address (and complying with the security rules) may be received at GVM1 via NIC1. In addition, outbound packets generated at GVM1 may indicate IPaddr1 as their source address and may be physically transmitted towards their destinations via NIC1. If VNI1 is then programmatically detached from GVM1 and attached to GVM2 (which is executing at a different virtualization host with a different physical network interface card NIC2), the IPaddr1 traffic that was previously being received at GVM1 may now be received at GVM2, with the same security rules in place. Support for virtual network interfaces may considerably simplify network configuration tasks for customers using the virtual computing service.

Figure 12:
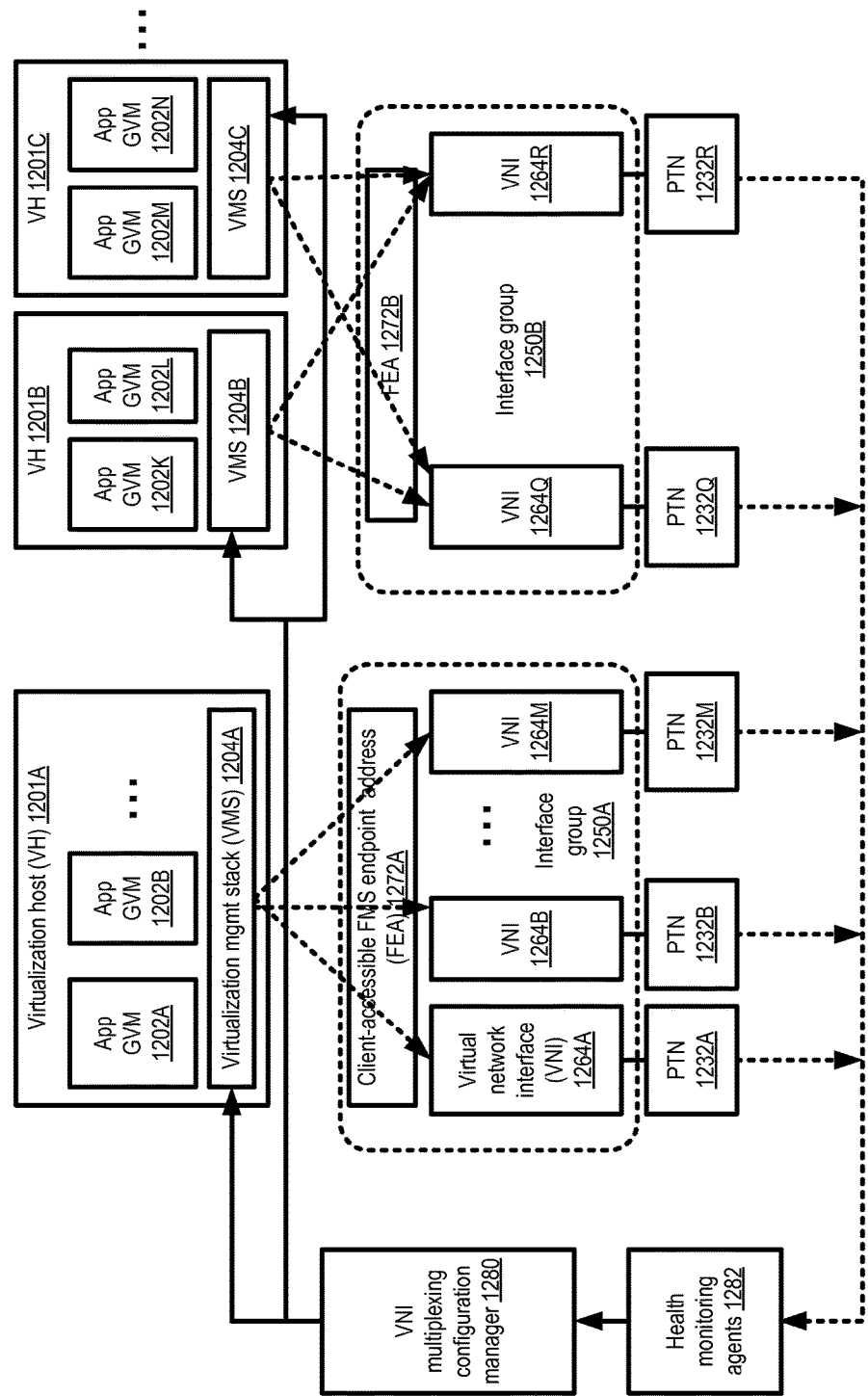
FIG. 12 illustrates a use of a virtual network interface multiplexing technique at a flow management service, according to at least some embodiments.

As mentioned earlier, in some embodiments, some or all of the nodes of an FMS may be implemented at respective GVMs. In at least some embodiments, VNIs may be multiplexed to help balance network traffic across multiple GVMs, such as a set of nodes of the packet transformation tier of an FMS which are assigned to a given client's packet processing requirements. FIG. 12 illustrates a use of a virtual network interface multiplexing technique at a flow management service, according to at least some embodiments. In the embodiment shown in FIG. 12, a VNI multiplexing configuration manager 1280 has set up two interface groups (IGs) 1250A and 1250B. Each IG 1250 comprises a plurality of VNIs in the depicted embodiment, and each IG has a respective client-accessible FMS endpoint address (FEA) 1272 (e.g., 1272A and 1272B). In at least some embodiments, a respective IG 1250 may be established for each packet processing requirement: e.g., one IG may be used for multicasting packets to the members of a multicast group, another IG may be used for load balancing among a set of back-end servers, and so on. In at least one embodiment, the FMS endpoint address (which may, for example, be provided to a customer of the virtual computing service in response to an invocation of a programmatic interface indicating a particular packet processing requirement) may in effect serve as an identifier of the packet processing requirement. The endpoint address may be utilized, for example, at a rewriting decisions node to determine the requirement and generate corresponding rewriting directives, and/or at various tiers to identify the particular set of nodes assigned for a given packet processing requirement. The endpoint address may be indicated as a destination address in a packet directed to the packet transformation tier of the FMS in some embodiments. IG 150A, for example, includes VNIs 1264A, 1264B, . . . , 1264M, and FEA 1272A usable by applications running at GVMs 1202A and 1202B of virtualization host 1201A. The GVMs at which customer applications which require packet processing of the kinds discussed above run are labeled "App" GVMs in FIG. 12. IG 1250B includes VNIs 1264Q and 1264R, and has FEA 1272B that is usable by applications running at App GVMs 1202K, 1202L, 1202M and 1202N at virtualization hosts 1201B and 1201C. Each VNI 1264 is shown attached to a respective packet transformation node (PTN) 1232. For example, VNI 1264A is attached to PTN 1232A, VNI 1264 is attached to PTN 1232B, and so on. The attributes of individual VNIs 1264 are discussed in further detail below with respect to FIG. 13.

Generally speaking, any number of App GVMs 1202, instantiated at any number of virtualization hosts 1201 of a virtual computing service, may be provided the FEA (or FEAs, in embodiments in which multiple FMS endpoint addresses may be assigned to a single interface group) of any given interface group 1250. The FEAs 1272 may, for example, be provided to the App GVMs for a back-end service for which the PTNs 1232 act as intermediaries. In the example illustrated in FIG. 12, network packets containing service requests, with headers indicating FEA 1272A as the destination for the packets, may be generated at App GVMs 1202A and/or 1202B. Such packets may be referred to as "baseline packets", herein, e.g., to distinguish them from encapsulation packets that may be generated to transmit the contents of the baseline packets on a network path towards the PTNs. In FIG. 12, such encapsulation packets may be generated at respective virtualization management stacks (VMSs) 1204 of the virtualization hosts 1201. A VMS 1204 may include, for example, a hypervisor and/or an operating system running in a privileged domains (which may be referred to as domain zero or "dom0") in some embodiments. The VMSs 1204 (e.g., 1204A, 1204B or 1204C) may be considered client-side components of the FMS in the depicted embodiment.

Each VMS 1204, such as VMS 1204A at host 1201A, VMS 1204B at host 1201B, and VMS 1204C at host 120C, may be provided configuration metadata for the appropriate set of IGs by the configuration manager 1280. Thus, for example, after VNIs 1264A-1264M have been designated as members of IG 1250A by the configuration manager 1280, a membership list for IG 1250A may be provided to VMS 1204A. Similarly, after designating VNIs 1264Q and 1264R as members of IG 1250B, configuration manager 1280 may provide a membership list for IG 1250B to VMSs 1204B and 1204C. The membership metadata may include, for example, the identifiers and non-public network addresses of each of the VNIs of the IG; in some cases, the membership metadata may include a target selection policy providing guidance to the client-side components on how traffic should be distributed among the IG's VNIs. In some embodiments, the membership metadata may be provided in response to programmatic requests from the VMSs, e.g., in a request to attach a specified IG to one or more App GVMs 1202 or to a VMS 1204. Thus, in such embodiments, it may be possible to programmatically attach not just an individual VNI to a given entity, but also or instead to attach an interface group comprising a plurality of VNIs. In some embodiments, VNIs 1264 may be added to or removed from IGs 1250 over time, e.g., in response to programmatic requests from the clients or services on whose behalf they have been set up. Such changes to the membership of the IGs may also be propagated to the client-side components such as VMSs 1204. In at least some embodiments, multiple IGs may be set up for a given collection of VMSs, and metadata (e.g., membership lists) pertaining to each of the multiple IGs may be propagated to the VMSs of the given collection.

In addition to providing the membership metadata to the VMSs 1204, in at least some embodiments the configuration manager 1280 may also provide health status updates regarding the set of PTNs 1232 associated with the appropriate IGs 1250 to VMSs 144. Such health state information may be obtained, for example, by health monitoring agents 1282 (e.g., nodes of the health checker fleets 150 shown in FIG. 1) from the various PTNs 132, the hosts at which the PTNs are launched, and/or other components of the provider network.

After the IG membership metadata corresponding to a given packet processing requirement has been received at the VMSs 1204, the distribution of packets by the VMSs among IG members may begin in the depicted embodiment.

In at least one embodiment, as mentioned above, the metadata provided to the VMSs 1204 by the configuration manager 1280 may include selection rules (e.g., hashing rules) or policies that can be used to select specific VNIs to which a given packet is to be directed. Upon detecting or intercepting a baseline packet (generated at an App GVM 1202) directed at the FEA assigned to an IG 1250, the VMS 1204 may identify a particular VNI that is a member of the IG as a destination VNI to which the contents of the baseline packet are to be transmitted. A non-public address of the selected VNI may be indicated as the destination address in a header of an encapsulation packet generated at the VMS, for example, with at least some of the contents of the baseline packet included in the body of the encapsulation packet. In some embodiments IP address (e.g., IPv4 or IPv6 addresses) may be used as the non-public addresses of the VNIs, although other address formats and/or protocols may be used in other embodiments. In one embodiment, the VMS may also store a connection tracking record indicating the selection of the particular VNI (e.g., indicating the non-public address of the selected VNI). Such tracking records may be used for selecting the same destination address for subsequent packets generated from the same source in some embodiments. In accordance with the destination address indicated in its header, the encapsulation packet may be transmitted to the PTN 1232 to which the selected VNI is attached in the embodiment illustrated in FIG. 12. For a different baseline packet, e.g., one generated at a different App GVM 1202, a different VNI of the same IG may be selected by the VMS. In this way, the service request workload generated at various App GVMs 1202 may be distributed among the member VNIs of the IG by the VMS 1204, without having to change any of the applications at which the service requests were generated.

Virtual Network Interface Attributes

Figure 13:
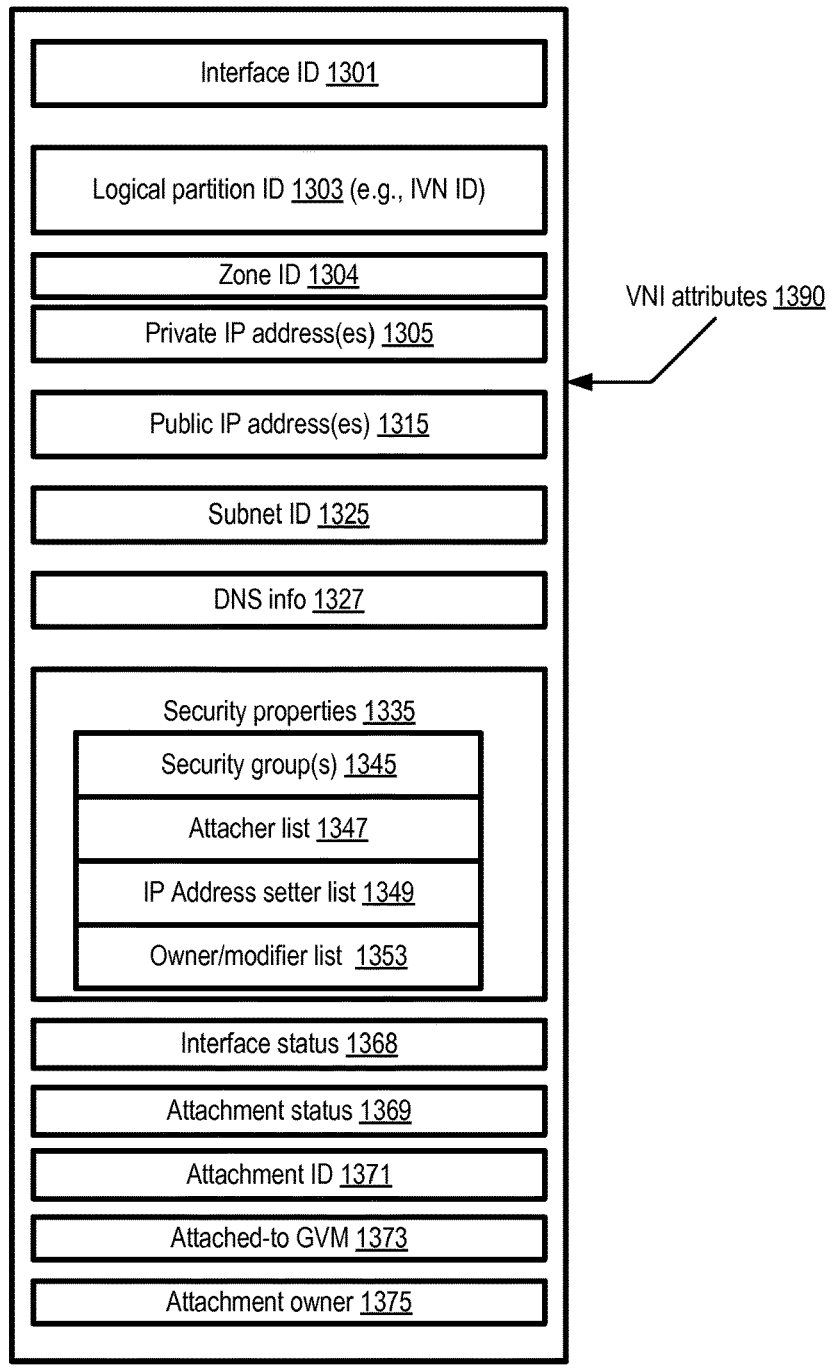
FIG. 13 illustrates example attributes of a virtual network interface which may be included in a virtual network interface group established using a multiplexing technique, according to at least some embodiments.

FIG. 13 illustrates example attributes of a virtual network interface which may be included in a virtual network interface group established using a multiplexing technique, according to at least some embodiments. It is noted that at least in one embodiment a provider network may include VNIs that belong to interface groups, as well as VNIs that are used in a standalone manner (i.e., VNIs that are not designated as part of any interface group). A generalized list of example attributes is shown in FIG. 13, not all of which may necessarily be used for VNIs that belong to interface groups set up by a VNI multiplexing service. Only a subset of the attributes or properties shown in FIG. 13 may be implemented in some embodiments, and not all the implemented attribute fields may have to be populated (i.e., some of the attributes may be left blank or null). Respective records comprising fields/entries containing the attributes 1390 of various VNIs may be stored in a persistent metadata store in some embodiments, e.g., a store that is accessible from various control-plane components of the provider network.

When a new VNI is created, e.g., in response to a programmatic request from a client of a virtual computing service which supports VNIs, a new interface identifier 1301 may be generated for it. The provider network in which the VNI is to be used may comprise a plurality of logical partitions (such as the isolated virtual networks (IVNs) described earlier) in some embodiments, and the attributes 1390 may contain a logical partition identifier 1303 in such cases. In some cases the attributes may include a zone identifier 1304, which may for example indicate an availability container, a geographical region, or a set of data centers whose GVMs may be available for attachment to the VNI.

Any of several types of network addressing-related fields may be included within the set of attributes of a VNI in different embodiments. One or more private IP addresses 1305 may be specified in some embodiments, for example. Such private IP addresses, also referred to herein as non-public addresses, may be used internally for routing within the provider network (e.g., for encapsulation packets generated by VMSs), and may not be directly accessible from outside the provider network or to at least some client applications running on GVMs. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 1315 may also be associated with VNIs in some embodiments; these IP addresses may be visible outside the provider network, e.g., to various routers of the public Internet or peer networks of the provider network. However, in at least some embodiments, public IP addresses may not be used for VNIs that are included in IGs which have FMS endpoint addresses (e.g., FEAs 1272 of FIG. 12) assigned to them. One or more subnet identifiers 1325 (e.g., expressed in Classless Inter-Domain Routing or CIDR format) may be included within attributes 1390 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 1327, may be included in the attributes 1390 as well.

In some embodiments the attributes 1390 may include security-related properties 1335. Some provider networks may allow users to specify rules, including for example firewall-related rules, for the types of incoming and/or outgoing traffic allowed at GVMs or VMSs to which a VNI may be attached. Such rules may be termed "security groups" and identified via security group(s) fields 1345. Various port and protocol restrictions may be enforced using such rules, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some implementations an attacher list 1347 may be specified, indicating which users or entities are allowed to request attachments of the VNI to GVMs. In some cases a separate detacher list may be used to specify which entities can detach the VNI, while in other cases a single list such as attacher list 1347 may be used to identify authorized attachers and detachers. The collection of users or entities that are allowed to set or modify IP addresses (e.g., public IP addresses 1315 and/or private IP addresses 1305) of the VNI may be provided in IP address setter list 1349, and the set of users or entities that own (or can modify various other fields of) the VNI may be specified in owner/modifier field 1353 in some embodiments. For example, an owner/modifier identified in field 1353 may be permitted to change the attacher list 1347 or the IP address setter list in some implementations, thus changing the set of entities permitted to attach or detach the VNI or modify its IP address(es). While the term "list" has been used for fields 1347, 1349, and 1353, logical data structures other than lists (such as arrays, hash tables, sets and the like) may be used to represent the groups of entities given various security privileges, roles and/or capabilities in various embodiments.

The interface status field 1368 may be used to indicate a current state of the VNI—e.g., whether the VNI is "available", "disabled", or "in-repair". Such status information may be propagated to the VMSs from which packets are to be directed to the FMS, for example, so that a disabled or in-repair VNI is not used for the packets. The attachment status field 1369 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 1371. Identifiers of the GVMs to which the VNI is currently attached (e.g., the GVMs at which one or more packet transformation nodes of the flow management service are implemented) may be stored in attached-to instance field 1373, and the user or entity that requested the attachment may be identified via attachment owner field 1375 in some embodiments. Other fields not shown in FIG. 13 may be included in various embodiments.

Flow Management Using VNI Trunking

Figure 14:
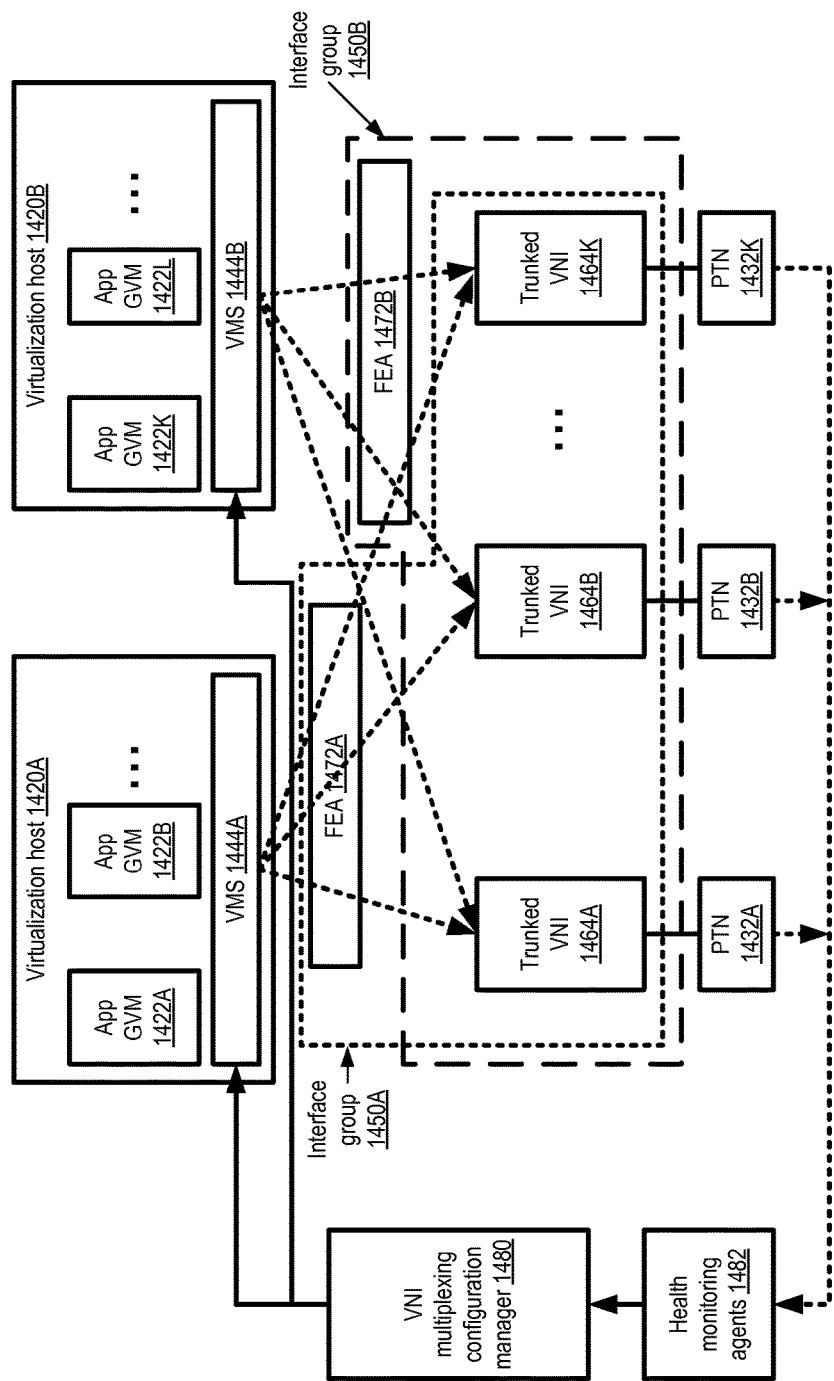
FIG. 14 illustrates examples of virtual network interfaces configured to handle traffic associated with several different flow management service endpoint addresses associated with respective interface groups, according to at least some embodiments.

FIG. 14 illustrates examples of virtual network interfaces configured to handle traffic associated with several different flow management service endpoint addresses associated with respective interface groups, according to at least some embodiments. Such VNIs may be referred to as "trunked" VNIs, and the technique of associating several different interface group endpoint addresses with a single VNI may be referred to as VNI "trunking". In the embodiment of FIG. 14, three trunked VNIs 1464A, 1464B and 1464K are shown. Each of the three VNIs is shown as a member of two different interface groups (IGs), 1450A and 1450B. Interface groups 1450A and 1450B are respectively assigned flow management service endpoint addresses 1472A and 1472B.

Interface group 1450A may have been set up to handle client requests generated at a first set of application GVMs (e.g., 1422A and 1422B), and interface group 1450B may have been established for client requests generated at a different set of application GVMs (e.g., 1422K and 1422L). Membership metadata pertaining to interface 1450A may be propagated by configuration manager 1480 to virtualization management stack (VMS) 1444A, for example, while membership metadata pertaining to IG 1450B may be transmitted to VMS 1444B in the example configuration shown. Similarly, health state information for the PTNs 1432A-1432K may be passed on from health monitoring agents 1482 to the configuration manager 1480, and from the configuration manager 1480 to the VMSs 1444. In some cases, IG 1450A may have been established on behalf of one customer, while IG 1450B may have been established on behalf of a different customer. In some embodiments in which the VNIs of a given IG are shared among different clients in a multi-tenant fashion, a delegated security model that requires agreement regarding the sharing of resources among the clients involved may be used. For example, each of the customers or clients whose traffic is to be directed using the multi-tenant trunked VNIs 1464 may have to agree to share rights to the VNIs. In one implementation, one client may be identified as the attachment owner of a given VNI, but may have to delegate or share ownership with the other clients whose traffic is to utilize the VNI. In addition, other operations involving trunked VNIs, such as transferring such VNIs among interface groups or deleting such VNIs, may have to be coordinated among multiple clients in some embodiments. In one embodiment, trunked VNIs may be used only for a single client at a time (e.g., for a single customer that wishes to use multiple interface groups for different sets of their application GVMs), in which case the coordination of such changes and of VNI ownership may not be required.

In the configuration shown in FIG. 14, baseline packets comprising service requests generated at App GVMs 1422A and 1422B at virtualization host 1420A, and indicating FEA 1472A as the destination, may be intercepted at VMS 1444A. Using the membership metadata and/or health state updates provided by the configuration manager 1480, VMS 1444A may distribute encapsulation packets comprising the contents of the baseline packets among the VNIs 1464A-1464K of IG 1450A. Similarly, with respect to baseline packets generated at App GVMs 1422K and 1422L of virtualization host 1420B and directed to FEA 1472B, VMS 1444B may also distribute the corresponding encapsulation packets among VNIs 1464A-1464K. Each VMS 1444 may maintain connection tracking records indicating which specific VNI was selected as a destination for which baseline packet sources, so that, for example, the same destinations can be selected as destinations for subsequent baseline packets of the same flow (e.g., from the same source App GVMs). In at least some embodiments, the encapsulation packet headers may include one or more additional fields in the case of trunked VNIs (e.g., identifying which interface group or FEA a given packet is associated with) than in the case of un-trunked VNIs such as those shown in FIG. 12.

It is noted that at least in some embodiments, trunking (i.e., the association of multiple FEAs with the same VNI) may be used in scenarios in which multiple VNIs are not aggregated into interface groups as shown in FIG. 14. For example, a single VNI may be assigned two or more FEAs, without being designated a member of an IG. Also, as was indicated in FIG. 12, interface groups may be set up without using trunked VNIs in at least some embodiments. Thus, the respective techniques of combining multiple VNIs into interface groups, and of assigning multiple addresses to a given VNI, may be used independently of one another, and/or in combination with each other, in at least some embodiments for traffic directed to the packet transformation tier of a flow management service.

Flow Management for Packets to and from External Networks

Figure 15:
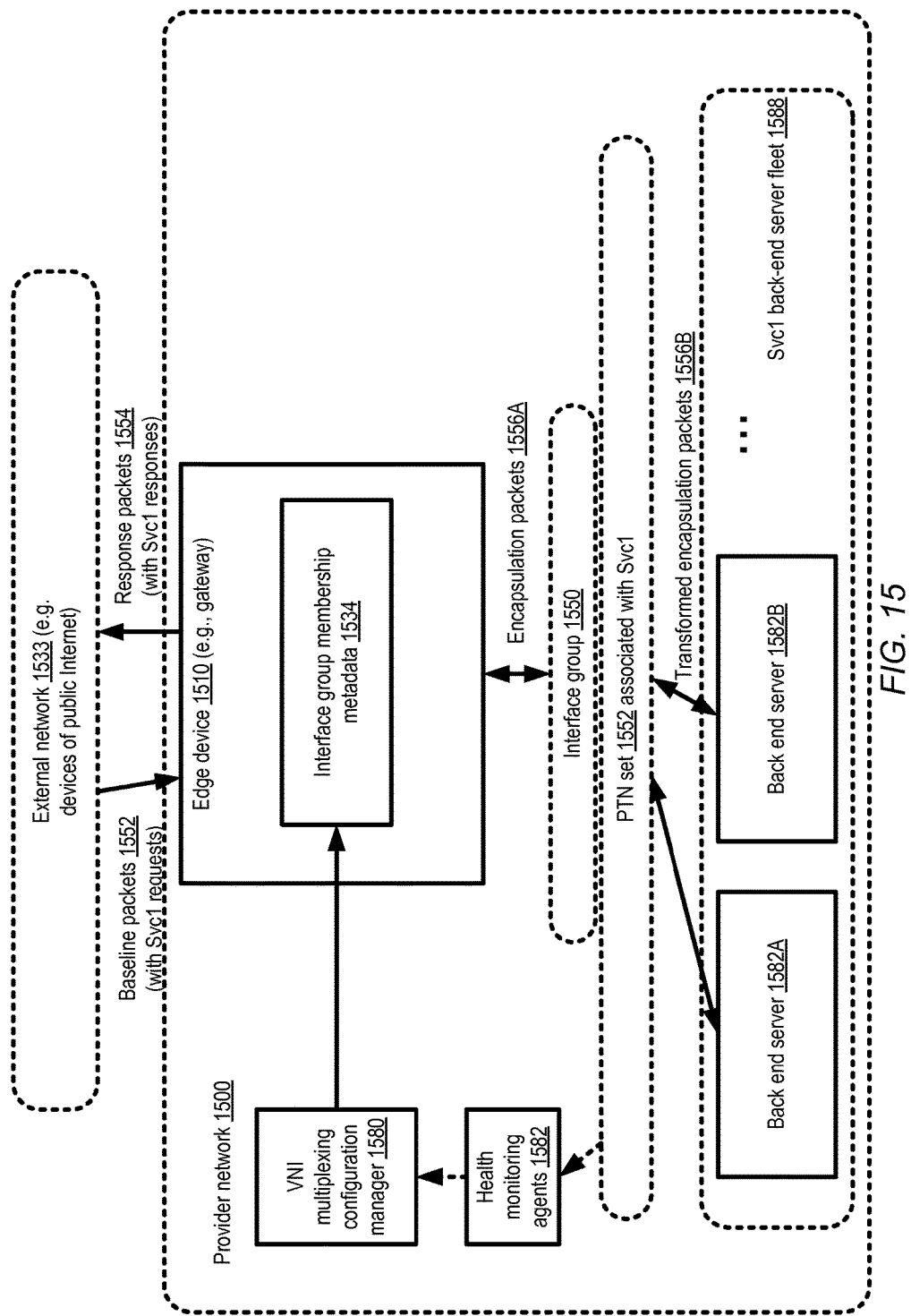
FIG. 15 illustrates an example environment in which edge devices of a provider network may interact with packet transformation nodes of a flow management service, according to at least some embodiments.

FIG. 15 illustrates an example environment in which edge devices of a provider network may interact with packet transformation nodes of a flow management service, according to at least some embodiments. In the example configuration shown, the operations of a service Svc1 available to external clients via provider network 1500 are implemented at a fleet of back-end servers 1588, such as Svc1 GVMs 1582A and 1582B. The service Svc1 may be one of the provider network's own services, such as a database service or a storage service, or a service being provided by a customer of the provider network using the provider network's resources. To handle Svc1 requests originating at an external network 1533, which may for example include devices connected to the public Internet or devices of one or more client-owned premises, one or more interface groups such as 1550 associated with a subset of packet transformation nodes (PTNs) of the flow management service may be established. Baseline packets 1552 with Svc1 requests may be transmitted from the devices of the external network 1533 over various combinations of network links to an edge device 1510 of the provider network 500, such as a gateway or an edge router. The baseline packets 1552 may, for example, indicate a publicly-advertised IP address of Svc1 as their destination.

In the depicted embodiment, VNI multiplexing configuration manager 1580 may provide IG membership metadata 1534 to edge device 1510. In some embodiments, respective sets of metadata pertaining to a number of different IGs set up in provider network 1500 to handle requests from external networks such as network 1533 may be propagated to various edge devices 1510 of the provider network. Upon detecting baseline packets that are directed to IGs for which metadata is available locally, an edge device 1510 may generate corresponding encapsulation packets 1556A and distribute the encapsulation packets to the member VNIs of the IG 1550. An encapsulation packet may include the address of the source from which the baseline packet was generated, which may be referred to herein as the "request origin address". In turn, the packet transformation nodes 1552 to which the VNIs of IG 1550 are attached may transfer transformed encapsulation packets 1556B to selected Svc1 back-end servers 1582, such as 1582A and 1582B. In some embodiments, two different encapsulation protocols may be used: one at the edge node 1510, and one at the PTNs 1552. In other embodiments, the same encapsulation protocol may be used for both sets of encapsulation packets 1556A and 1556B, but the destination address headers may be modified by the PTNs to direct the 1556B packets to the appropriate back-end servers 1582.

In at least one embodiment, the back end servers 1582 may extract, from the encapsulation packets 1556B, request origin addresses of the devices at which the corresponding service requests originated in external network 1533. When the work indicated in a service request is completed and a response is to be transmitted, the service nodes 1582 may include the corresponding request origin address in a response encapsulation packet directed back to the IG 1550. The PTN that receives the response encapsulation packet 1556B may in turn transmit a corresponding response encapsulation packet 1556A comprising the request origin address to the edge node 1510. The edge node 1510 may extract the response content and transmit an un-encapsulated response packet 1554 to the request origin address.

Packet Transformation at Enhanced FMS Client Components

Figure 16:
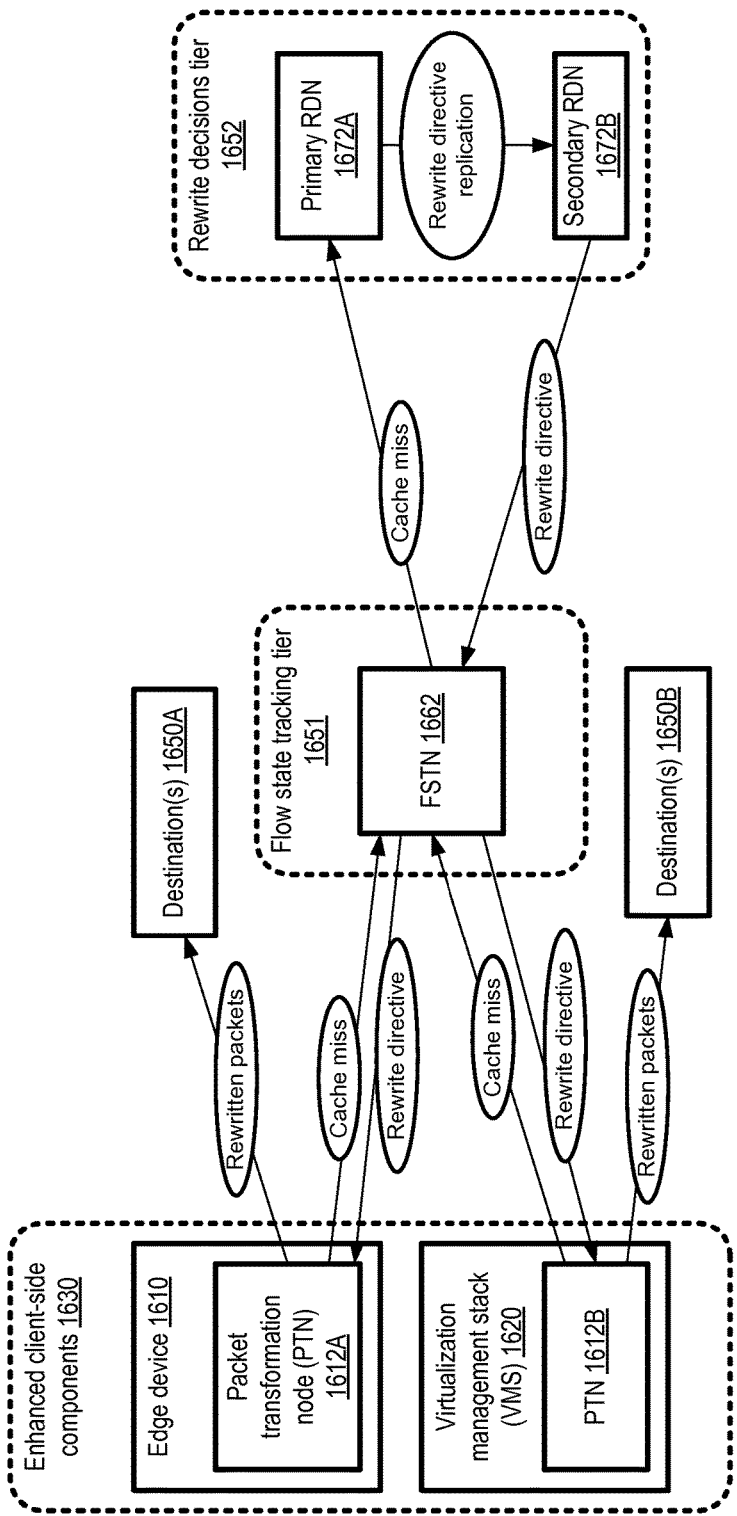
FIG. 16 illustrates an example environment in which at least some packet transformation operations may be performed at enhanced client-side components of a flow management service, according to at least some embodiments.

As shown in FIG. 12, FIG. 14 and FIG. 15, in some provider network environments the FMS may receive packets from at least two types of components associated with a provider network's virtualization management service: virtualization management stacks (e.g., VMSs 1204 of FIG. 12 and VMSs 1444 of FIG. 14) and edge devices (e.g., edge device 1510 of FIG. 15). The VMSs and edge devices may thus be considered examples of client-side components of the FMS. In some embodiments, at least a portion of the functionality described earlier with respect to the packet transformation nodes of the FMS may be incorporated into the client-side components. In order to perform the PTN functionality, the client-side components may be enhanced to store and implement rewrite entries of the kind discussed earlier, and to interact with the other tiers of the flow management system. FIG. 16 illustrates an example environment in which at least some packet transformation operations may be performed at enhanced client-side components of a flow management service, according to at least some embodiments.

Enhanced FMS client-side components 1630, such as edge device 1610 and/or virtualization management stack 1620 may each include local packet transformation nodes (PTNs) 1612, such as PTN 1612A at edge device 1610A and PTN 1612B at VMS 1620. A given PTN 1612 may maintain a cache of rewrite entries similar to the entries illustrated in FIG. 4. When the first packet of a new flow (e.g., a packet received from an external network at edge device 1610, or a packet received from an application GVM at VMS 1620) is encountered at a PTN 1612, a corresponding cached rewrite entry may not be found, resulting in a cache miss. A cache miss indicator may be sent to a selected flow state tracking node (FSTN) 1662 in the depicted embodiment. From the member nodes of flow state tracking tier 1651, the particular FSTN may be chosen using similar techniques to those discussed in the context of FIG. 5, such as customer-based sharding and flow hashing. If the FSTN does not find a rewrite entry in its local cache, it may send a cache miss indicator or a request for a rewrite directive to a selected primary node 1672A of the rewriting decisions tier 1652. In a manner similar to that discussed in the context of FIG. 5, the selected primary rewriting decisions node (RDN) 1672A may be chosen based on the particular packet processing requirement associated with the cache miss. As discussed earlier, the requirement may in turn be identified based on the interface group whose endpoint address is indicated as a destination in the received packet which resulted in the cache miss in at least some embodiments. The primary RDN 1672A may generate the rewriting directive (or a rewrite entry containing the rewriting directive), and send it for replication to a secondary RDN 1672B. After it has been replicated, the rewriting directive or entry may be sent to the FSTN 1662, and from the FSTN to the PTN at the client-side component at which the cache miss occurred.

A rewrite entry with the directive may be stored in the cache at the client-side component's PTN, and transformed or rewritten packet(s) may be sent to the appropriate destinations such as 1650A or 1650B in accordance with the directive. Subsequent packets of the same flow may be handled at the client-side component itself using the cached rewrite entry, without any need to interact with the FSTNs or RDNs. The PTNs 1612 may also transmit flow metadata (e.g., comprising the kinds of metrics and entries illustrated in FIG. 4) periodically and/or on demand to the FSTNs. In various embodiments, the PTNs 1612 may be configured to implement the different kinds of packet transformations illustrated in FIG. 6, including multicast, anycast, source address substitution, fixed-IP address load balancing, and the like.

The incorporation of the packet transformation functionality into the client-side components of the FMS as shown in FIG. 16 may result in a substantial cost savings for the FMS provider in some embodiments, as the expense associated with maintaining a large fleet of separate packet transformation nodes may be eliminated.

Efficient Flow Metadata Synchronization Techniques

For at least some kinds of decisions, the nodes of the rewriting decisions tier of flow management system may have to utilize metadata associated with previous decisions and/or the state of currently active flows in various embodiments. For example, with respect to source address substitution, a given rewriting decisions node (RDN) may have to ensure that a unique substitute (address, port) pair is selected for each flow, so that the responses to the transformed packets can be sent to the appropriate device. Such uniqueness requirements may require some representation of earlier decisions to be retained. Similarly, when making load balancing decisions, the RDN may examine records of earlier load balancing decisions (which may serve as approximate indications of the load imposed on the servers whose workload is being balanced). Furthermore, when an active flow is terminated, e.g., as a result of a connection close requested by one of the entities involved, the RDNs may have to be informed so that they may re-use the addresses/ports associated with the terminated flow if needed. For these and other reasons, metadata regarding previous rewriting decisions, and changes to the state of various flows for which rewriting decisions were made earlier, may have to be maintained and/or synchronized at the rewriting decisions tier and/or at the flow state tracking tier in various embodiments. At the same time, in a large-scale flow management system at which millions of packets may be processed per second, maintaining exact and completely up-do-date records of all previous decisions relevant to current and future flows may be extremely resource intensive. Accordingly, in at least some embodiments, an efficient metadata synchronization technique that relies on probabilistic summaries rather than exact values for various metadata entries may be employed.

Figure 17:
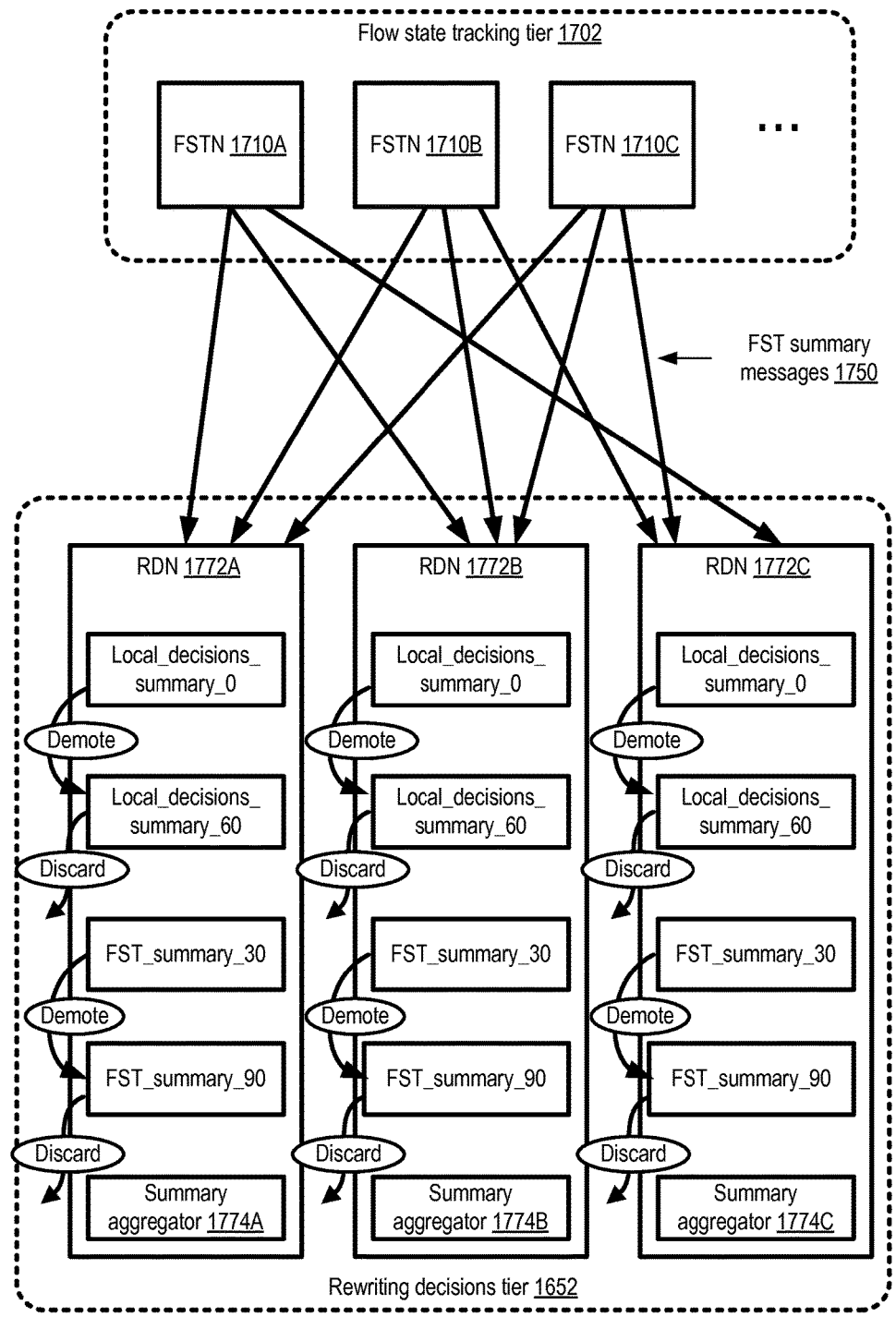
FIG. 17 illustrates an overview of a metadata synchronization technique which may be used at a flow management system, according to at least some embodiments.

FIG. 17 illustrates an overview of a metadata synchronization technique which may be used at a flow management system, according to at least some embodiments. In the depicted embodiment, at least some of the rewriting decisions made by an RDN 1772 (e.g., 1772A, 1772B or 1772C) may utilize an aggregation of a collection of metadata summary objects. The summary objects at a given RDN such as 1772A may include at least an up-to-date summary of local decisions (e.g., local_decisions_summary_0) made at the RDN, a previous or older summary of local decisions (e.g., local_decisions_summary_60), a recent summary of metadata received from the flow state tracking tier 1702 (e.g., FST_summary_30), and an older summary of metadata received from the flow state tracking tier (e.g., FST_summary_90) in the depicted embodiment. The metadata received from a given flow state tracking node (e.g., FSTN 1710A, FSTN 1710B or FSTN 1710C) may correspond to, for example, the rewriting decisions for which notifications have been received at that FSTN from one or more RDNs. As such, the FST_summary objects may also be referred to as remote notifications summary objects. In addition, the metadata received from a given FSTN may also reflect updated flow state information received at that FSTN from the packet transformation tier (not shown in FIG. 17) in at least some embodiments—e.g., if a given flow has ended due to a termination of a connection, an entry corresponding to that flow may be deleted from the next metadata message 1750, or some other indication of the termination of the flow may be included in the next metadata message.

The numerals at the ends of the names of the different summaries included in the metadata collections may indicate the recency or "freshness" of the data summarized therein—e.g., the "0" in the name "local_decisions_summary_0" indicates that local decisions made up to the current time (0 seconds ago) are represented therein, while the "30" in the name "local_decisions_summary_30" indicates that at least some decisions made 30 seconds ago or earlier are represented. Similarly in the FST summary objects, metadata received more than 90 seconds ago may be represented in the FST_summary_90 object, while metadata received more recently (e.g., between 30 and 90 seconds ago) may be commutatively added to FST_summary_30 as described below in further detail.

With respect to each pair of summary objects (the local decisions summaries and the FST summaries), the older object may be substituted or replaced by the newer object periodically—e.g., in the depicted example scenario, once every thirty seconds, the local_decisions_summary_30 may be overwritten by the local_decisions_summary_0, and a new empty summary object may be initialized as the new local_decisions_summary_0. For the next sixty seconds, representations of local rewriting decisions may be added commutatively to the local_decisions_summary_0 object as described below in the context of FIG. 19a-FIG. 19l. Similarly, every 60 seconds, the contents of FST_summary_90 may be replaced by the current contents of FST_summary_30, and a new FST_summary_30 object may be initialized. The new FST_summary_30 may be initialized using the contents of metadata summary messages 1750 and/or other updates received from the FST tier 1702 in at least some embodiments. One advantage of starting with a new, empty summary of each type (e.g., a new local decisions summary and a new FST summary) periodically is that when such a technique is used, errors which might have been introduced into a given type of summary are eliminated automatically fairly quickly from the metadata collection, depending on the intervals between the initializations of the summaries. Such errors may result, for example, due to bugs, network attacks, or rarely encountered race conditions. Thus, the overall robustness of the flow state management system and the quality of the rewriting decisions made therein may be enhanced by periodically purging older metadata as described. In one implementation, such purging may not necessarily be performed—e.g., an alternative approach may be used in which at least in some iterations new metadata is simply aggregated with the older metadata instead of starting with empty metadata summaries.

The process of overwriting an older version of a summary object by a newer one (as indicated by the arrows labeled "demote" and "discard" in FIG. 17), initializing a newer summary object, and adding new metadata to the newer summary object until the next overwrite, may be referred to as an aggregation-demotion cycle. In various embodiments, each RDN 1772 may perform a sequence of aggregation-demotion cycles or iterations. As older information is discarded periodically while information about currently active flows is maintained using such aggregation-demotion cycles, the RDNs may be able to make rewriting decisions without using up excessive memory or storage in various embodiments. It is noted that in different embodiments, the particular intervals between the overwrite operations may differ from those shown in FIG. 17—e.g., the demotions may be scheduled every 90 seconds instead of every 60 seconds, or every 45 seconds for local decision summary objects and every 75 seconds for FST summary objects. Furthermore, in some embodiments more than two versions of the summary objects of either type may be used. When a particular rewriting decision is to be made at a given RDN 172, the contents of the various summary objects may be logically combined (e.g., using the Boolean "OR" operation) by a corresponding summary aggregator 1774 (such as aggregators 1774A-1774C at RDNs 1772A-1772C respectively). In the depicted embodiment, each FSTN 1710 (e.g., 1710A-1710C) may transmit respective copies of metadata to a plurality of RDNs 1772. In at least one embodiment, similar aggregation-demotion cycles for flow metadata summaries may be implemented at the flow state tracking tier and/or at the packet transformation tier of an FMS.

Figure 18:
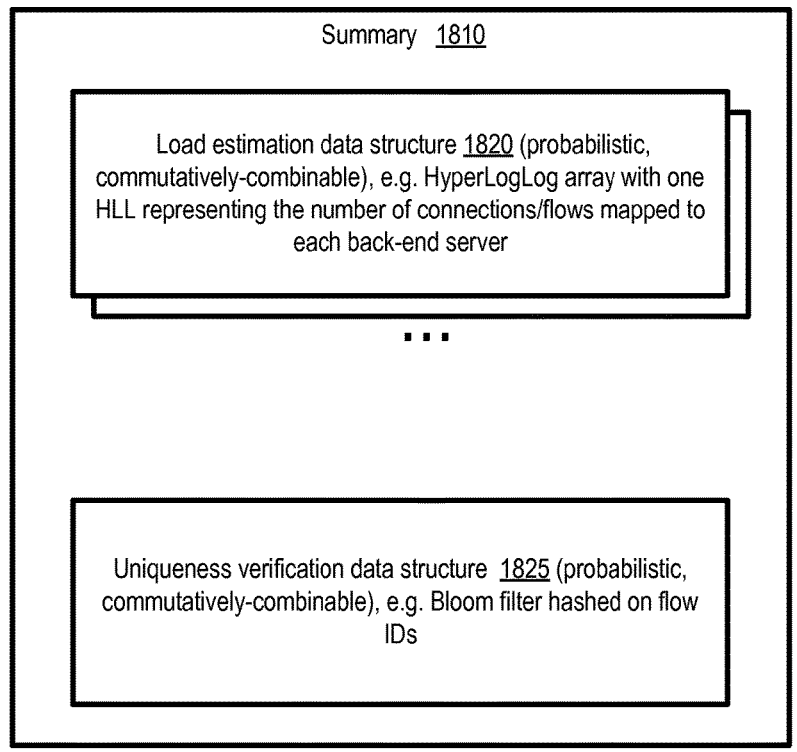
FIG. 18 illustrates examples of probabilistic data structures which may be used for metadata synchronization at a flow management system, according to at least some embodiments.
Figure 18:
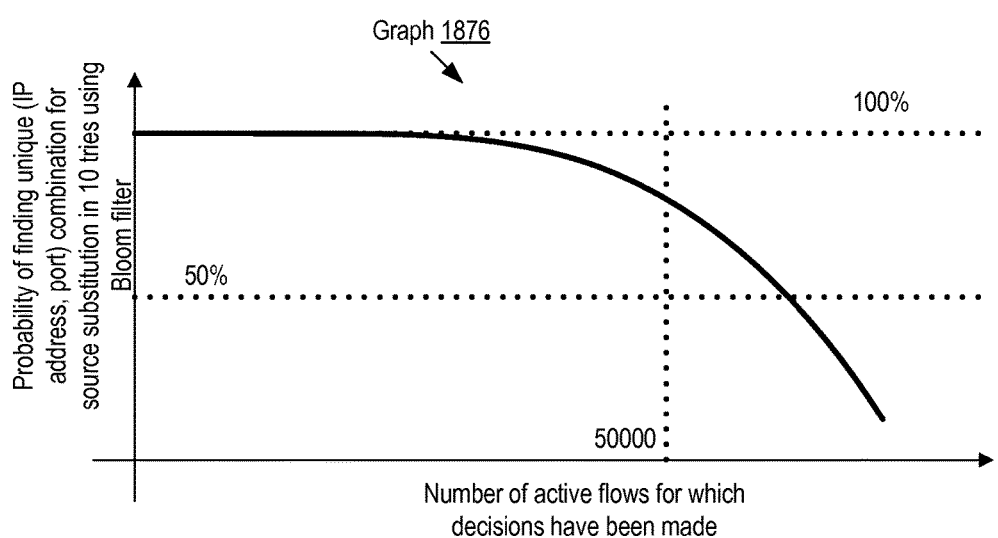

Probabilistic data structures may be used for various types of metadata objects used in the aggregation-demotion cycles in various embodiments. FIG. 18 illustrates examples of probabilistic data structures which may be used for metadata synchronization at a flow management system, according to at least some embodiments. A summary object 1810 (e.g., any one of the local decisions summaries or FST summaries illustrated in FIG. 17) may comprise a load estimation data structure 1820 and a uniqueness checking data structure 1830 in the depicted embodiment.

With respect to workload estimates to be used for load balancing decisions in which a particular back-end server is to be selected from a set of back-end servers, a HyperLogLog array with one entry per back-end server may be used in some embodiments as the load estimation data structure 1820. HyperLogLogs (HLLs) are a probabilistic data structure used for cardinality estimation—e.g., an estimate of the number of distinct members of a multiset. An HLL can be used to reasonably accurately (e.g., within 3% using a 512 byte HLL) estimate how many unique elements have been observed by the HLL. For the purposes of load balancing, an estimate of the number of distinct connections or flows which have been established with a given back-end server may be obtained using the corresponding HLL entry for that back-end server in an HLL array 1820. The number of distinct flows which have been assigned to the back-end server may be used as an approximation of that server's workload (e.g., under the assumption that each flow results in approximately the same workload as any other flow). The HLL entries may be stored in the form of a min-max heap in some implementations, so that it is easy for an RDN to identify the particular back-end server with the fewest connections or flows assigned to it, and select that server for the next new flow for which a rewriting directive is to be generated for load balancing. When a particular back-end server is selected, its HLL may be modified accordingly. After the new flow is assigned to it, at least in some cases it may no longer remain the least loaded back-end server, so that the HLL array 1820 may lead the RDN to select a different server for the next new flow. HLLs may be aggregated commutatively with no loss of information, e.g., using Boolean "OR" operations.

In at least some embodiments, a Bloom filter may be used as a uniqueness checking data structure 1825 in a summary 1810, e.g., so that an RDN can ensure that a (substitute source address, substitute source port) pair chosen for packets from a given source device is not already in use for some other source device. A Bloom filter is typically implemented as a large bitmap and used to determine the absence or likely presence of an element in a set. The Bloom filter starts out empty, with all of its bits set to 0. To insert an element (e.g., a flow identifier) into the bloom filter, the element is hashed through some number (e.g., k) hash functions. The return value of each function is used to derive a particular bit position to set. After inserting one element, k bits will be set in the bitmap if k hash functions are used. After inserting a second element, and deriving its hash function return values, between k bits (if all of the bit positions are the same as the first element) and 2 k bits (if all of the bit positions are different) will be set. If the bloom filter is large in size, then the likelihood of such collisions is small.

To test if an element is present in the Bloom filter 1825, the element may be hashed using the set of hash functions selected for the filter, and the resulting bit positions may be checked to see if they have 0 or 1 values. If any of the bits is 0, then the element is certainly not in the set of elements represented in the filter. If all of the bits are 1, then it is likely that the element was mapped to the Bloom filter, though there is some chance of a false positive result due to collisions. The probability of false positives may be reduced to desired levels by increasing the size of the bitmap and or selecting hash functions with the appropriate mathematical properties. Just like HLLs, Bloom filters may also be aggregated commutatively (via Boolean OR). For the purposes of source substitution, entries representing the flow identifiers or flow tuples (e.g., using the combination of the substitute address, substitute port, the destination address, destination port and protocol) may be added to the Bloom filter 1825 as they are assigned.

When trying to select a (substitute source address, substitute source port) pair which has not already been assigned, an RDN may generate a flow ID corresponding to a candidate substitute pair and check whether the Bloom filter 1825 indicates that the flow ID has already been mapped to it. If the flow ID has not been mapped (e.g., if at least one of the bits to which the proposed flow ID hashes is 0), the proposed substitute (address, port) pair may be guaranteed not to be in use; otherwise, the RDN may try again with a different substitute source address/port until an unused pair is found. Graph 1876 of FIG. 18 shows an example of trends with respect to the probability of finding a unique (IP address, port) pair in some small number of tries (e.g., ten tries), as a function of the number of active flows for which such unique pairs have already been identified by a given RDN. As shown, even with tens of thousands of active flows, the probability of finding an unused substitute address and port within a small number of attempts may remain quite high. It is noted that graph 1876 is intended to show the general relationship between the number of pre-existing flows and the probability of being able to find additional unique combinations of addresses and ports in a given number of attempts using a Bloom filter, and not the results of any particular implementation.

In some embodiments, data structures other than Bloom filters and HyperLogLogs, at least some of which may support commutative aggregation, may be used for making rewriting decisions. In at least one embodiment, one or more data structures used for metadata management or synchronization at the flow management system need not be probabilistic, and similarly, the data structures used need not necessarily support commutative aggregation. In some embodiments, metadata summary objects of the kind illustrated in FIG. 18 may be used not just for load balancing decisions and source address substitution, but for other packet processing categories as well.

Metadata Propagation Example

Figure 19A:
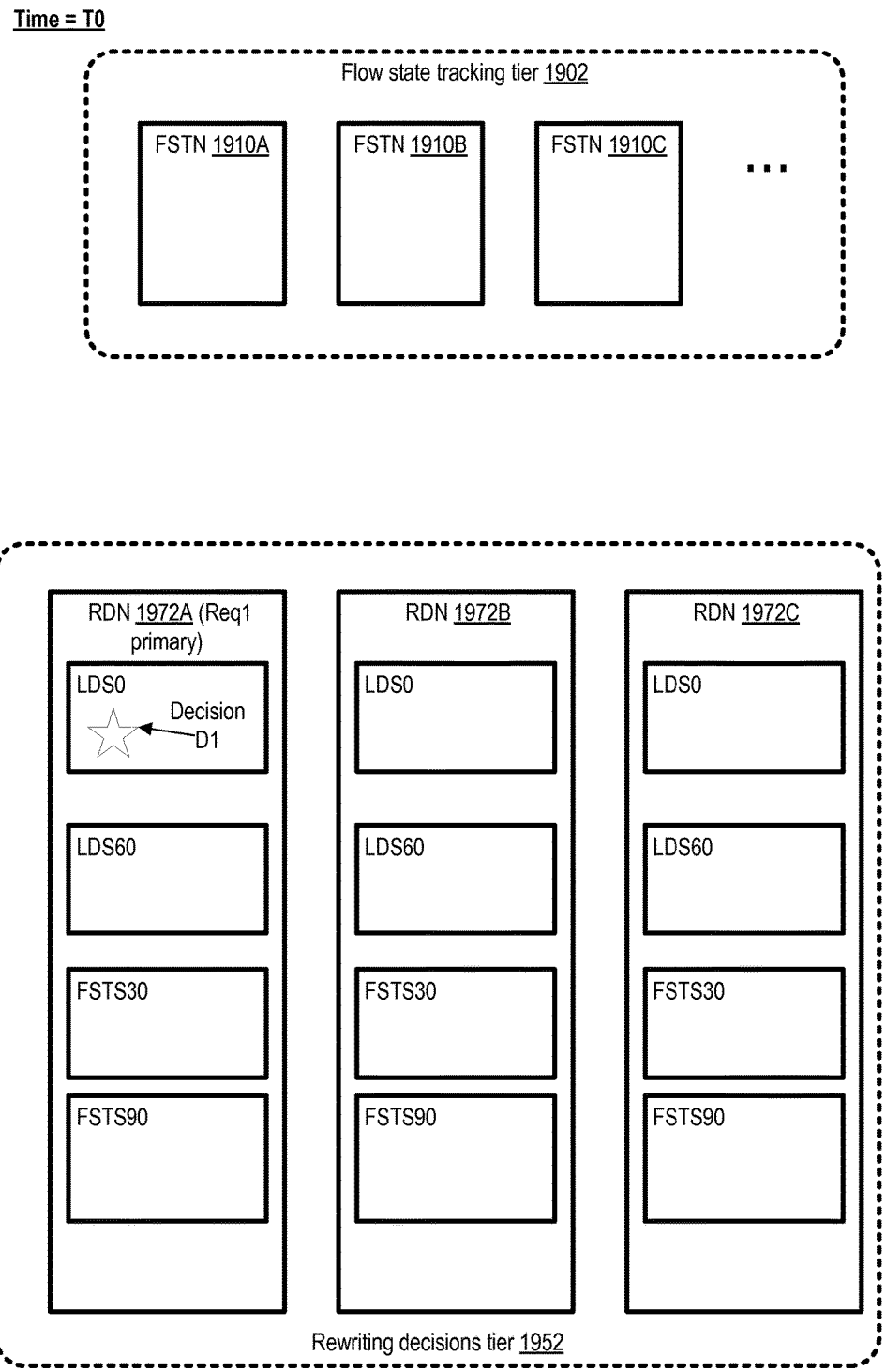

FIG. 19a-FIG. 19l collectively illustrate a simple example of metadata synchronization among the tiers of a flow management system, according to at least some embodiments. In FIG. 19a-FIG. 19l, the acronyms LDS0 and LDS60 are used for local_decisions_summary_0 and local_decisions_summary_60 respectively, and the acronyms FSTS30 and FSTS90 and used for FST_summary_30 and FST_summary_90 respectively. The example begins with no flows active, and with all the summary data objects LDS0, LDS60, FSTS30 and FSTS90 in their initial (empty or zeroed-out) states at each node of the rewriting decisions tier 1952, and with no metadata stored at any of the nodes of the flow state tracking tier 1902. In FIG. 19a, at some time T0, a first rewriting decision D1 is made (e.g., in response to a first packet of a flow corresponding to a particular packet processing requirement Req1, and a subsequent cache miss at the packet transformation and flow state tracking tiers) at rewriting decisions node (RDN) 1972A selected as the primary RDN for the requirement. A representation of that decision is stored in LDS0 (e.g., by performing a Bloom filter insertion and/or an HLL insertion). In some embodiments, a rewrite entry or a rewriting directive separate from LDS0 may also be generated.

Figure 19B:
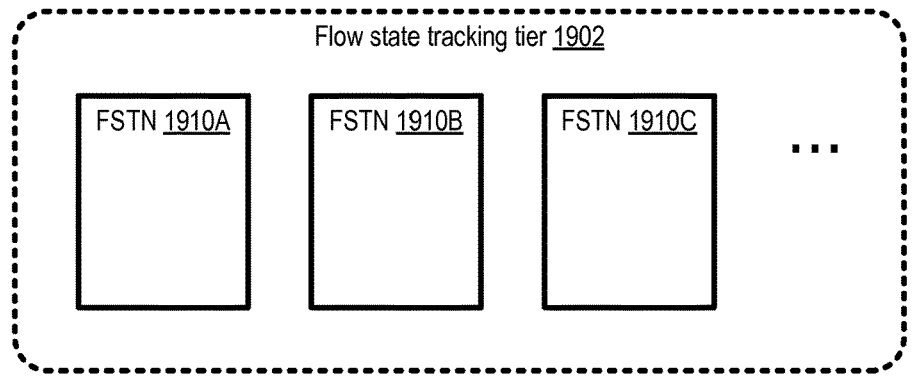
Figure 19B:
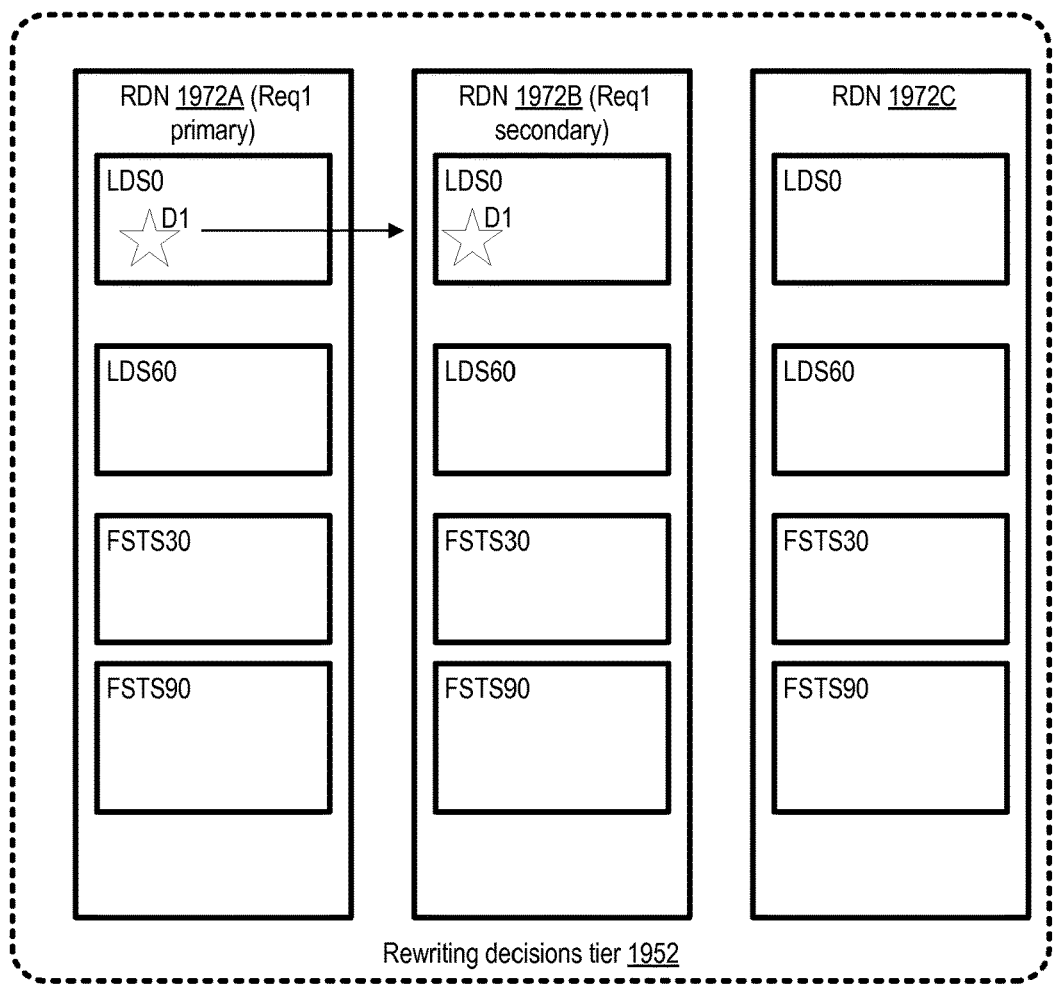

Shortly thereafter, at some time T1, the decision is replicated at RDN 1972B (the secondary RDN for the packet processing requirement), e.g., by inserting a similar representation into RDN 1972B's LDS0, as shown in FIG. 19b. In some embodiments, the secondary RDN 1972B with respect to requirement Req1 may also perform some checks (such as uniqueness checks of the kinds described above) to verify that the decision is acceptable, and may only store the decision D1 if the checks succeed.

Figure 19C:
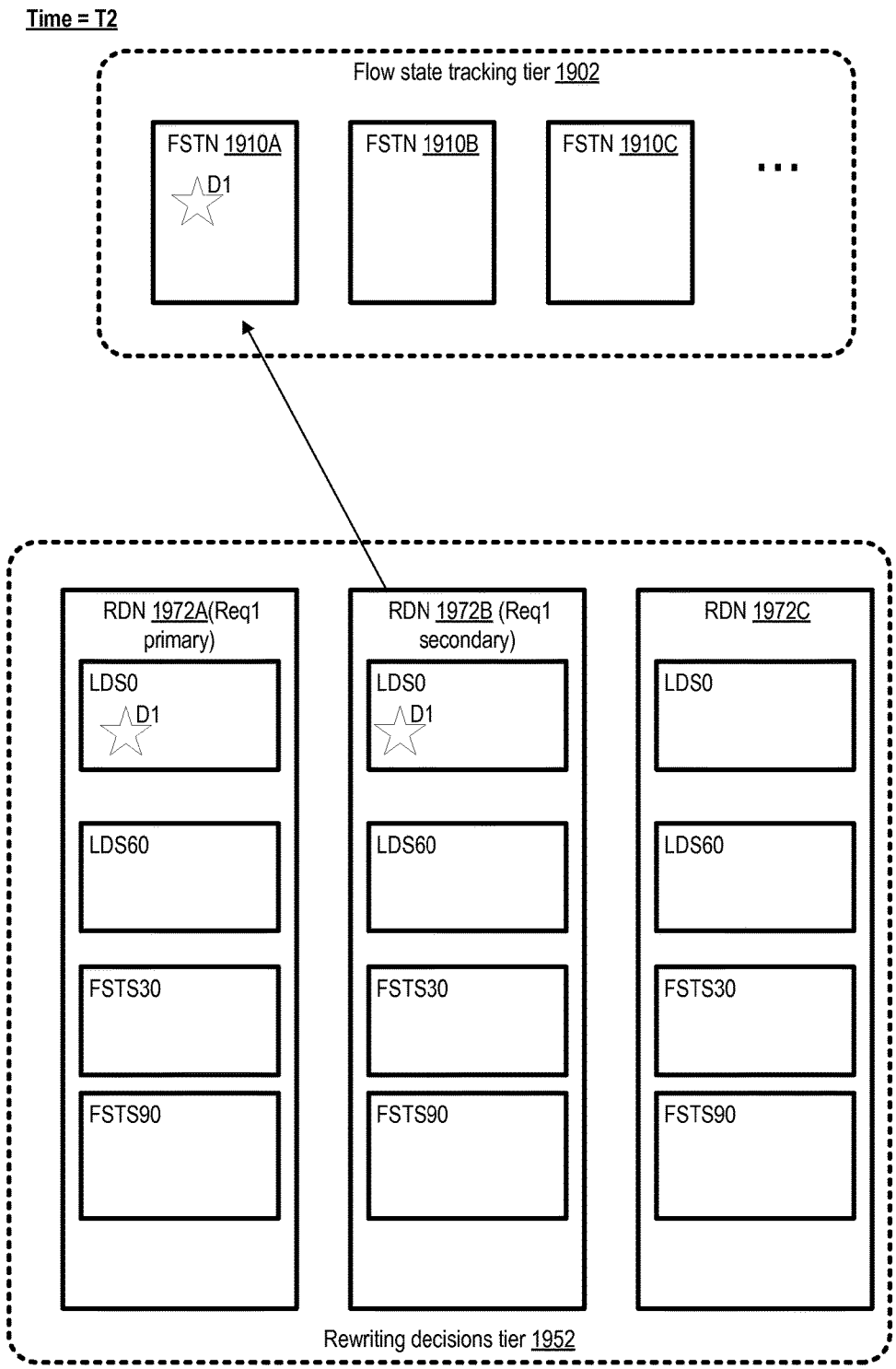

As shown in FIG. 19c, after D1 has been replicated, the secondary RDN 1972B for Req1 may transmit an indication of D1 to a particular flow state tracking node (FSTN) 1910A at some time T2 shortly after T1. A cache miss indicator from 1910A may have been received earlier at RDN 1972A regarding the first packet of the flow for which the decision D1 is made. In some embodiments, instead of replicating D1 at just two nodes of the rewriting decisions tier 1952, D1 may be replicated at three or more nodes before it is sent back to the flow state tracking tier and/or the packet transformation tier. From FSTN 1910A, an indication of D1 may be sent to the packet transformation node (PTN) (not shown in FIG. 19a-FIG. 19l) at which the packet that triggered the generation of D1 was received at the flow management service. D1 may be implemented at either the PTN or the FSTN—that is, the appropriate number of transformed packets may be sent to their destinations in according with D1.

Figure 19D:
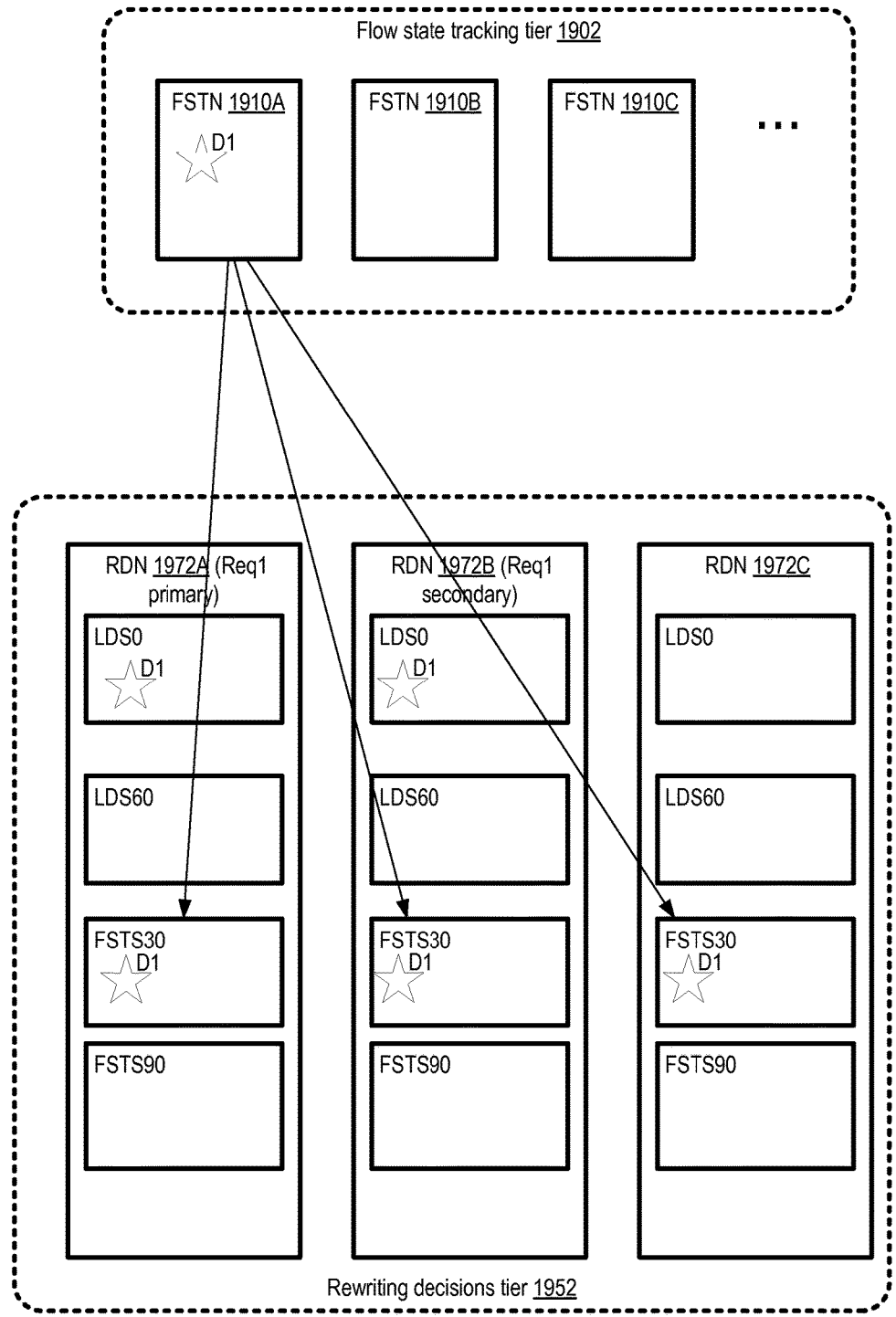

At a time T3, approximately 30 seconds after D1 was generated at RDN 1752A, FSTN 1910A may send a summary of the flow decision and state information it has collected thus far to several different RDNs, as indicated in FIG. 19d. The number of RDNs to which a given FSTN sends its metadata summary may vary from one embodiment to another. In one embodiment, the nodes of the flow state tracking tier and the rewriting decisions tier may be organized into deployment groups, such as groups of 10 FSTNs and 10 RDNs each, within a given data center or a given availability container of a provider network, and the FSTNs of a given deployment group may transmit respective metadata summaries to all the RDNs of their deployment group. In other embodiments, a given FSTN 1910 may transmit summaries to all the RDN (primary, secondary pairs) with which it has interacted thus far for various flows, or to all the RDNs which are responsible for decisions made on behalf of the customers whose flows are being tracked at the FSTN. In at least some embodiments, the summaries sent by the FSTNs may have the same structure (e.g., comprising one or more HLL arrays and one or more Bloom filters) as the LDS0, LDS60, FSTS30 and FSTS90 summary objects, so that the summaries received from the FSTN can be easily aggregated with the summary objects stored at the RDNs. As shown, the received summaries may be stored at the respective FSTS30 objects at each RDN 1972. Since the FSTS30s were empty prior to T3, they may not be demoted to FSTS90s before being overwritten with the newly received summaries in the depicted embodiment.

Figure 19E:
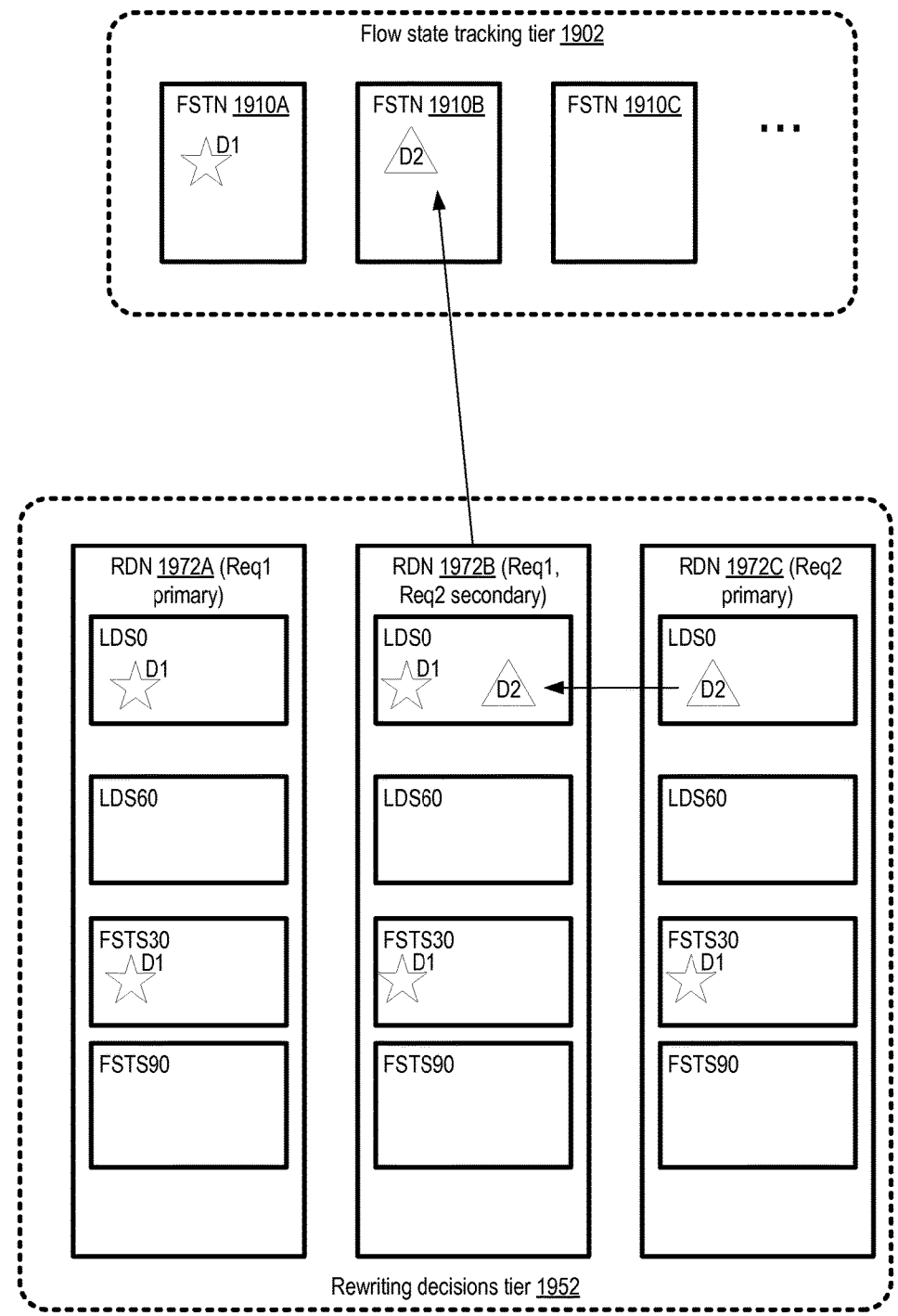

A packet of new flow associated with a different transformation requirement Req3 may be received after T3, resulting in cache misses at the packet transformation tier and at FSTN 1910B. RDN 1972C may be selected as the primary RDN for Req2, and RDN 1972B may be selected as the secondary in the depicted example scenario. RDN 1972C may generate a new decision D2, which may be replicated at RDN 1972B and transmitted back to FSTN 1910B at some time T4, as shown in FIG. 19e. (Some of the steps corresponding to decision D2, such as its creation and replication, are consolidated into FIG. 19e and not shown in separate figures.)

Figure 19F:
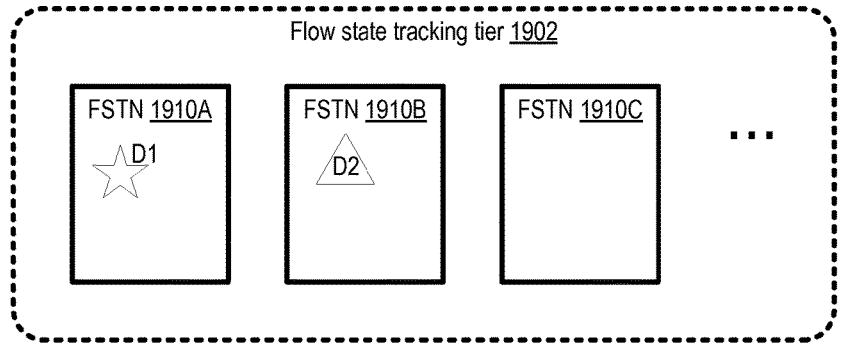
Figure 19F:
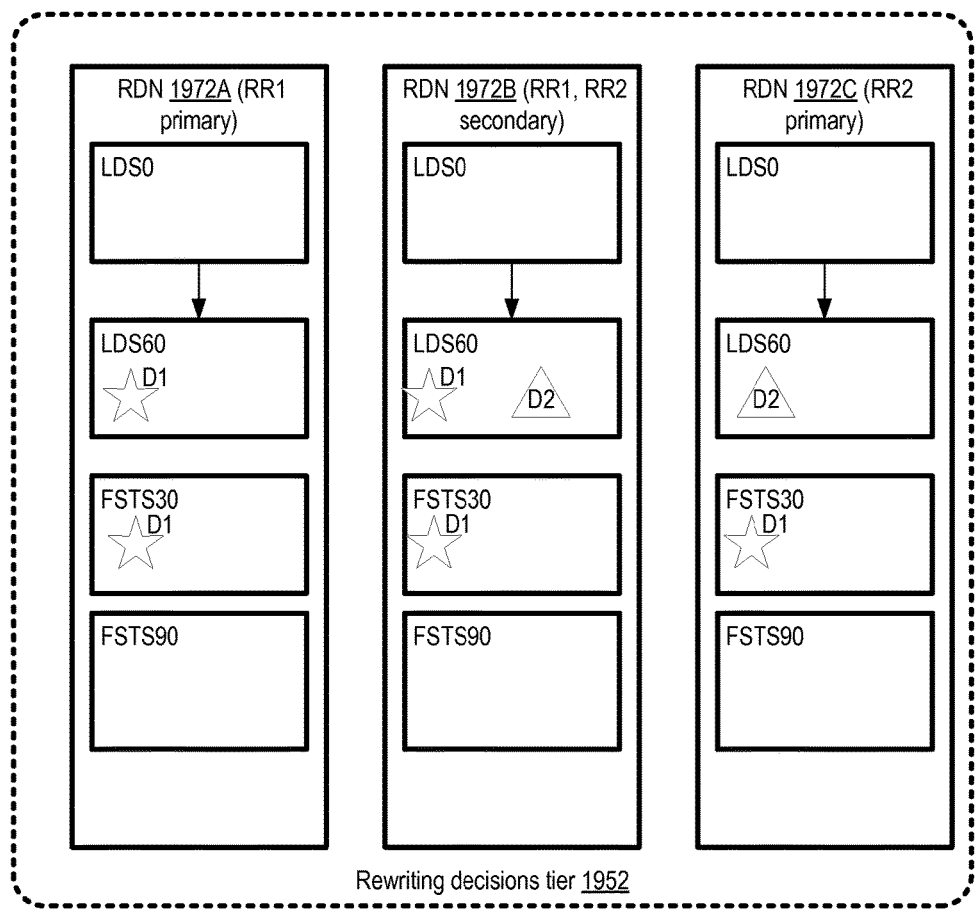

In FIG. 19f, at time T5 (approximately 60 seconds after T0), the LDS0 contents at each RDN 1972 are demoted to LDS60, and a new empty or zeroed-out LDS0 object is created. If the LDS60 objects had contained any entries, they would have effectively been discarded at this point as a result of the demotion of the LDS0s. As a result of the demotion, information about local decisions made during the last approximately 60 seconds at the respective RDNs 1972 may be transferred to the respective LDS60 objects in the depicted embodiment.

Figure 19G:
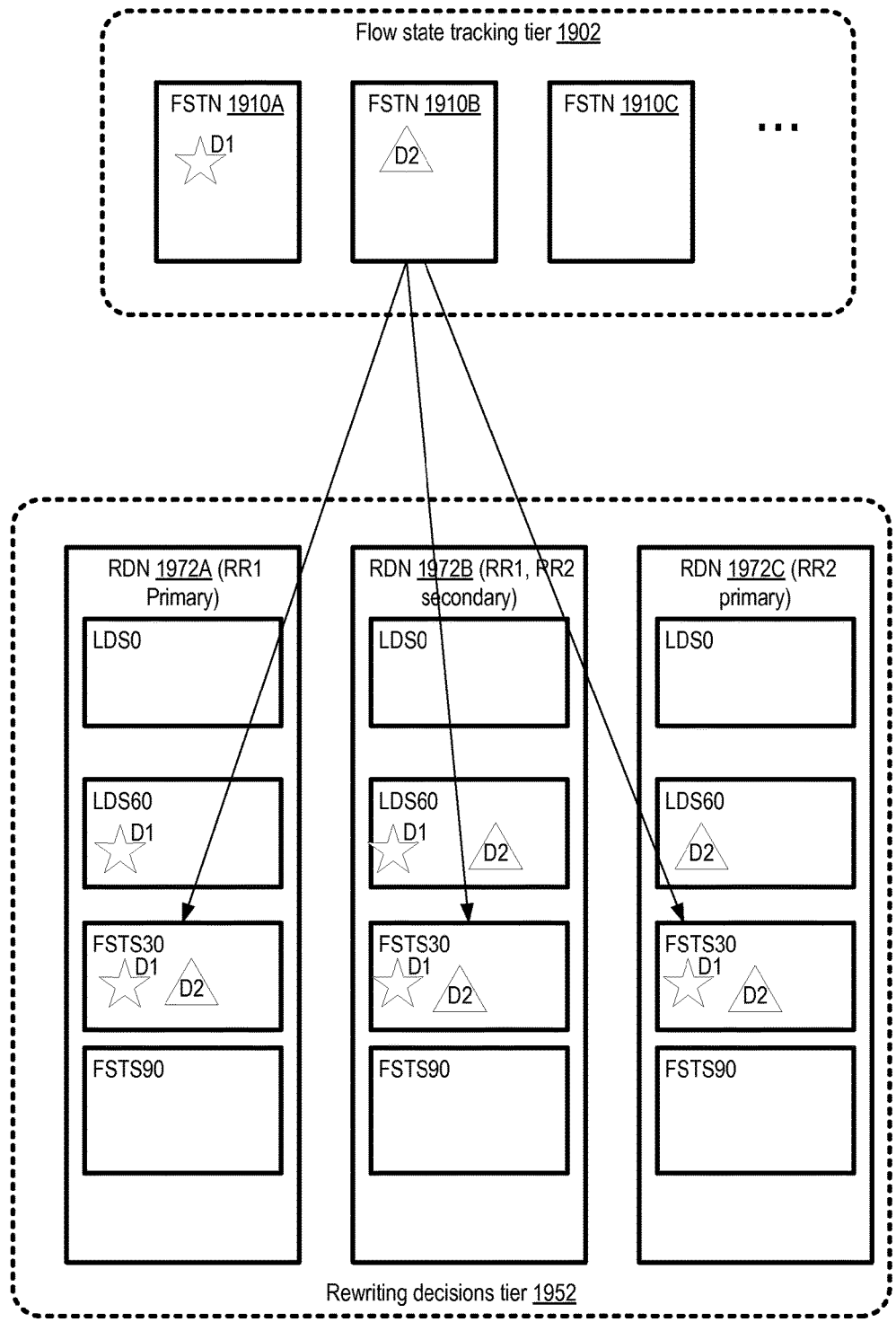

At time T6, approximately 30 seconds after FTSN 1910B received a notification regarding D2 from RDN 1972B, FSTN 1910B may send its summary to the RDNs 1972, as shown in FIG. 19g. At the RDNs, the received summaries may be aggregated commutatively with the existing FSTS30 objects. At this point, each FSTS30 object contains information about the decision notifications which have been received at FSTNs from a plurality of RDNs. Thus, for example, even though RDN 1972A is neither the primary nor the secondary with respect to packet transformation requirement Req2, RDN 1972 has also received information regarding D2 via the FST tier. Thus, the flow state tracking tier may serve as an intermediary for propagating rewriting decision information among RDNs in the depicted embodiment.

Figure 19H:
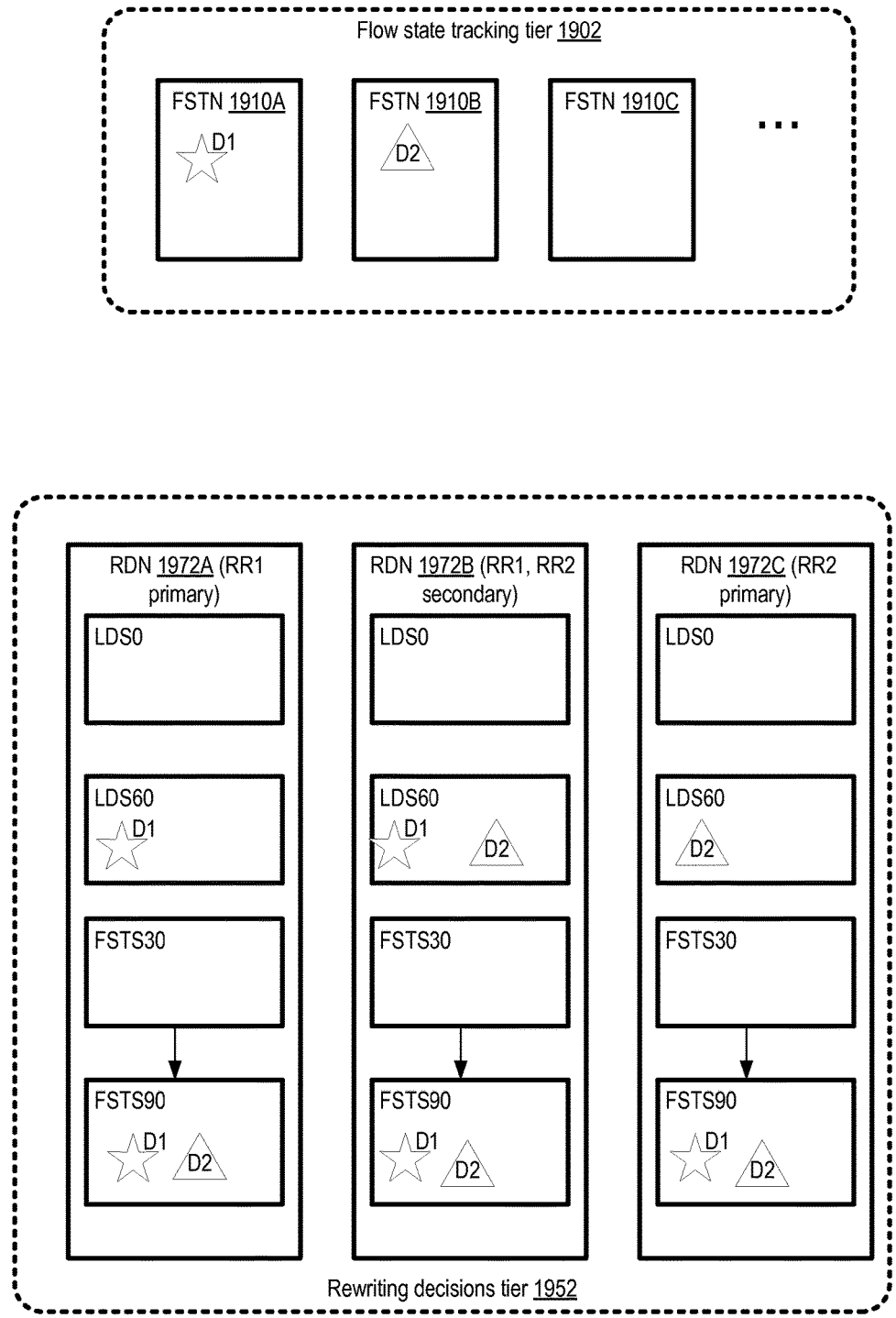

In FIG. 19h, the state of the summary objects at the RDNs at T7, approximately 90 seconds after T0, is shown. The respective FST30 contents have been demoted to the FSTS90 objects, and new empty or zeroed-out FST30 objects have been created. Two different FST summaries (FSTS30 and FSTS90) may be maintained at each RDN 1972 in the depicted embodiment at least in part because the updates from the FSTNs may in general be asynchronous with respect to each other, so the metadata transmitted back to the RDNs may be considered eventually consistent rather than strictly consistent in such embodiments. It may therefore be important to retain a second older version of the information received from the flow state tracking tier at each RDN, instead of assuming that information relevant to future local decisions is necessarily fully captured in the FST30 objects at all times.

Figure 19I:
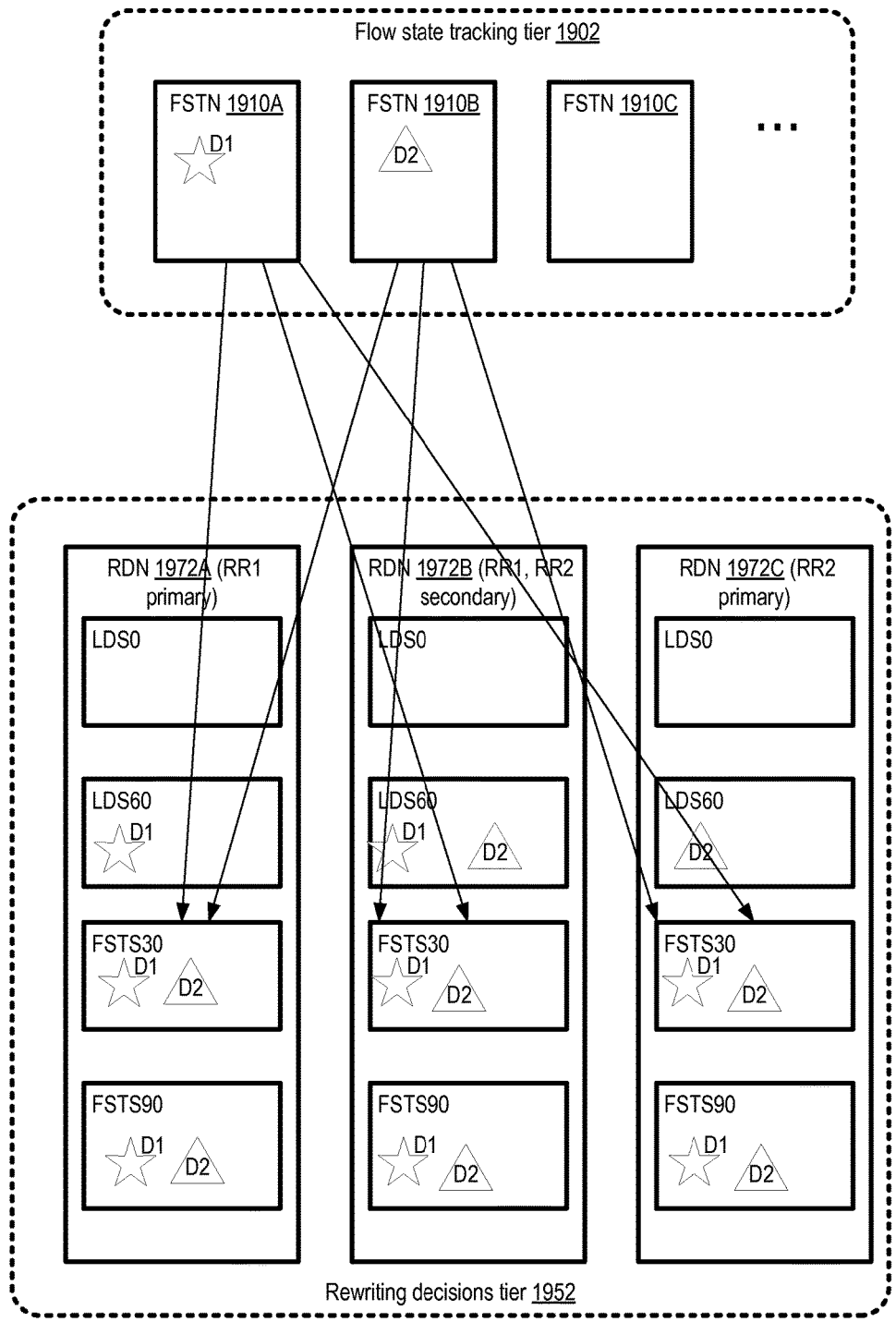

By some time T8, the FSTNs 1910 may each have propagated their latest metadata summaries once again to the RDNs 1972. The received metadata summaries may be stored in the FSTS30 objects at the RDNs, as indicated in FIG. 19i.

Figure 19J:
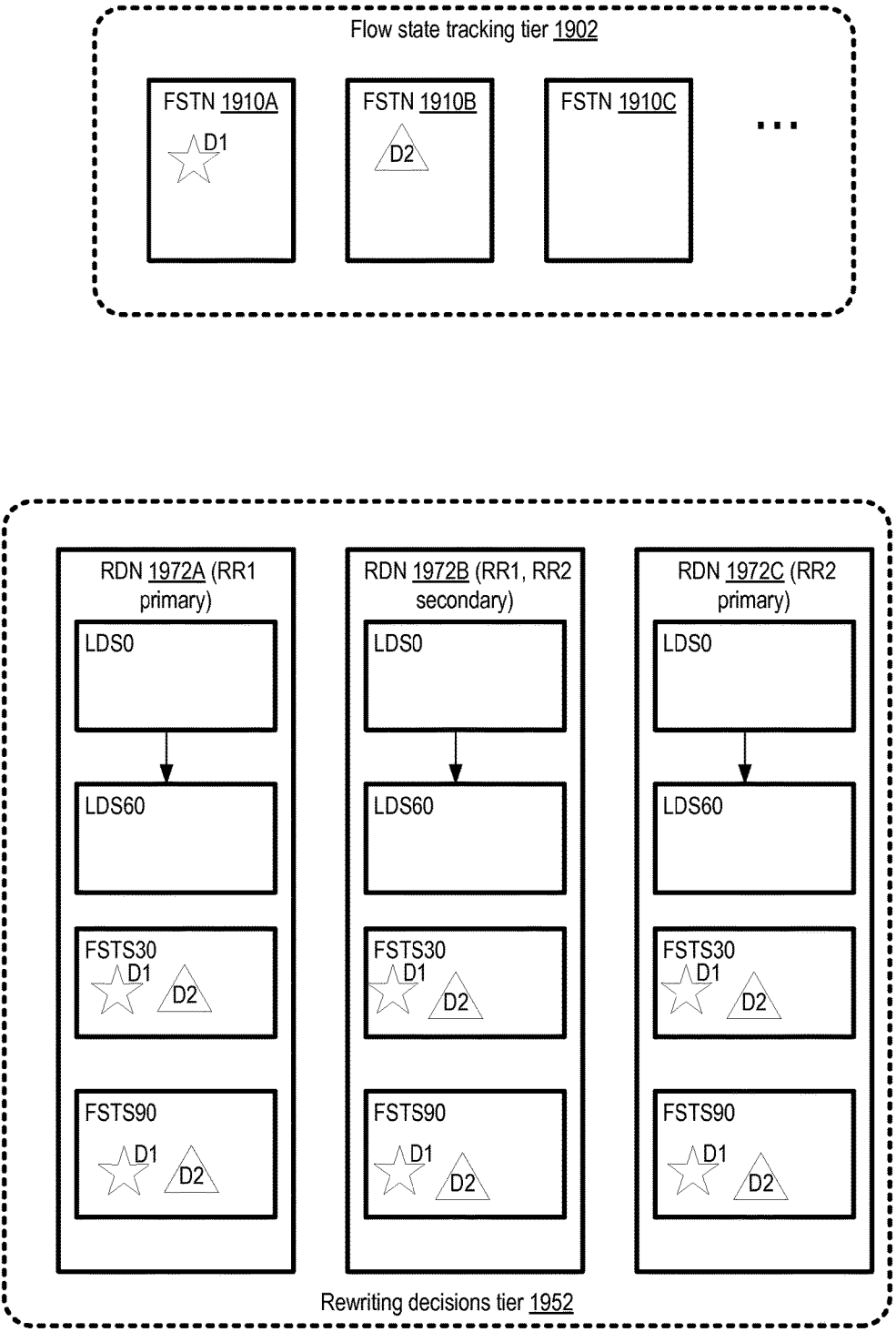

In FIG. 19j, the situation at a time T9, approximately 120 seconds after T0, is shown. At this point, the LDS0 contents may be demoted, overwriting the LDS60 contents, thereby erasing the representations of older local decisions made at each of the RDNs. However, information regarding those decisions may still remain in the FSTS objects at each of the RDNs. Thus, any new decisions, which are made after examining aggregated contents of all the four summary objects in the depicted embodiments, may take those earlier decisions into account.

Figure 19K:
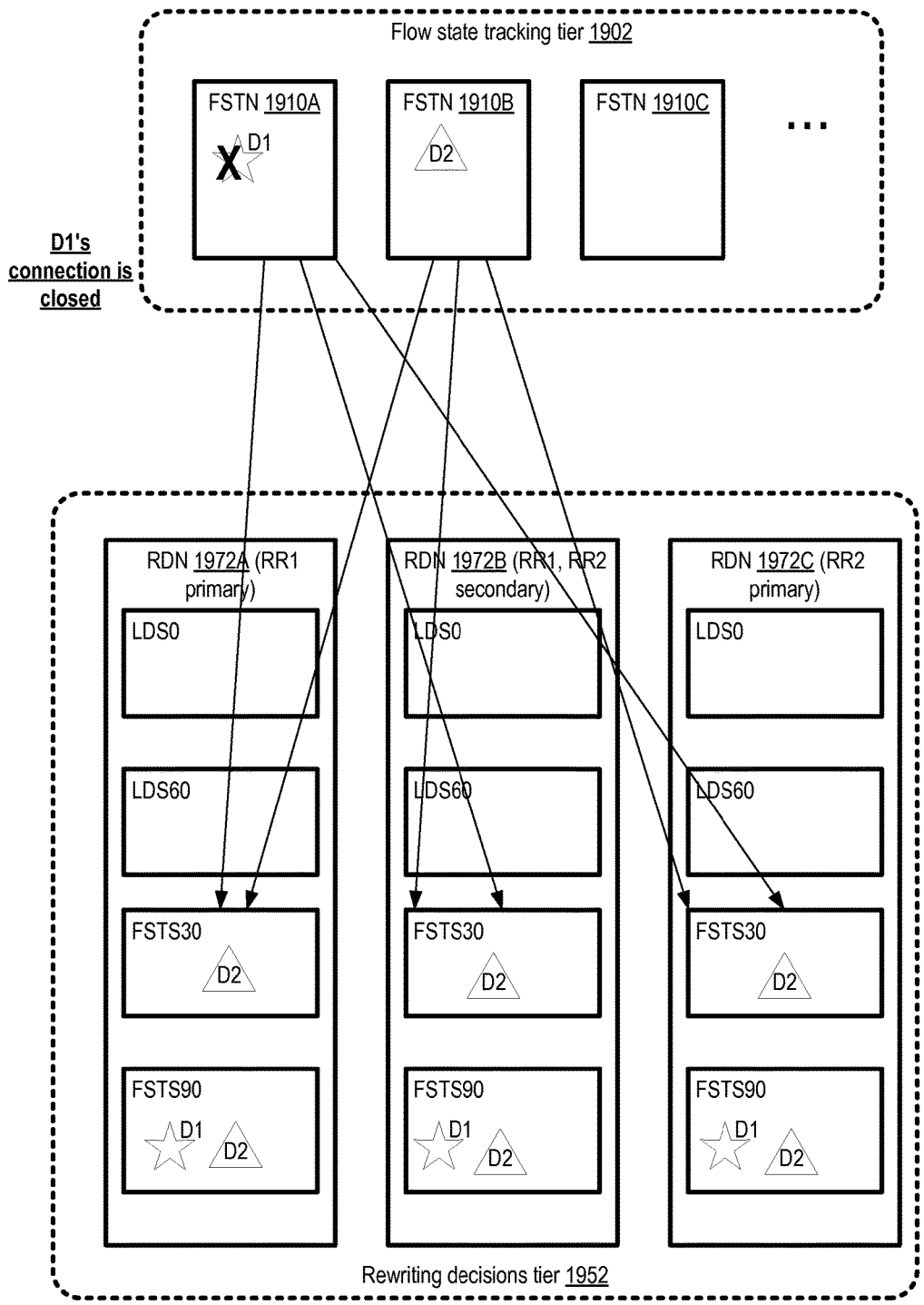
Figure 19I:
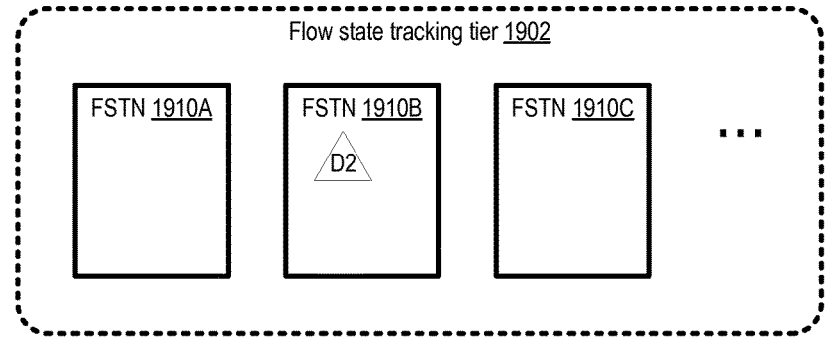
Figure 19I:
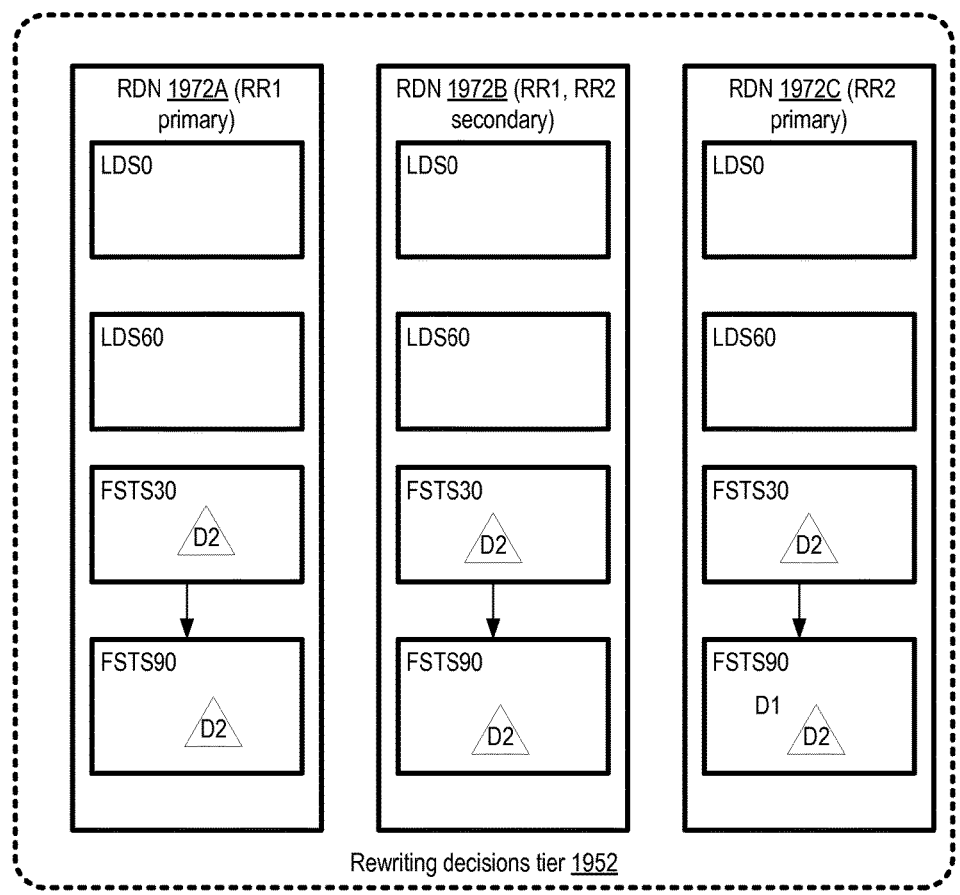

In the absence of any new flows, the state of the summary objects may remain as indicated in FIG. 19j for some time. The periodic demotions from FSTS30s to FSTS90s, and from LDS0s to LDS60s, may continue, but the different flows for which entries are included in the various summaries may remain the same. Eventually, in the example scenario being illustrated, a connection associated with decision D1 may be closed (e.g., at the request of either endpoint involved in the connection). If D1's connection is closed, FSTN 1910A may be notified of the connection termination (e.g., in a flow state update message sent by the appropriate PTN which detects the closing of the connection). As indicated in FIG. 19k, at some time T10 after the connection is closed, in its next set of summary messages sent to the RDNs, FSTN 1910A may no longer include D1, so the FST30 objects at the various RDNs would no longer have any record of D1.

At time T11, within approximately 30 seconds of T10, the contents of the FSTS30 summaries would be demoted as shown in FIG. 19l, resulting in the removal of any records with respect to D1 from all of the summary objects at all of the RDNs. When making subsequent rewriting decisions, the RDNs would therefore no longer take D1 into account, as would be appropriate since the flow corresponding to D1 no longer exists in the depicted example. Thus, for example, if source address substitution were being implemented using D1, the substitute (address, port) combination used for D1 may once again be available for assignment to a different flow. Of course, in practice, far more decisions may typically be made at an FMS in a time period of the duration illustrated in FIG. 19a-FIG. 19l; the example scenario has been limited to just two flows to illustrate the concepts of probabilistic summary aggregation-demotion cycles which may be employed in various embodiments.

Methods for Implementing Stateful Flow Management

Figure 20:
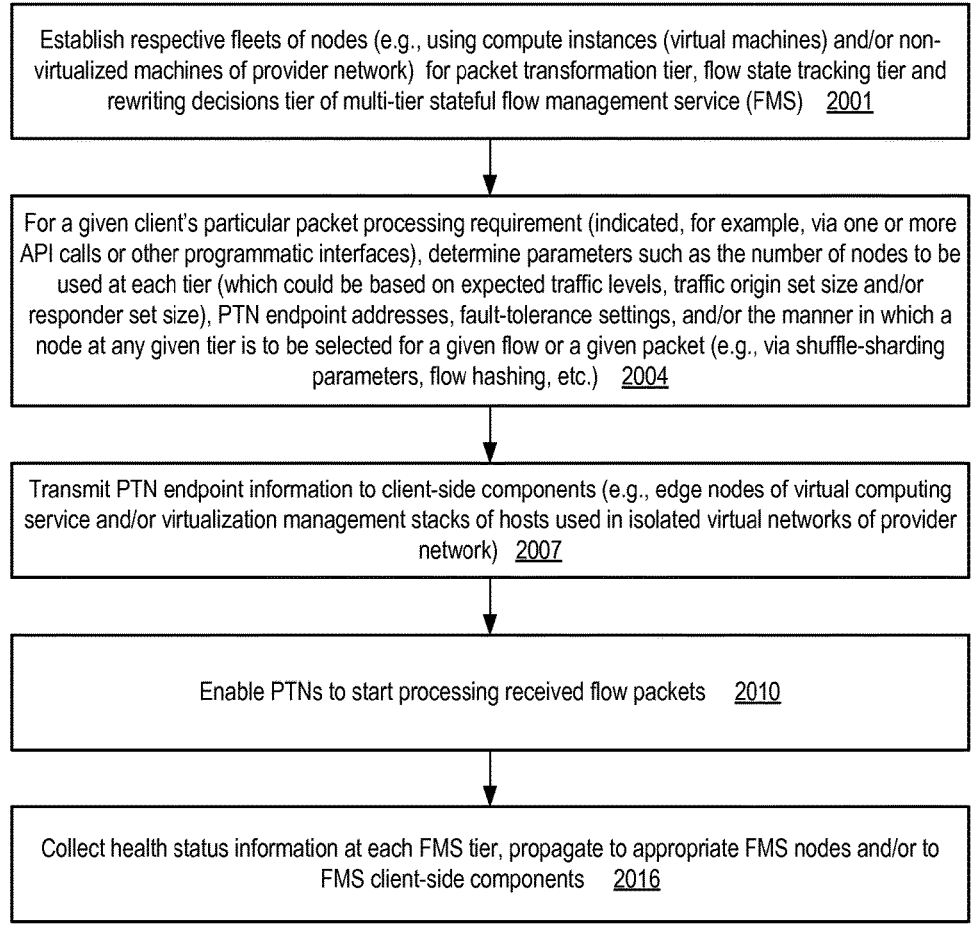
FIG. 20 is a flow diagram illustrating aspects of operations that may be performed to configure components of a flow management service for one or more clients, according to at least some embodiments.

FIG. 20 is a flow diagram illustrating aspects of operations that may be performed to configure components of a flow management service for one or more clients, according to at least some embodiments. As shown in element 2001, respective fleets of nodes may be set up for the packet transformation tier, the flow state tracking tier and/or the rewriting decisions tier of a flow management service. In some embodiments, some or all of the nodes at one or more tiers may be implemented using virtual machines (e.g., guest virtual machines of a virtual computing service of a provider network), while in other embodiments non-virtualized machines may be used for at least some nodes at one or more tiers.

A particular packet rewriting/transformation requirement of a client may be determined, e.g., in response to an invocation of a programmatic interface such as an API associated with the flow management service. A number of parameters governing the fulfillment of the requirement may be determined (element 2004). Such parameters may include, for example, the number of nodes at each tier which are designated to process the client's packets, the particular nodes of the fleet which are to be used (e.g., identified via client identifier-based shuffle-sharding) at each tier, the manner in which a given node is to be selected as the target for a given packet or flow (e.g., the details of the flow hashing technique to be used), the fault-tolerance technique to be used at each tier (e.g., how primary and/or secondary nodes are to be assigned, the number of replicas of rewriting decisions or rewrite entries to be stored at each tier, etc.). In at least some embodiments a particular set of endpoint addresses assigned to the packet transformation tier for the client may be identified as well. Some of the parameters (such as the number of nodes at the packet transformation tier and/or other tiers) may be selected based at least in part on an estimate of the expected packet processing rate, the size of the traffic origin set and/or the size of the responder set.

Endpoint information (such as the network addresses associated with the packet transformation nodes to be used for the flow management operations to be performed to fulfill the requirement) may be transmitted to client-side components from which the packets are going to be transmitted to the packet transformation tier (element 2007). Such client-side components may include, for example, edge devices of a virtual computing service and/or virtualization management components implemented at various virtualization hosts. Client-side components may also include non-virtualized hosts in at least one embodiment. In some embodiments in which at least some portions of client applications are executed within isolated virtual networks, one or more client-side components may be in an isolated virtual network, or have access to an isolated virtual network.

After the needed endpoint information has been provided to client-side components, the packet transformation nodes may be permitted to start processing received packets (element 2010), e.g., using rewrite entries and/or directives that are originally produced at the rewriting decisions tier of the flow management service and eventually cached at the packet transformation nodes. In various embodiments, health state information may be collected for the various tiers of the service (element 2013) and propagated to the nodes of the various tiers (and/or to the client-side components). Such health state information may be used, for example, to select the target nodes to be used at each tier for a given packet—e.g., if a health state update indicates that a primary rewriting decisions node has failed or become unreachable, a request for a rewrite entry may be sent to the secondary rewriting decisions node, that secondary may be promoted to primary status, and/or a new secondary may be identified.

Figure 21:
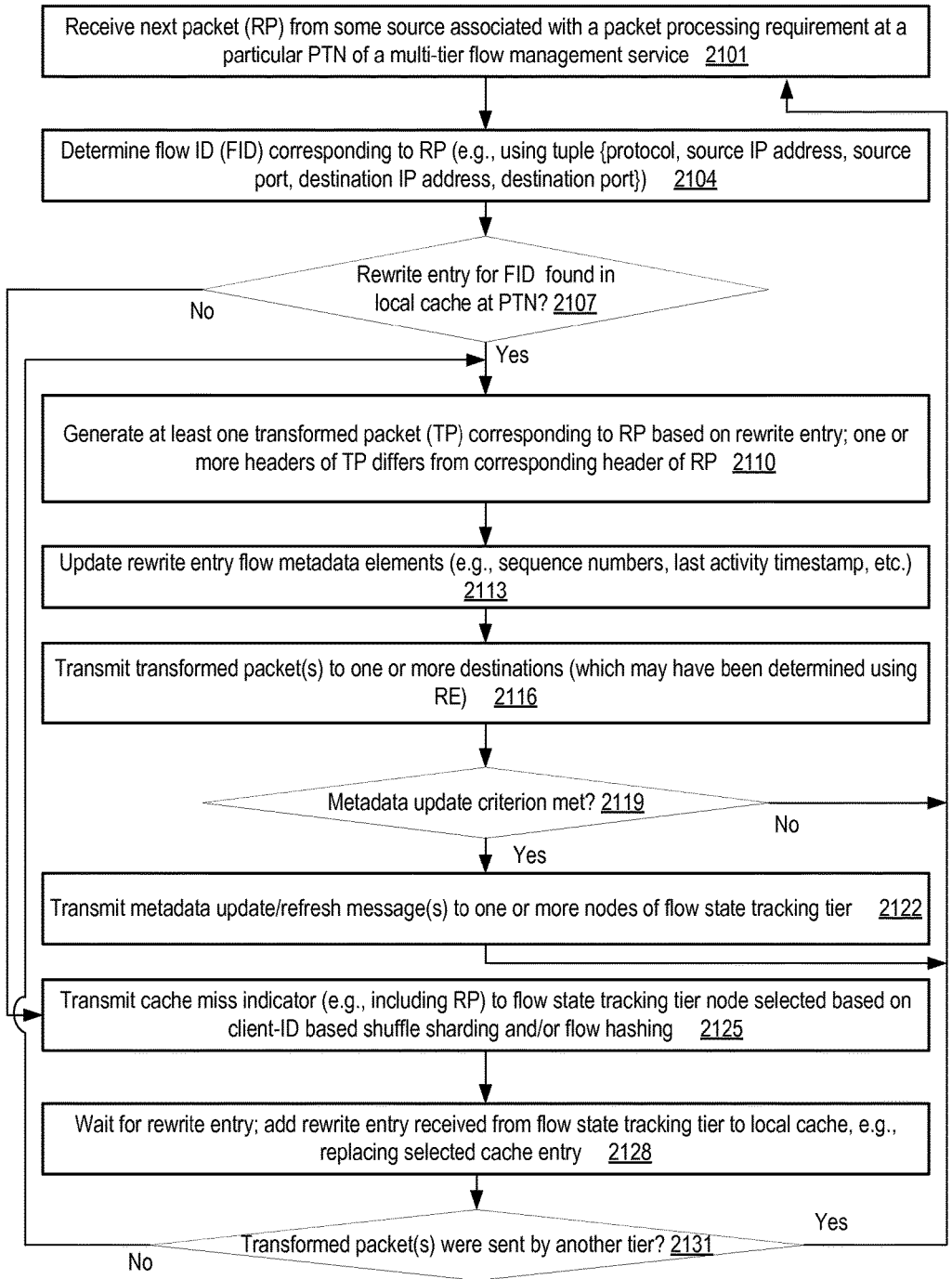
FIG. 21 is a flow diagram illustrating aspects of operations that may be performed at a packet transformation node of a flow management service, according to at least some embodiments.

FIG. 21 is a flow diagram illustrating aspects of operations that may be performed at a packet transformation node of a flow management service, according to at least some embodiments. As shown in element 2101, a particular packet (designated RP for "received packet" in FIG. 21) may be detected or received from some source associated with a client's packet processing requirement at a particular packet transformation node (PTN) of a multi-tier flow management service. As mentioned earlier, received packets may also be termed "inbound" packets with respect to the flow management service, whereas the packets sent from the flow management service after the received packets have been processes may be termed "outbound" packets. The flow identifier (FID) corresponding to the packet may be determined, e.g., using a combination of header elements of the packet such as the source and destination addresses, the source and destination ports, and/or the protocol (element 2104).

A cache lookup based on the FID may be performed, to check whether a local cache of rewrite entries contains an entry applicable to RP (element 2107). If such a rewrite entry is found, at least one outbound or transformed packet (TP) corresponding to RP may be generated (element 2110) in the depicted embodiment, such that at least one header element of TP differs from the corresponding header element of RP. Metadata associated with the flow to which FP belongs may be updated (element 2113), e.g., by changing a sequence number field, window size field, last activity timestamp field or the like within the rewrite entry. In some implementations the rewrite directive elements (i.e., the rules to be used to populate the header fields of the outbound or transformed packets, or to determine how many outbound packets are to be generated per inbound packet) may be stored and/or cached separately from the flow state metadata elements.

The transformed or outbound packets may be transmitted towards their destinations (which may themselves have been selected on the basis of the rewrite directives) from the PTN (element 2116). If a criterion for scheduling metadata update messages directed to the flow state tracking tier is met (as determined in element 2119), the PTN may transmit such a message to one or more nodes of the flow state tracking tier (element 2122). The format of the metadata update messages may differ in various embodiments—e.g., in some embodiments, a collection of rewrite entries of the kind shown in FIG. 4 may be sent, while in other embodiments summarized flow state metadata (which may use probabilistic data structures of the kind discussed with respect to FIG. 18) may also or instead be sent. Operations corresponding to elements 2101 onwards may then be repeated for the next received packet.

If a cache miss occurs (as also detected in operations corresponding to element 2107), an indication of the cache miss may be sent to the flow state tracking tier (element 2125). In some embodiments the received packet RP may be sent to the flow state tracking tier to indicate the cache miss, and a transformed packet or packets may be generated at the flow state tracking tier and transmitted from the flow state tracking tier.

After the indication of the cache miss is transmitted, the PTN may wait to receive a response containing a rewrite entry applicable to RP (element 2128). When such an entry is received it may be added to the local cache at the PTN, which in some cases may require replacing an existing cached entry. The victim entry for replacement may be selected based on various criteria in different embodiments, e.g., based on a least-recently-used algorithm. The PTN may determine (e.g., based on the cache miss response) whether a transformed packet or packets corresponding to RP have already been sent from a different tier of the service (e.g., the flow state tracking tier or the rewriting decisions tier) (element 2131). If no such packets have been sent, the PTN may now perform the operations corresponding to a cache hit (element 2110 onwards). Otherwise, the PTN may process the next received packet when it arrives, and the operations corresponding to elements 2101 onwards may be performed for that packet. It is noted that the operations to schedule a metadata update to the flow state tracking tier may be performed independently and/or asynchronously with respect to the other operations performed at the PTN in at least some embodiments—e.g., an asynchronous thread of the PTN may be responsible for periodically pushing such updates, instead of or in addition to transmitting such updates after transmitting transformed packets to their destinations as shown in FIG. 21.

Figure 22:
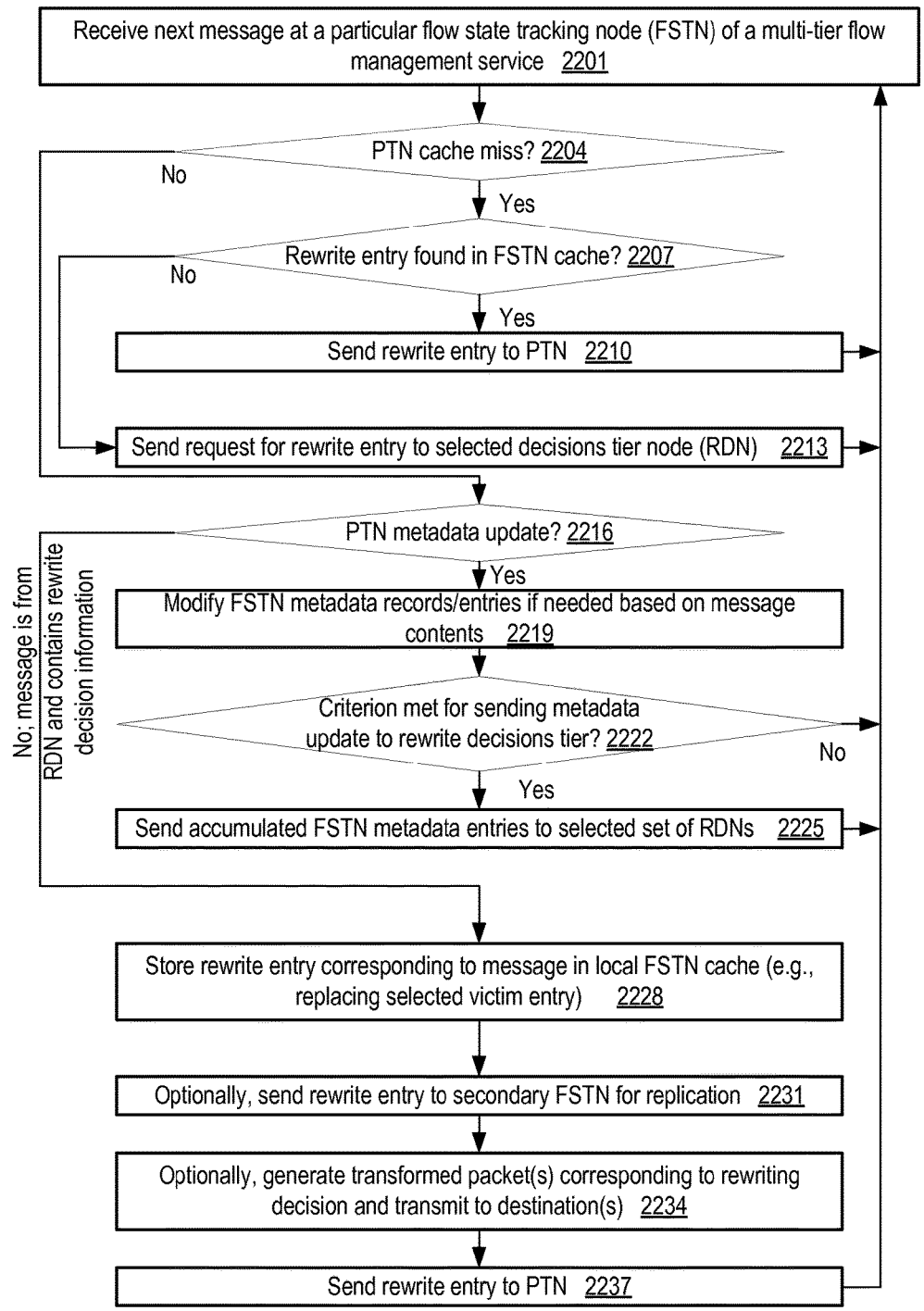
FIG. 22 is a flow diagram illustrating aspects of operations that may be performed at a flow state tracking node of a flow management service, according to at least some embodiments.

FIG. 22 is a flow diagram illustrating aspects of operations that may be performed at a flow state tracking node of a flow management service, according to at least some embodiments. As shown in element 2201, a message may be received at a particular flow state tracking node (FSTN) of a flow management service. The message may have originated at the packet transformation tier of the service, or it may have originated at the rewriting decisions tier. If the message indicates a cache miss at the rewrite entry cache of a packet transformation node (as detected in element 2204), the FSTN may determine whether a rewrite entry corresponding to the message exists in the FSTN's own cache of rewrite entries (element 2207). Such a cache may be maintained in some embodiments for rewrite entries transmitted to the FSTN from one or more rewrite decisions nodes. If the rewrite entry is found in the FSTN's cache, the entry may be sent in a cache miss response to the PTN (element 2210), and the FSTN may proceed to process the next message it receives. If the rewrite entry is not found in the FSTN's cache, a request for the entry may be sent to a selected rewriting decisions node (element 2213) to complete the FSTN processing associated with the cache miss message in the depicted embodiment.

If the message received at the FSTN represents a metadata update from the packet transformation tier (as detected in element 2216), the FSTN may update its metadata records and/or summaries based on the contents of the message (element 2219). In the depicted embodiment, the FSTN may be responsible for sending flow metadata updates to the rewriting decisions tier, e.g., based on various scheduling criteria such as an expiration of a time interval. If such a scheduling criterion is met (as detected in element 2222), the FSTN may send accumulated metadata entries, records, or summaries to selected rewriting decisions nodes (element 2225).

If the message received at the FSTN was neither an indication of a cache miss at a PTN, nor a metadata update from a PTN (as determined in the combination of elements 2204 and 2216), it may comprise an indication of a rewriting decision (such as a rewrite entry or a rewrite directive) generated at an RDN. In this scenario, the FSTN may store a rewrite entry corresponding to the message contents in an FSTN cache (element 2228). In some cases this may require the selection of a currently-cached entry for eviction, e.g., in accordance with an LRU eviction policy or some other replacement technique. In some embodiments the FSTN may optionally initiate the replication of the new rewrite entry at one or more additional FSTNs (element 2231). In at least one embodiment, the FSTN may optionally implement a rewrite directive received from the rewriting decisions tier (element 2234). For example, one or more transformed packets corresponding to the received packet which led to the creation of the rewrite entry may be produced at the FSTN itself and transmitted to their destinations, instead of relying on the packet transformation tier to produce the transformed packets. The rewrite entry may be sent on to the PTN at which the corresponding cache miss was encountered (element 2237). After the processing of the received message is complete, the FSTN may proceed to the next message and perform operations corresponding to elements 2201 onwards for that message. It is noted that the operations to schedule a metadata update to the rewriting decisions tier may be performed independently and/or asynchronously with respect to the other operations performed at the FSTN in at least some embodiments—e.g., an asynchronous thread of the FSTN may be responsible for periodically pushing such updates, instead of or in addition to transmitting such updates after a PTN metadata update is received as shown in FIG. 22.

Figure 23:
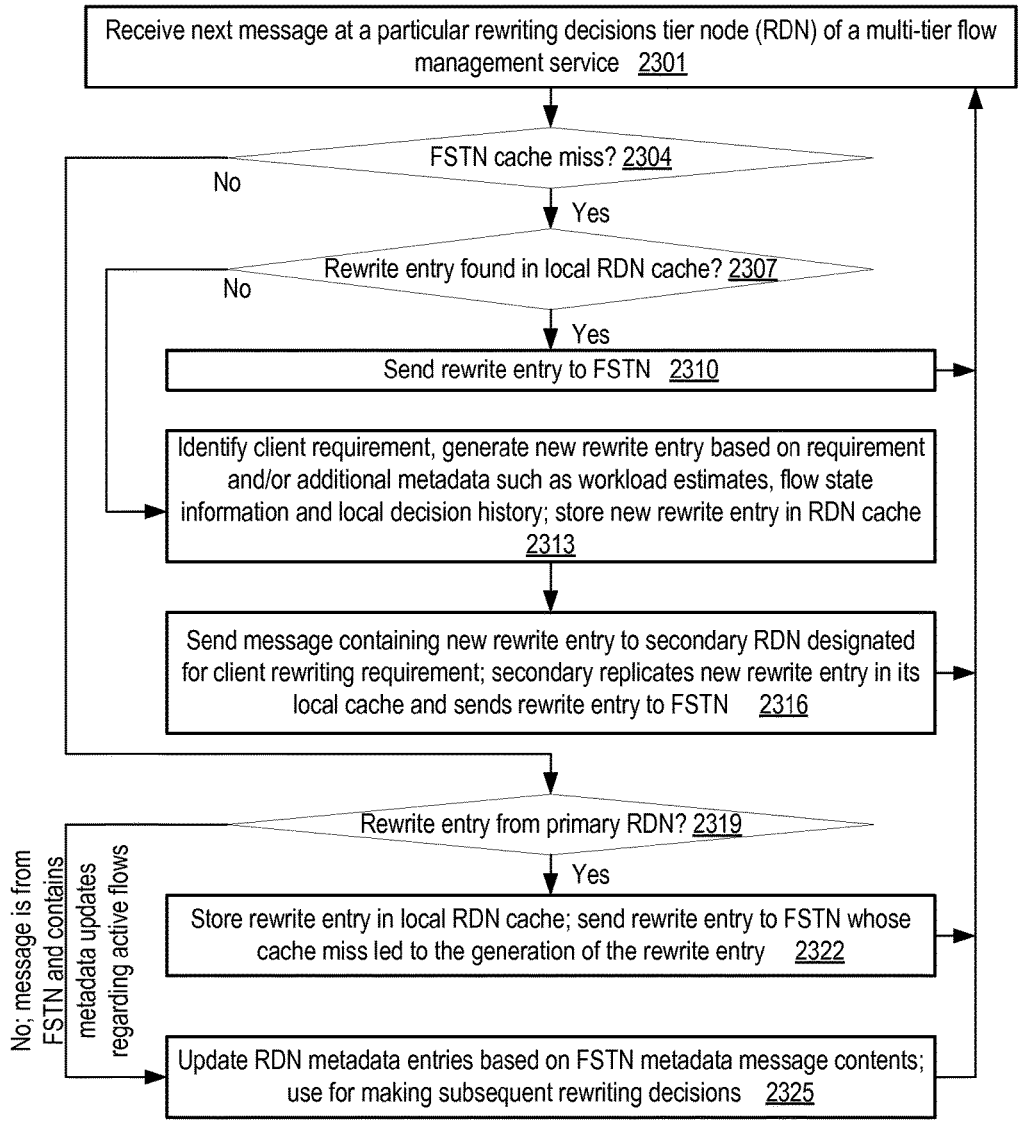
FIG. 23 is a flow diagram illustrating aspects of operations that may be performed at a rewriting decisions node of a flow management service, according to at least some embodiments.

FIG. 23 is a flow diagram illustrating aspects of operations that may be performed at a rewriting decisions node of a flow management service, according to at least some embodiments. As shown in element 2301, a message may be received at a particular rewriting decisions node (RDN). The message may either be from an FSTN, or from another RDN in the depicted embodiment. In the depicted embodiment, the RDN may maintain a cache of its own rewriting decisions or the corresponding rewrite entries. If the message indicates an FSTN cache miss (or a request for a rewrite entry/directive) (as detected in element 2304), and a corresponding rewrite entry or directive is present in the cache at the RDN (as detected in element 2307), the entry may be provided to the FSTN (element 2310).

If no such entry is found (as also detected in element 2307), the RDN may need to produce a new rewrite entry. The details of the client's packet processing requirement associated with the cache miss may be identified (e.g., based on a lookup indexed by the flow identifier of the received packet, which may indicate a particular virtual network interface endpoint address that corresponds to the client's requirement). The new rewrite entry (including the details of the rewrite directive, similar to those shown in FIG. 2) may be produced (element 2313), based for example on the client's requirement, accumulated history of earlier rewriting decisions and/or flow state metadata received from the state tracking tier. A message containing the new rewrite entry may be sent for replication to at least one other RDN, such as a secondary RDN identified for the client requirement (element 2316). In some embodiments the rewrite entry may be sent from the other RDN to the FSTN where the cache miss occurred; in other embodiments the RDN at which the rewrite entry is generated may send it to the FSTN.

In the embodiment depicted in FIG. 23, if the message received at the RDN is a rewrite entry from another RDN (as detected in element 2319), this may imply that the recipient of the message is a secondary RDN (or another RDN in a multi-node replication chain for the entry). Accordingly, the received entry may be replicated locally, and sent to the FSTN from which an indication of a cache miss for the entry was received (element 2322).

If the message received at the RDN was neither a cache miss indication nor a rewrite entry from a peer RDN (as detected cumulatively in elements 2304 and 2319), the message may comprise a metadata update from an FSTN. In this scenario, the RDN may update its metadata based on the contents of the message, and may use the updated metadata to make subsequent rewriting decisions (element 2325). As mentioned earlier, probabilistic metadata summaries may be transmitted among various tiers of the flow management service in some embodiments, and such summaries may be included in the messages whose processing is indicated in element 2325. After the processing for a given message is completed, the next message received may be processed in the depicted embodiment, and operations corresponding to elements 2301 onwards may be repeated for that message. It is noted that at least in some embodiments, multiple messages and/or packets may be processed in parallel at a given node at any of the tiers of the flow processing service.

Figure 24:
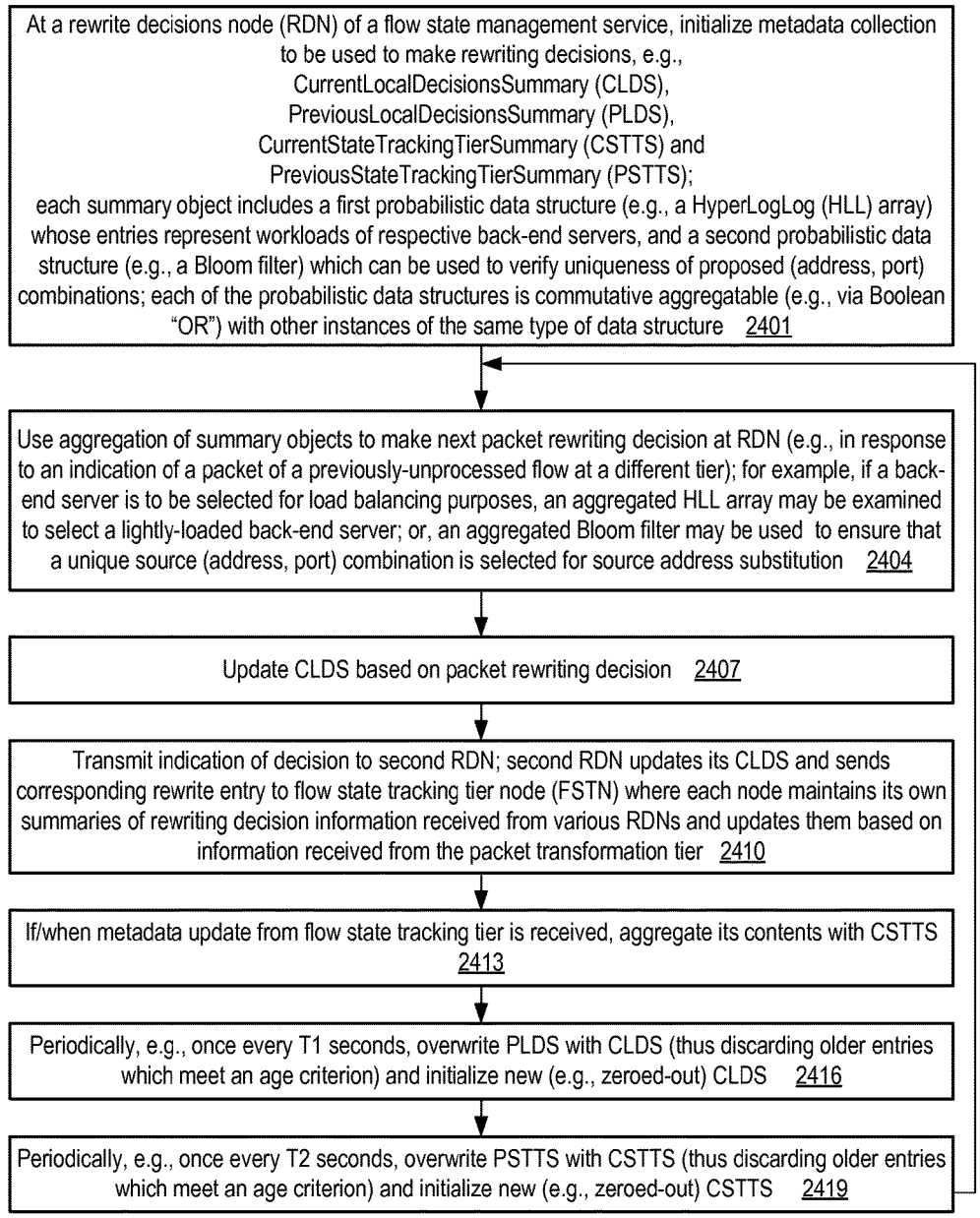
FIG. 24 is a flow diagram illustrating aspects of operations that may be performed for metadata synchronization at a flow management service, according to at least some embodiments.

FIG. 24 is a flow diagram illustrating aspects of operations that may be performed for metadata synchronization at a flow management service, according to at least some embodiments. As shown in element 2401, a metadata collection comprising several different summary objects may be maintained at a rewriting decisions node (RDN) of the service. For example, two local decisions summaries may be maintained in the depicted embodiment: a current and a previous summary of rewriting decisions made at the RDN, which are referred to in FIG. 24 as the CLDS (current local decisions summary) and PLDS (previous local decisions summary) respectively. Similarly, a current and a previous summary of metadata received from the flow state tracking tier may also be maintained, referred to as the CSTTS (current state tracking tier summary) and PSTTS (previous state tracking tier summary) in FIG. 24. A different number of summaries than four may be used in some embodiments. In general, the summaries of the metadata collection may be updated iteratively, with older metadata being replaced by newer metadata. In various embodiments, probabilistic data structures may be used for at least some of the summaries. For example, a summary may include a HyperLogLog (HLL) array for representing relative workloads at different back-end servers of a pool of back-end servers for which load balancing is to be implemented. In another example, a given summary could include a Bloom filter whose entries correspond to combinations of addresses and ports which have been assigned in previous rewriting decisions (e.g., for source address substitution). The data structures used for the summaries in at least some embodiments may be commutatively aggregated—e.g., two Bloom filter bit arrays may be combined using a Boolean "OR" operation, and the resulting combined Bloom filter may contain all the information that was in the original arrays. Similarly, HLLs may be combined commutatively without loss of information. As discussed earlier in the context of FIG. 18, the summary structures used for the metadata collection may be considered approximations of the rewriting decisions that have been made previously, rather than exact representations of the earlier decisions.

When a new rewriting decision is to be made at the RDN (e.g., in response to a cache miss at one or both of the other tiers of the flow management service), one or more parameters of the corresponding rewrite entry or directive may be made using an aggregation of the summaries in the depicted embodiment (element 2404). For example, the aggregated summaries may be used to select a lightly-loaded back-end server, or to identify an (address, port) combination that has not already been assigned in some other rewriting decision and is therefore available for assignment. After the decision is made, the CLDS may be updated to reflect the decision (element 2407).

In the depicted embodiment, an indication of the rewriting decision may be transmitted to at least a second RDN (e.g., the secondary RDN with respect to the rewriting requirement being fulfilled) for replication in that second RDN's CLDS (element 2410). In some embodiments, entries for the decision may be replicated at more than two RDNs, while in other embodiments replication of the decision entry may not be required. In the depicted embodiment, the second RDN may transmit a notification indicative of the decision to a flow state tracking node (FSTN). The FSTN may maintain its own summaries using similar probabilistic and commutatively aggregated data structures in the depicted embodiment. The summaries at the FSTN may be updated in some embodiments based on two types of notifications: notifications regarding new rewriting decisions made at the RDNs, and notifications or messages from the packet transformation tier regarding the state of various flows. For example, if a connection associated with a particular rewrite entry is closed, an update indicating that connection's state may be transmitted from the packet transformation tier to the FSTN.

If and when metadata update messages (e.g., messages containing summaries from an FSTN) are received at the RDN, the current state tracking tier summary (CSTTS) at the RDN may be modified to reflect the contents of the messages (element 2413), e.g., using the same kinds of commutative aggregation techniques as are used to combine the summaries locally. Periodically, e.g., once every T1 seconds (where T1 may be a tunable parameter) the contents of the PLDS may be overwritten or substituted by the contents of the CLDS in the depicted embodiment, thus in effect discarding older local decisions metadata which meets a particular age criterion (element 2416). Similarly, once every T2 seconds (where T2 may be a tunable parameter), the contents of the PSTTS may be overwritten or substituted by the contents of the CSTTS in the depicted embodiment, thus in effect discarding older metadata from the flow state tracking tier which meets a particular age criterion (element 2419). The operations illustrated in elements 2404 onwards may be repeated (using the updated versions of the summaries) for various rewrite decisions and for various iterations of the aggregation-demotion cycle. Of course, in some stable situations in which for example a set of flows continues for a time interval and no new rewriting decisions need to be made during the interval, the summary objects may not need to be modified in some of the iterations—for example, no new local decisions may be added to the summaries, and the information from the flow state tracking tier may remain unchanged for some time.

Figure 25:
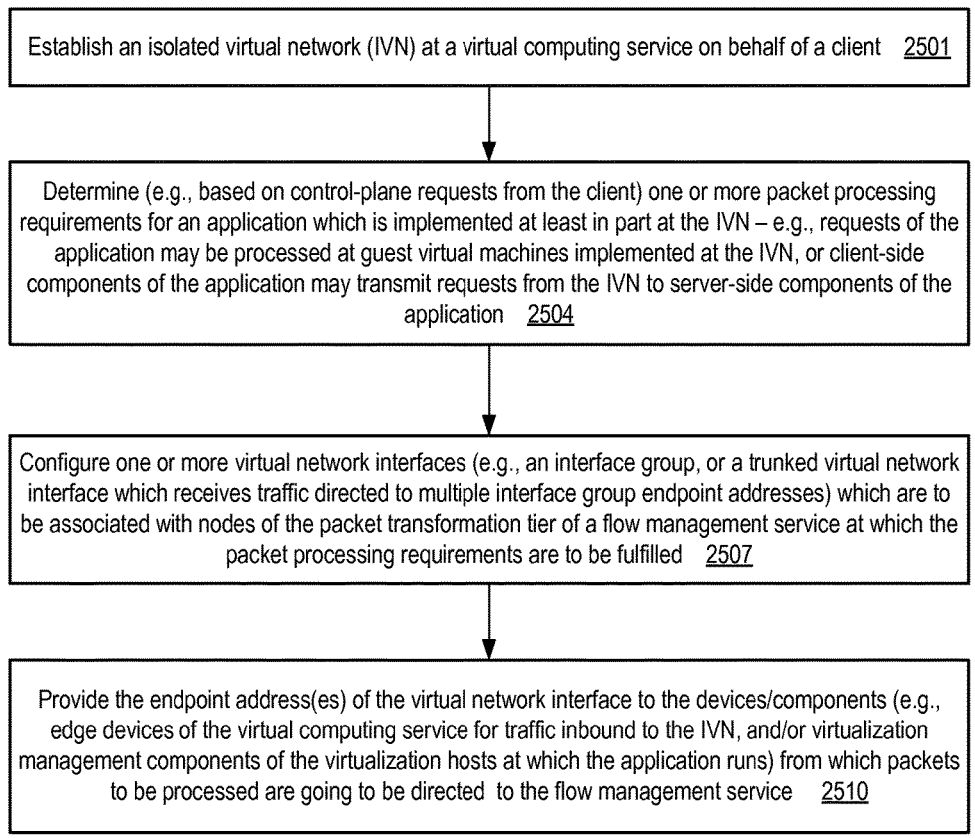
FIG. 25 is a flow diagram illustrating aspects of operations that may be performed at a control plane component of a virtual computing service at which a flow management service is to be used for packets associated with an application implemented at an isolated virtual network, according to at least some embodiments.

FIG. 25 is a flow diagram illustrating aspects of operations that may be performed at a control plane component of a virtual computing service at which a flow management service is to be used for packets associated with an application implemented at an isolated virtual network, according to at least some embodiments. The control plane or administrative component of the virtual computing service may, for example, be responsible at least in part for establishing isolated virtual networks (IVNs) of the kinds discussed earlier, and for managing various aspects of the networking configuration operations associated with the isolated virtual networks. As shown in element 2501, a particular IVN may be established on behalf of a client of the virtual computing service. The IVN may include a plurality of guest virtual machines instantiated at various virtualization hosts, for example, and one or more applications may be implemented at least in part on the guest virtual machines.

The control-plane component may determine, e.g., based on one or more requests received via a programmatic interface, a packet processing requirement associated with one or more of the applications implemented at the IVN (element 2504). In some cases, the packets of the flows for which transformations are to be performed may originate at the GVMs of the IVN, while in other cases the flows may be directed towards the GVMs of the IVN. For example, in some cases the packets may be transformed on their way towards the IVN, where responses to the transformed packets may be generated at one or more GVMs acting as server-side components of the application. In other cases, the GVMs may comprise client-side components of an application, and the packets generated at the GVMs may have to be transformed on their way towards server-side components. Depending on the application, as illustrated previously with respect to FIG. 11, the server-side components of such an application may reside at devices within the same IVN, a different IVN, a different service of the provider network, or external to the provider network.

One or more virtual network interfaces may be configured for a set of packet transformation nodes of the flow management service (element 2507) at which the packets of the application are to be processed. In some embodiments, an interface group of the kind described earlier may be established, with a single FMS endpoint address assigned to the group as a whole. In at least one embodiment, VNI trunking may be used, such that packets directed to endpoints associated with multiple interface groups (e.g., with each group designated for a respective packet processing requirement and/or a respective IVN application) may be handled at a single packet transformation node.

The endpoint addresses to be used to transmit packets associated with the processing requirement of the application may be provided to the appropriate client-side components of the flow management service (element 2510) from the control plane component in the depicted embodiment. For example, such client-side components may include one or more edge devices of the provider network or the virtual computing service, and/or a set of virtualization management components at various virtualization hosts at which the application may be run within the IVN. The endpoint addresses and/or other networking metadata associated with the IVN may be used at the client-side components to identify the particular set of packet processing nodes to which packets associated with a given application are to be sent for processing, and/or to identify the particular packet processing node to which the packets of a given flow are to be sent.

Figure 26:
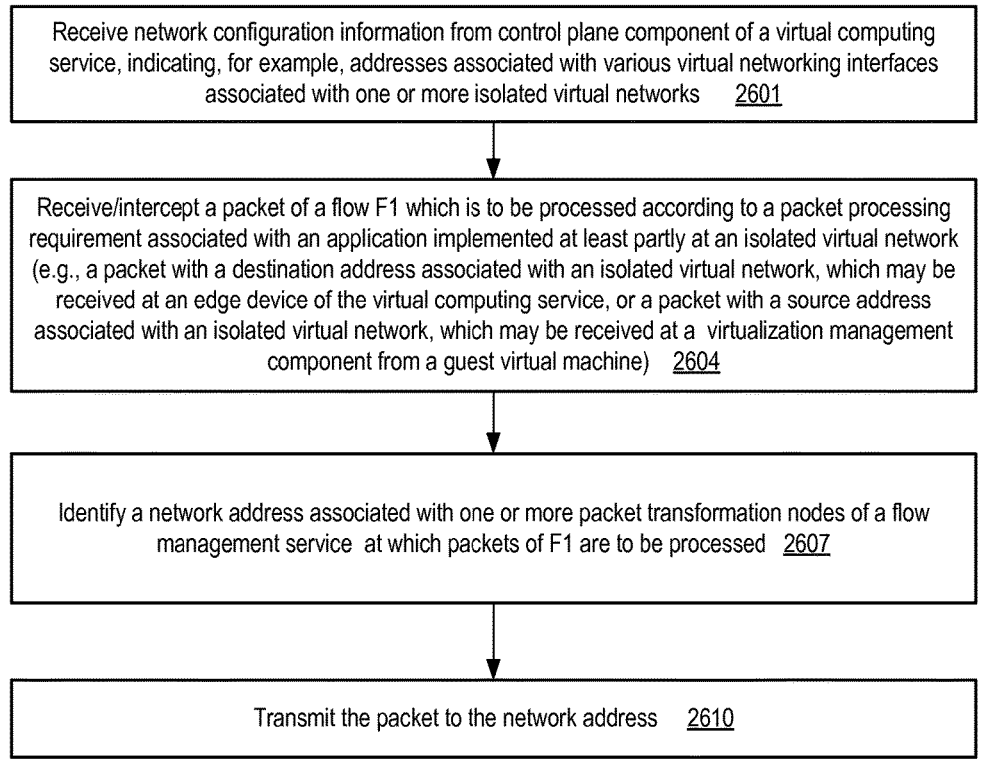
FIG. 26 is a flow diagram illustrating aspects of operations that may be performed at components of a virtual computing service from which packets associated with an isolated virtual network are transmitted to a flow management service, according to at least some embodiments.

FIG. 26 is a flow diagram illustrating aspects of operations that may be performed at components of a virtual computing service from which packets associated with an isolated virtual network are transmitted to a flow management service, according to at least some embodiments. As indicated earlier, such components may be referred to as client-side components of the flow management service, and may include for example edge devices (such as routers or gateways) of a virtual computing service or a provider network, and/or virtualization management components installed at the virtual hosts of a virtualized computing service. As shown in element 2601, the client-side components may receive networking configuration information from a control plane component of a virtual computing service at which one or more isolated virtual networks have been established on behalf of respective customers. The configuration information may include addresses assigned to various virtual network interfaces established at the various IVNs, including for example addresses associated with interface groups set up for various packet processing requirements of applications implemented at the IVNs.

A client-side component may receive or intercept a particular packet of a flow F1 for which packet processing is to be performed (element 2604) at the flow management service. Such a packet may be inbound with respect to an IVN in some cases—e.g., the packet may be received (from an external network or a different service of the provider network) at an edge device acting as the client-side component of the flow management service, and may indicate a destination address within an IVN which is associated with a packet processing requirement. In other cases, the packet may indicate a source address assigned to a guest virtual machine within the IVN, and may be intercepted at a virtualization management component of the corresponding virtualization host. Using the network configuration information it has previously received, the client-side component at which the packet is received or intercepted may select a particular network address, assigned to a virtual network interface attached to one or more packet transformation nodes of the flow management service (element 2607). The selection procedure may, for example, include flow hashing to select a target packet transformation node from among a set of nodes designated for the packet processing requirement. The client-side component may then transmit the packet to the address it has identified (element 2610) in the depicted embodiment.

It is noted that in various embodiments, operations other than those illustrated in the flow diagrams of FIG. 20-FIG. 26 may be used to implement at least some of the techniques for supporting flexible packet processing techniques using a multi-tier flow management service described above. Some of the operations shown may not be implemented in some embodiments, may be implemented in a different order than illustrated in FIG. 20-FIG. 26, or in parallel rather than sequentially. In various embodiments, for example, at least some nodes of one or more tiers of the flow management service may comprise multiple threads of execution, and may therefore be capable of processing multiple messages or packets concurrently.

Use Cases

The techniques described above, of establishing a scalable multi-tier framework for various categories of stateful flow processing, may be useful in a variety of scenarios. As more and more distributed services are migrated to provider network environments, including stateful services such as file stores that are intended to support session-like semantics, the need for efficient and fault-tolerant management of packet transformation operations based on rules that apply to multiple packets of a given flow is also increasing. The clean separation of function between a packet transformation tier, a flow state management tier and a rewriting decisions tier may simplify the rollout of new functionality or additional nodes at each of the tiers without affecting the work being done at the other tiers. In addition, multiplexing virtual network interfaces so that a single endpoint address can be used for packets of numerous flows associated with a given packet transformation requirement may make it easier to implement many distributed services, especially when the services are implemented within isolated virtual networks. Probabilistic flow metadata propagation involving the kinds of aggregation-demotion cycles described herein may reduce the memory and networking overhead associated with making various types of packet rewriting decisions, while still ensuring correctness.

Illustrative Computer System

Figure 27:
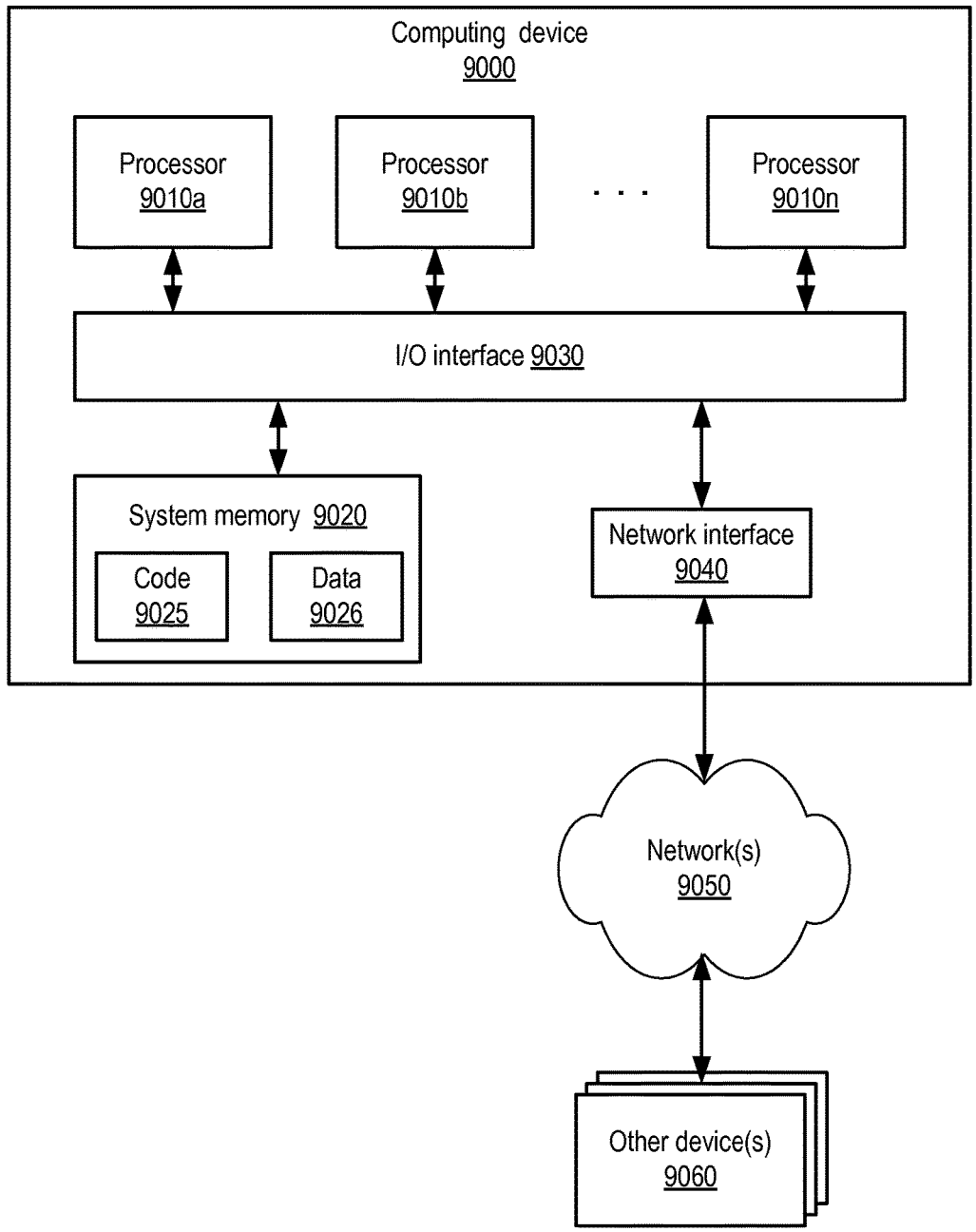
FIG. 27 is a block diagram illustrating an example computing device that may be used in at least some embodiments.

In at least some embodiments, a server that implements one or more of the control-plane and data-plane components that are used to support the stateful flow management techniques described herein may include a general-purpose computer system that includes or is configured to access one or more computer-accessible media. FIG. 27 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 26, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 26 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 27 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A multi-tier network flow management system, comprising:
   one or more nodes of a rewriting decisions tier; and a plurality of nodes of a packet transformation tier, including a first node and a second node;
   wherein a particular node of the rewriting decisions tier is configured to:
   determine, corresponding to a first packet processing requirement of a client, a first packet rewriting parameter set comprising one or more of: (a) a payload replication parameter indicating a number of outbound packets to be generated corresponding to a packet received at the flow management system, or (b) a source address substitution rule for outbound packets, or (c) a destination selection rule;
   determine, corresponding to a second packet processing requirement, a second packet rewriting parameter set, wherein the second packet rewriting parameter set differs from the first packet rewriting parameter set in at least one parameter;
   generate a first packet rewriting directive in accordance with the determined first packet rewriting parameter set;
   generate a second packet rewriting directive in accordance with the determined second packet rewriting parameter set;
   initiate a transmission of the first packet rewriting directive to the first node of the packet transformation tier and the second packet rewriting directive to the second node of the packet transformation tier; and
   wherein the first node of the packet transformation tier is configured to:
   transmit, corresponding to at least one received packet of a particular network flow associated with the first packet processing requirement, one or more outbound packets to respective destinations in accordance with the first packet rewriting parameter set, wherein the particular network flow is distinguishable from other network flows based at least in part on one or more header elements of inbound packets; and
   wherein the second node of the packet transformation tier is configured to:
   transmit, corresponding to at least one received packet of a different network flow associated with the second packet processing requirement, one or more outbound packets to respective destinations in accordance with the second packet rewriting parameter set.

2. The multi-tier network flow management system as recited in claim 1, wherein in accordance with the first packet processing parameter set, the number of outbound packets generated corresponding to a particular received packet is greater than one, wherein individual ones of the outbound packets corresponding to the particular received packet are transmitted to respective destinations.

3. The multi-tier network flow management system as recited in claim 1, wherein in accordance with the first packet processing parameter set, the network protocol to be used for an outbound packet is different from the network protocol indicated in the corresponding received packet.

4. The multi-tier network flow management system as recited in claim 1, wherein the destination selection rule comprises a selection of a particular destination from a pool of destinations without performing a load balancing analysis.

5. The multi-tier network flow management system as recited in claim 1, wherein in accordance with the source address substitution rule of the first packet processing parameter set, a particular source network address is to be indicated in a first outbound packet and in a second outbound packet, wherein the first outbound packet corresponds to a first received packet with a first source network address, and wherein the second outbound packet corresponds to a second received packet with a different source network address than the first source network address.

6. A method, comprising:
   determining, at a particular node of a network flow management system, based at least in part on an indication of a packet processing requirement of a client, one or more of:
      a number of outbound packets to be generated corresponding to a packet of a particular network flow received at the network flow management system; or
      a source address substitution rule;
   generating, at the particular node, a packet rewriting directive in accordance with said determining; and
   initiating, from the particular node, a transmission of the packet rewriting directive to a different node of the network flow management system at which packets of the particular network flow are to be processed according to the packet rewriting directive and transmitted toward respective destinations for the respective packets of the particular network flow,
   wherein, for another network flow, the method comprises the particular node of the network flow management system:
   generating another packet rewriting directive; and
   initiating a transmission of the other packet rewriting directive to another node of the network flow management system at which other packets are processed according to the other packet rewriting directive and transmitted toward respective destinations for the respective other packets of the other network flow.

7. The method as recited in claim 6, wherein the number of outbound packets to be generated corresponding to a particular received packet is greater than one, wherein individual ones of the outbound packets corresponding to the particular received packet are transmitted to respective destinations.

8. The method as recited in claim 6, wherein the network protocol to be used for an outbound packet is different from the network protocol indicated in the corresponding received packet.

9. The method as recited in claim 6, wherein the packet rewriting directive is generated in accordance with a destination selection rule determined at the particular node of the network flow management system, wherein the destination selection rule indicates a particular destination selected from a pool of destinations without performing a load balancing analysis.

10. The method as recited in claim 6, wherein in accordance with the source address substitution rule, a particular source network address is to be indicated in a first outbound packet and in a second outbound packet, wherein the first outbound packet corresponds to a first received packet with a first source network address, and wherein the second outbound packet corresponds to a second received packet with a different source network address than the first source network address.

11. The method as recited in claim 6, wherein the packet rewriting directive is generated in accordance with a destination selection rule determined at the particular node of the network flow management system, wherein the destination selection rule comprises a selection of a particular destination from a pool of potential destinations based at least in part of an analysis of a workload level of the particular destination.

12. The method as recited in claim 6, wherein said determining is responsive to receiving an indication of a cache miss at a cache of the different node.

13. The method as recited in claim 6, further comprising: replicating, at a different node of the flow management system, the packet rewriting directive.

14. The method as recited in claim 6, further comprising: generating, at another node of the network flow management system, based at least in part on an indication of a different packet processing requirement, a different packet rewriting directive.

15. The method as recited in claim 6, further comprising: generating, at the particular node of the network flow management system, based at least in part on an indication of a different packet processing requirement, a different packet rewriting rule.

16. A non-transitory computer-accessible storage medium storing program instructions that when executed on one or more processors implement a node of a flow management service, wherein the node is configured to:
determine, based at least in part on an indication of a packet processing requirement of a client, one or more of:
a number of outbound packets to be generated corresponding to a packet of a particular network flow received at the flow management service; or
a source address substitution rule;
generate a packet rewriting directive in accordance with the determination; and
initiate a transmission of the packet rewriting directive to a different node of the network flow management service at which packets of the particular network flow are to be processed according to the packet rewriting directive and transmitted toward respective destinations for the respective packets of the particular network flow,
wherein, for another network flow, the node is configured to:
generate another packet rewriting directive; and
initiate a transmission of the other packet rewriting directive to another node of the network flow management service at which other packets are processed according to the other packet rewriting directive and transmitted toward respective destinations for the respective other packets of the other network flow.

17. The non-transitory computer-accessible storage medium as recited in claim 16, wherein the number of outbound packets to be generated corresponding to a particular received packet is greater than one, wherein individual ones of the outbound packets corresponding to the particular received packet are transmitted to respective destinations.

18. The non-transitory computer-accessible storage medium as recited in claim 16, wherein the network protocol to be used for a particular outbound packet is different from the network protocol indicated in a corresponding received packet.

19. The non-transitory computer-accessible storage medium as recited in claim 16, wherein the packet rewriting directive is generated in accordance with a destination selection rule determined at the node of the network flow management service, wherein the destination selection rule indicates a particular destination selected from a pool of destinations without performing a load balancing analysis.

20. The non-transitory computer-accessible storage medium as recited in claim 16, wherein in accordance with the source address substitution rule, a particular source network address is to be indicated in a first outbound packet and in a second outbound packet, wherein the first outbound packet corresponds to a first received packet with a first source network address, and wherein the second outbound packet corresponds to a second received packet with a second source network address.

* * * * *